US012669658B2

(12) United States Patent
Karhade et al.

(10) Patent No.: US 12,669,658 B2
(45) Date of Patent: Jun. 30, 2026

(54) PHOTONIC INTEGRATED CIRCUIT PACKAGING ARCHITECTURES

(71) Applicant: Intel Corporation, Santa Clara, CA (US)

(72) Inventors: Omkar G. Karhade, Chandler, AZ (US); Xiaoqian Li, Chandler, AZ (US); Ravindranath Vithal Mahajan, Chandler, AZ (US); Nitin A. Deshpande, Chandler, AZ (US); Srinivas V. Pietambaram, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 17/482,175

(22) Filed: Sep. 22, 2021

(65) Prior Publication Data

US 2023/0089877 A1 Mar. 23, 2023

(51) Int. Cl.
G02B 6/42 (2006.01)
(52) U.S. Cl.
CPC ......... *G02B 6/4206* (2013.01); *G02B 6/4239* (2013.01); *G02B 6/4274* (2013.01)
(58) Field of Classification Search
CPC .................................................. G02B 6/4206
See application file for complete search history.

(56) References Cited

U.S. PATENT DOCUMENTS 6,393,169 B1 5/2002 Paniccia et al.
6,611,635 B1 8/2003 Yoshimura et al.
6,690,845 B1 2/2004 Yoshimura et al.
8,253,229 B2 8/2012 Yamano et al.
8,536,693 B2 * 9/2013 Dungan .............. H01L 25/0652
29/830
8,703,603 B2 * 4/2014 Sherrer .................. G01B 11/26
438/638
9,028,157 B2 5/2015 Na et al.
(Continued)

FOREIGN PATENT DOCUMENTS

WO 2020173561 A1 9/2020

OTHER PUBLICATIONS

U.S. Appl. No. 17/237,375, filed Apr. 22, 2021, Photonic Integrated Circuit Packaging Architecture.

*Primary Examiner* — Thomas A Hollweg
*Assistant Examiner* — Marc E Manheim
(74) *Attorney, Agent, or Firm* — Akona IP PC

(57) ABSTRACT

Microelectronic assemblies including photonic integrated circuits (PICs), related devices and methods, are disclosed herein. For example, in some embodiments, a photonic assembly may include a PIC in a first layer including an insulating material, wherein the PIC has an active surface and an opposing backside, and wherein the PIC is embedded in the insulating material with the active surface facing up; a conductive pillar in the first layer; an integrated circuit (IC) in a second layer, wherein the second layer is on the first layer and the second layer includes the insulating material, wherein the IC is embedded in the insulating material in the second layer, and wherein the IC is electrically coupled to the active surface of the PIC and the conductive pillar; and an optical component optically coupled to the active surface of the PIC and extending through the insulating material in the second layer.

17 Claims, 33 Drawing Sheets

(56)                   References Cited

U.S. PATENT DOCUMENTS

| | | | |
|---|---|---|---|
| 9,182,544 B2 | 11/2015 | Kobrinsky et al. | |
| 9,507,086 B2 | 11/2016 | Kobrinsky et al. | |
| 9,691,873 B2 | 6/2017 | Rogers et al. | |
| 10,054,737 B2 | 8/2018 | Kobrinsky et al. | |
| 10,209,452 B1 | 2/2019 | Hung et al. | |
| 10,598,875 B2 | 3/2020 | Xie | |
| 10,748,844 B2 | 8/2020 | Kumar et al. | |
| 10,795,099 B2 | 10/2020 | Hirano et al. | |
| 11,022,755 B2 | 6/2021 | Chen et al. | |
| 11,251,228 B2 | 2/2022 | Xie et al. | |
| 11,527,419 B2 * | 12/2022 | Yu | H01L 23/5283 |
| 12,029,004 B2 * | 7/2024 | Winzer | G02B 6/4278 |
| 12,092,861 B2 | 9/2024 | Yu et al. | |
| 2008/0044128 A1 | 2/2008 | Kish et al. | |
| 2009/0053858 A1 | 2/2009 | Ko et al. | |
| 2013/0140649 A1 | 6/2013 | Rogers et al. | |
| 2014/0177625 A1 | 6/2014 | Chang et al. | |
| 2014/0203175 A1 | 7/2014 | Kobrinsky et al. | |
| 2015/0295098 A1 | 10/2015 | Toda | |
| 2016/0085038 A1 | 3/2016 | Decker et al. | |
| 2017/0131469 A1 | 5/2017 | Kobrinsky et al. | |
| 2018/0088282 A1 | 3/2018 | Hirano et al. | |
| 2018/0100977 A1 * | 4/2018 | Lee | G02B 6/4206 |
| 2018/0314009 A1 | 11/2018 | Nakazuru et al. | |
| 2018/0329159 A1 * | 11/2018 | Mathai | G02B 6/4206 |
| 2019/0123109 A1 | 4/2019 | Xie et al. | |
| 2019/0137706 A1 | 5/2019 | Xie | |
| 2019/0243064 A1 | 8/2019 | Menezo et al. | |
| 2019/0250327 A1 * | 8/2019 | Huang | G02B 6/4274 |
| 2020/0124798 A1 | 4/2020 | Chen et al. | |
| 2021/0074600 A1 | 3/2021 | Jeng et al. | |
| 2021/0088723 A1 | 3/2021 | Yu et al. | |
| 2021/0096310 A1 | 4/2021 | Chang et al. | |
| 2021/0104812 A1 | 4/2021 | Kapusta et al. | |
| 2021/0132309 A1 | 5/2021 | Zhang et al. | |
| 2021/0175189 A1 * | 6/2021 | Kung | H01L 21/6835 |
| 2021/0271037 A1 | 9/2021 | Brusberg et al. | |
| 2021/0405306 A1 | 12/2021 | Raghunathan et al. | |
| 2022/0283387 A1 | 9/2022 | Rusu et al. | |
| 2023/0060862 A1 | 3/2023 | Patel et al. | |

* cited by examiner

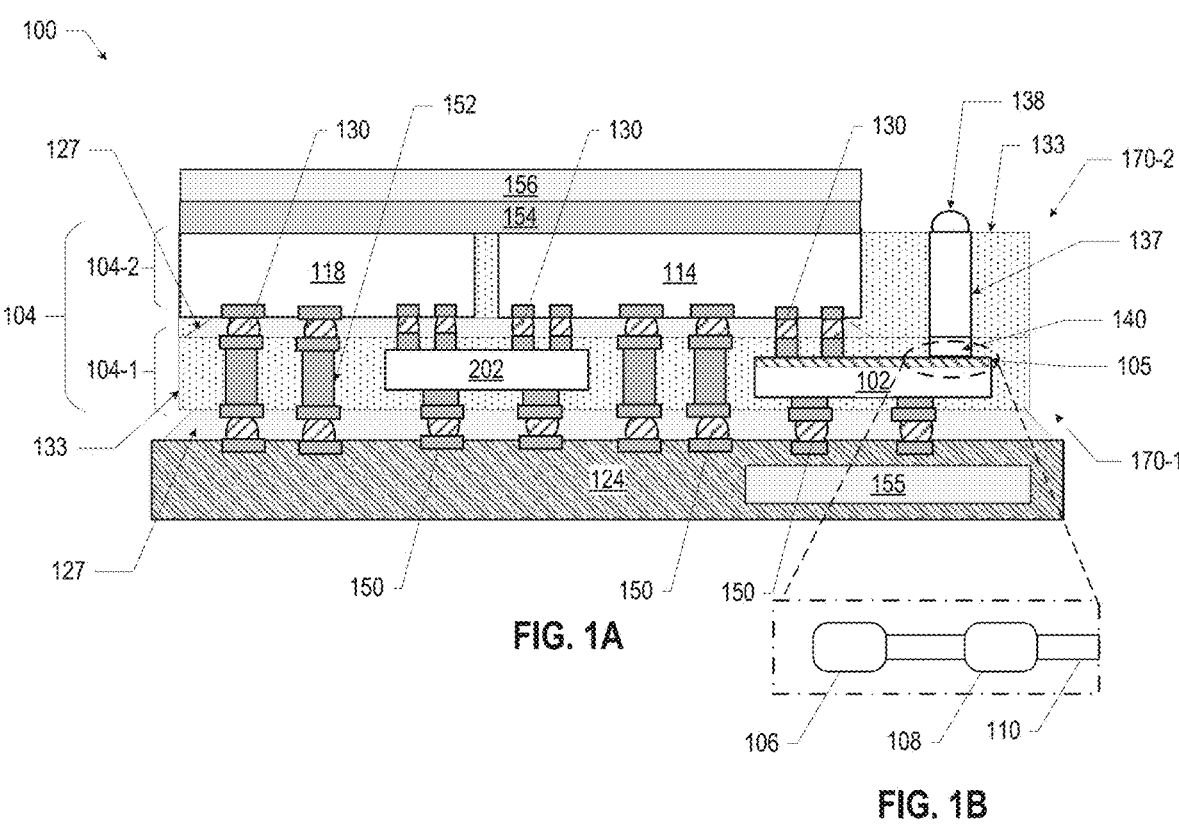
FIG. 1A
FIG. 1B
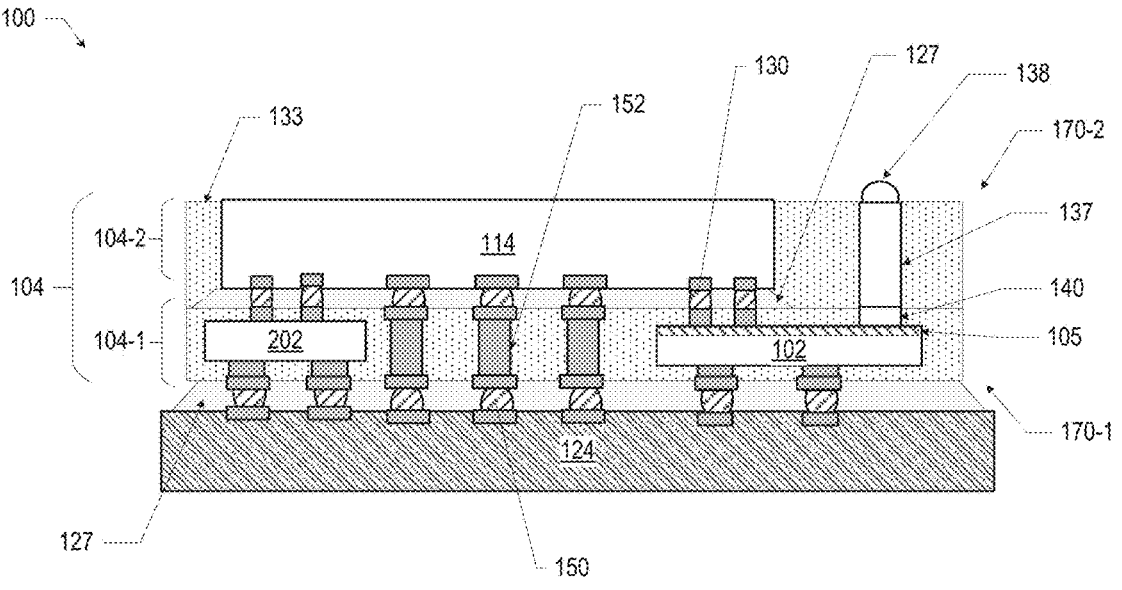
FIG. 2

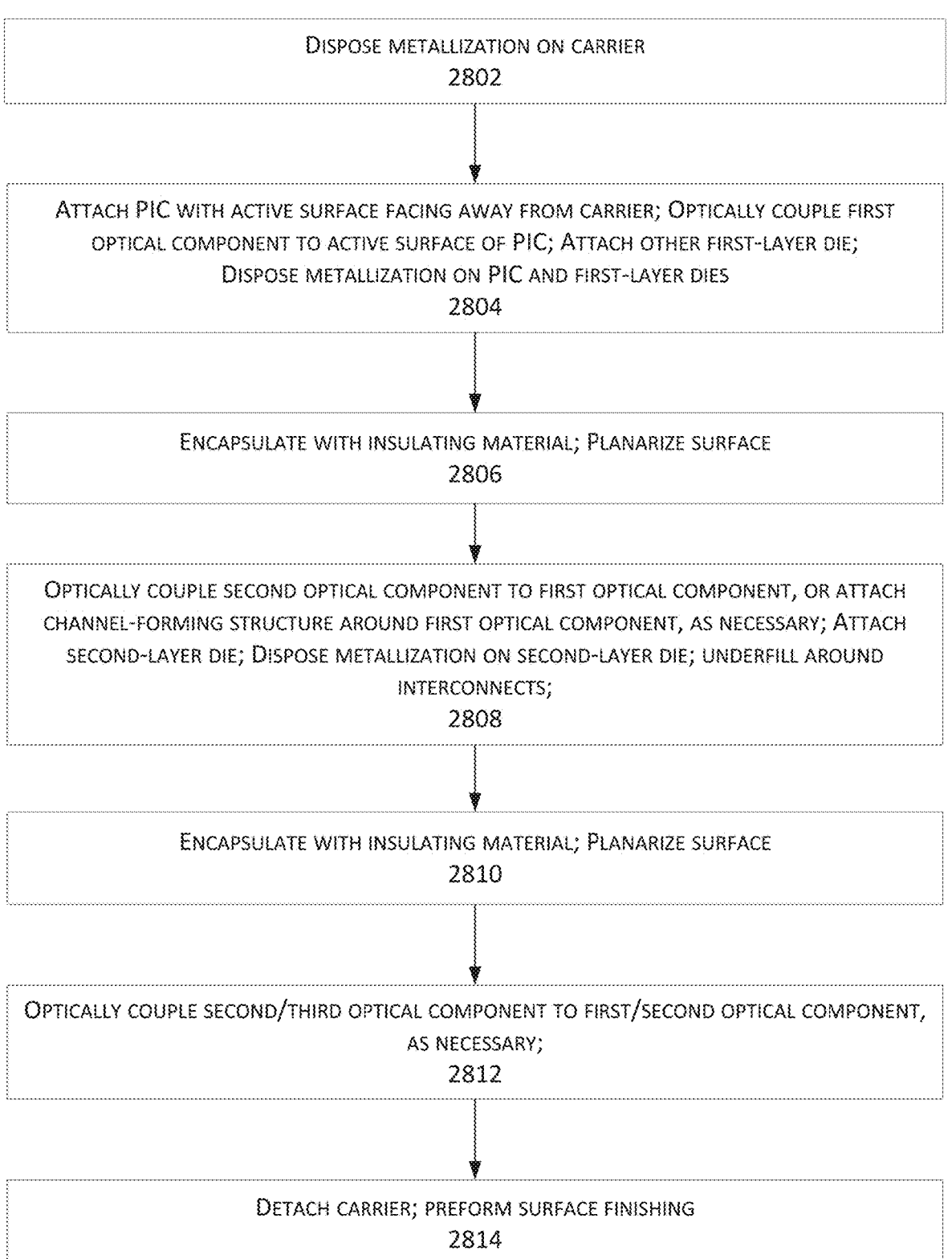

DISPOSE METALLIZATION ON CARRIER
2802

ATTACH PIC WITH ACTIVE SURFACE FACING AWAY FROM CARRIER; OPTICALLY COUPLE FIRST
OPTICAL COMPONENT TO ACTIVE SURFACE OF PIC; ATTACH OTHER FIRST-LAYER DIE;
DISPOSE METALLIZATION ON PIC AND FIRST-LAYER DIES
2804

ENCAPSULATE WITH INSULATING MATERIAL; PLANARIZE SURFACE
2806

OPTICALLY COUPLE SECOND OPTICAL COMPONENT TO FIRST OPTICAL COMPONENT, OR ATTACH
CHANNEL-FORMING STRUCTURE AROUND FIRST OPTICAL COMPONENT, AS NECESSARY; ATTACH
SECOND-LAYER DIE; DISPOSE METALLIZATION ON SECOND-LAYER DIE; UNDERFILL AROUND
INTERCONNECTS;
2808

ENCAPSULATE WITH INSULATING MATERIAL; PLANARIZE SURFACE
2810

OPTICALLY COUPLE SECOND/THIRD OPTICAL COMPONENT TO FIRST/SECOND OPTICAL COMPONENT,
AS NECESSARY;
2812

DETACH CARRIER; PREFORM SURFACE FINISHING
2814

FIG. 28

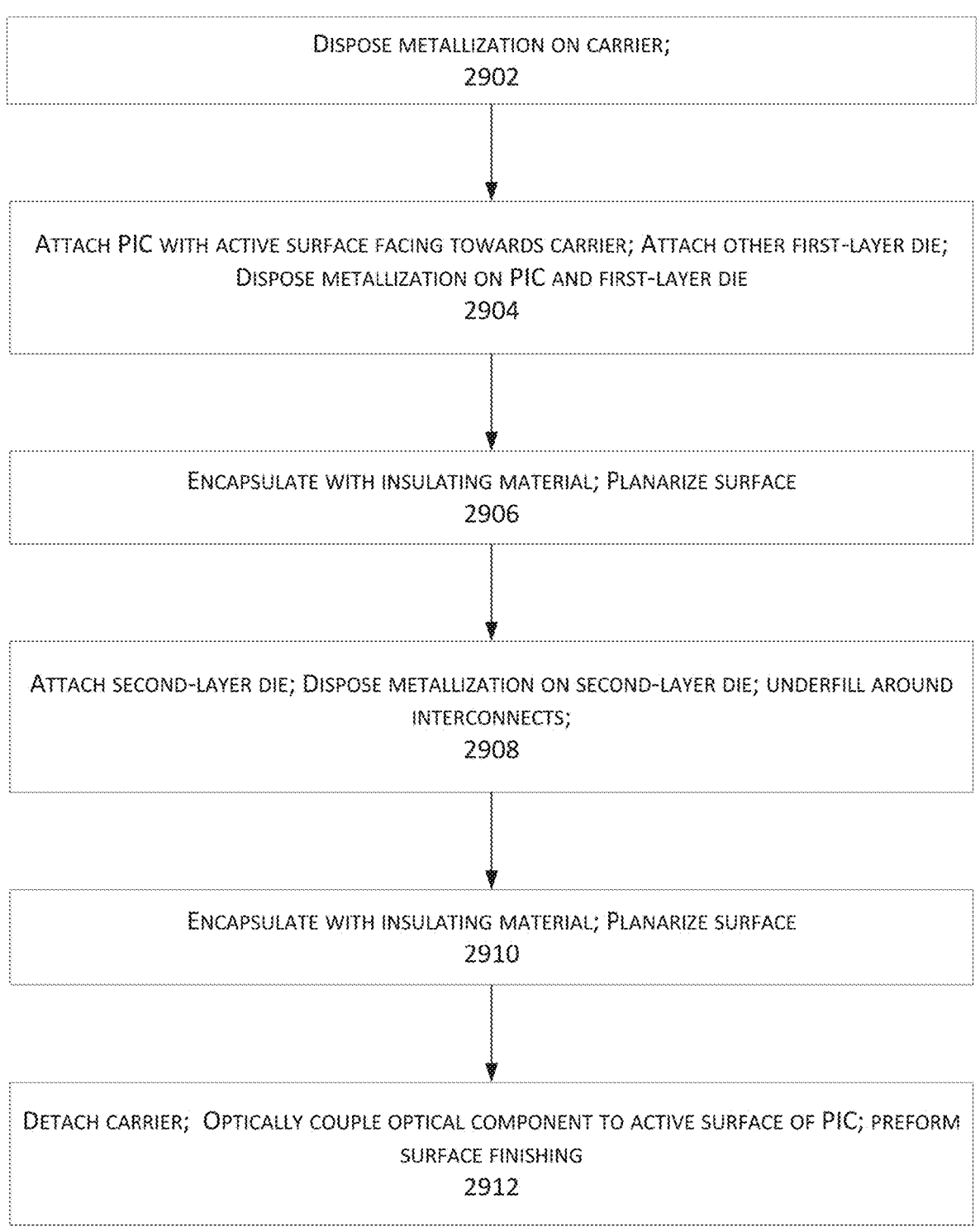

DISPOSE METALLIZATION ON CARRIER;
2902

ATTACH PIC WITH ACTIVE SURFACE FACING TOWARDS CARRIER; ATTACH OTHER FIRST-LAYER DIE;
DISPOSE METALLIZATION ON PIC AND FIRST-LAYER DIE
2904

ENCAPSULATE WITH INSULATING MATERIAL; PLANARIZE SURFACE
2906

ATTACH SECOND-LAYER DIE; DISPOSE METALLIZATION ON SECOND-LAYER DIE; UNDERFILL AROUND
INTERCONNECTS;
2908

ENCAPSULATE WITH INSULATING MATERIAL; PLANARIZE SURFACE
2910

DETACH CARRIER; OPTICALLY COUPLE OPTICAL COMPONENT TO ACTIVE SURFACE OF PIC; PREFORM
SURFACE FINISHING
2912

FIG. 29

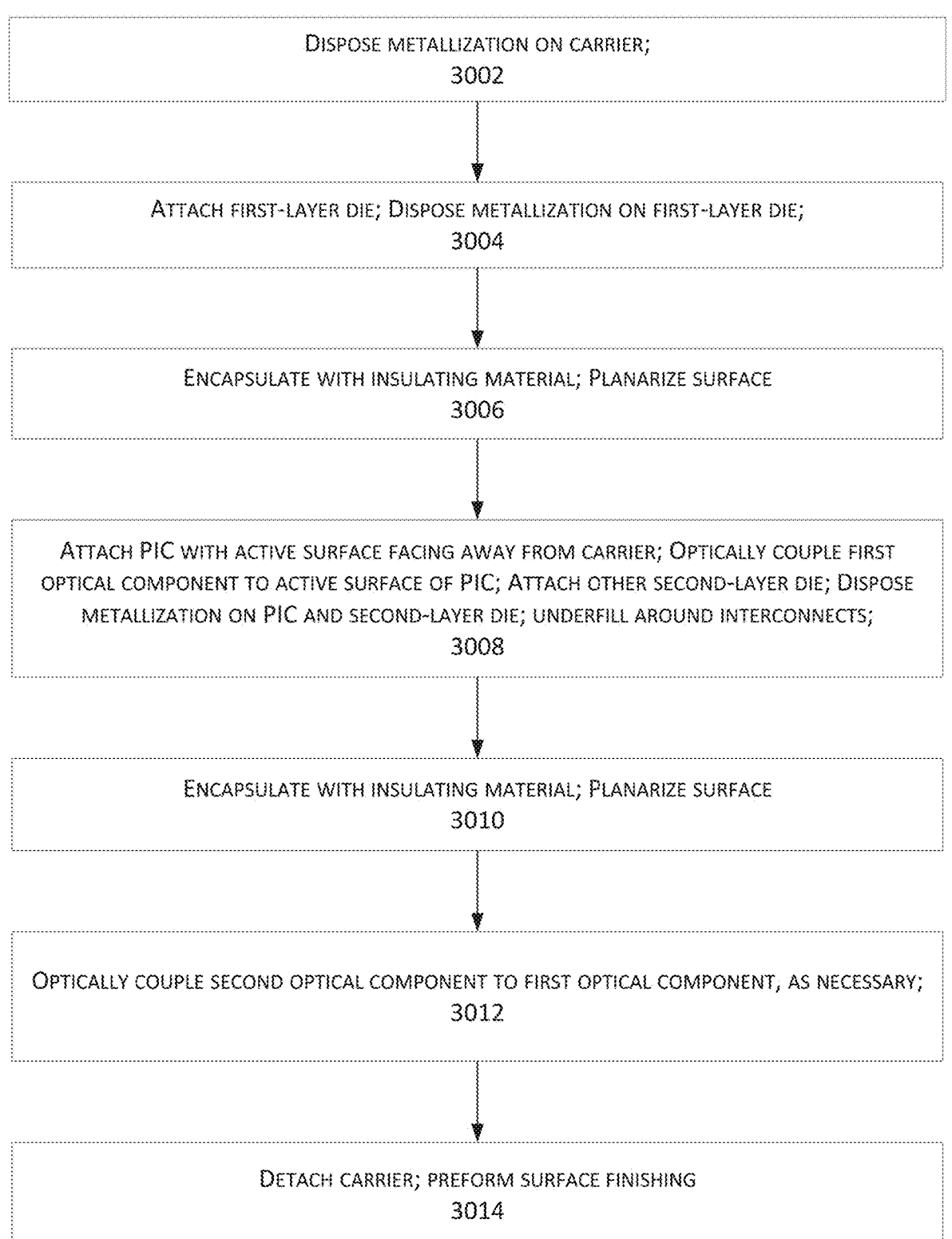

DISPOSE METALLIZATION ON CARRIER;
3002

ATTACH FIRST-LAYER DIE; DISPOSE METALLIZATION ON FIRST-LAYER DIE;
3004

ENCAPSULATE WITH INSULATING MATERIAL; PLANARIZE SURFACE
3006

ATTACH PIC WITH ACTIVE SURFACE FACING AWAY FROM CARRIER; OPTICALLY COUPLE FIRST OPTICAL COMPONENT TO ACTIVE SURFACE OF PIC; ATTACH OTHER SECOND-LAYER DIE; DISPOSE METALLIZATION ON PIC AND SECOND-LAYER DIE; UNDERFILL AROUND INTERCONNECTS;
3008

ENCAPSULATE WITH INSULATING MATERIAL; PLANARIZE SURFACE
3010

OPTICALLY COUPLE SECOND OPTICAL COMPONENT TO FIRST OPTICAL COMPONENT, AS NECESSARY;
3012

DETACH CARRIER; PREFORM SURFACE FINISHING
3014

FIG. 30

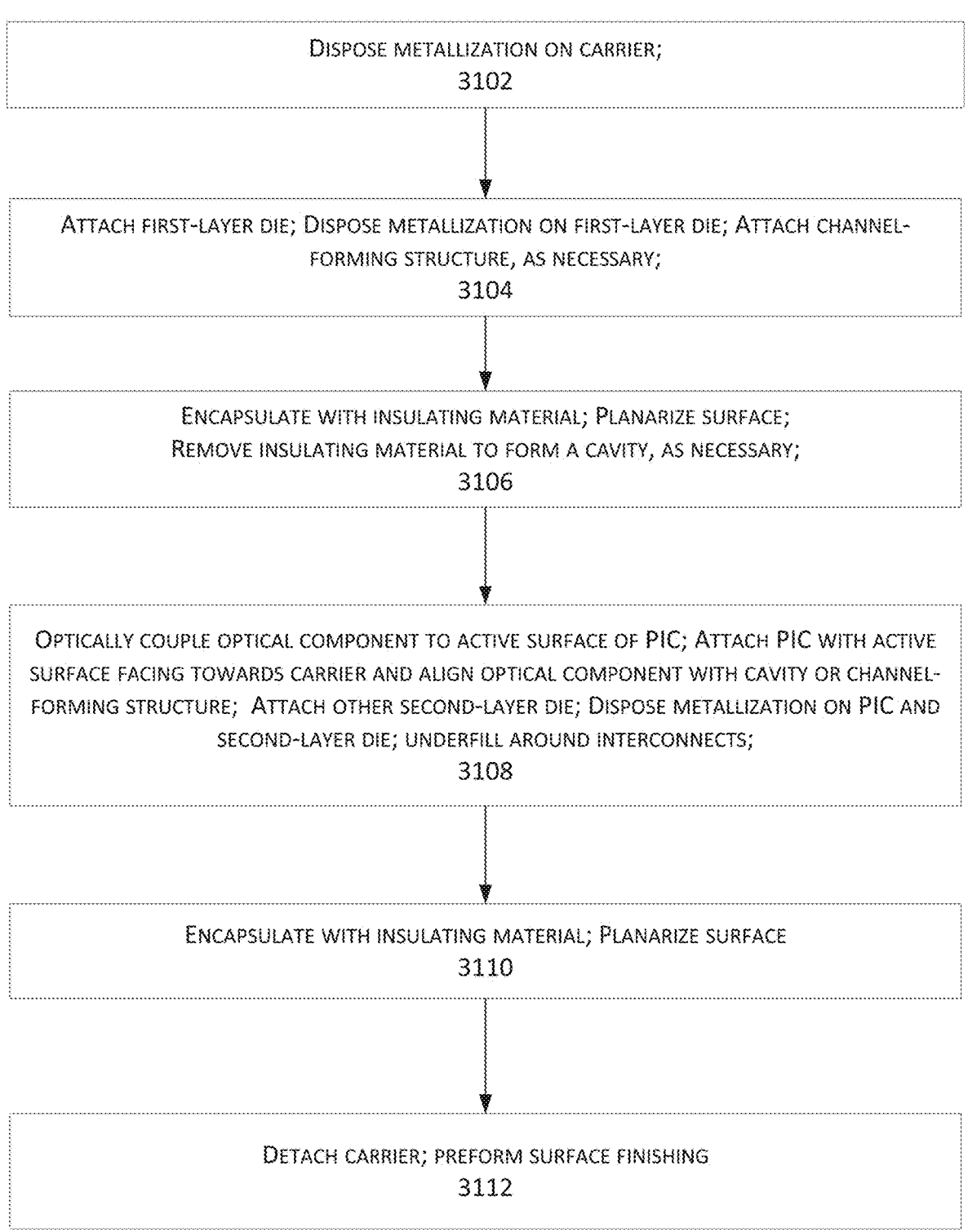

DISPOSE METALLIZATION ON CARRIER;
3102

ATTACH FIRST-LAYER DIE; DISPOSE METALLIZATION ON FIRST-LAYER DIE; ATTACH CHANNEL-FORMING STRUCTURE, AS NECESSARY;
3104

ENCAPSULATE WITH INSULATING MATERIAL; PLANARIZE SURFACE;
REMOVE INSULATING MATERIAL TO FORM A CAVITY, AS NECESSARY;
3106

OPTICALLY COUPLE OPTICAL COMPONENT TO ACTIVE SURFACE OF PIC; ATTACH PIC WITH ACTIVE SURFACE FACING TOWARDS CARRIER AND ALIGN OPTICAL COMPONENT WITH CAVITY OR CHANNEL-FORMING STRUCTURE; ATTACH OTHER SECOND-LAYER DIE; DISPOSE METALLIZATION ON PIC AND SECOND-LAYER DIE; UNDERFILL AROUND INTERCONNECTS;
3108

ENCAPSULATE WITH INSULATING MATERIAL; PLANARIZE SURFACE
3110

DETACH CARRIER; PREFORM SURFACE FINISHING
3112

FIG. 31

| | |
|---|---|
| PROCESSING DEVICE 1802 | COMMUNICATION CHIP 1812 |
| MEMORY 1804 | BATTERY/POWER 1814 |
| DISPLAY DEVICE 1806 | GPS DEVICE 1818 |
| AUDIO OUTPUT DEVICE 1808 | AUDIO INPUT DEVICE 1824 |
| OTHER OUTPUT DEVICE 1810 | OTHER INPUT DEVICE 1820 |

1800

ANTENNA 1822

PHOTONIC INTEGRATED CIRCUIT PACKAGING ARCHITECTURES

BACKGROUND

The present disclosure relates to packaging photonic integrated circuits (PICs). More specifically, it relates to techniques, methods, and apparatus directed to PIC packaging architecture.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1A is a schematic side, cross-sectional view of an example photonic packaging architecture, in accordance with various embodiments.

FIG. 1B is a schematic illustration of an example detail of an active surface of a photonic integrated circuit, in accordance with various embodiments.

FIG. 2 is a schematic side, cross-sectional view of an example photonic packaging architecture, in accordance with various embodiments.

FIG. 28 is a flow diagram of an example method of fabricating a photonic package, according to various embodiments of the present disclosure.

FIG. 29 is a flow diagram of another example method of fabricating a photonic package, according to various embodiments of the present disclosure.

FIG. 30 is a flow diagram of another example method of fabricating a photonic package, according to various embodiments of the present disclosure.

FIG. 31 is a flow diagram of another example method of fabricating a photonic package, according to various embodiments of the present disclosure.

DETAILED DESCRIPTION

Figure 3:
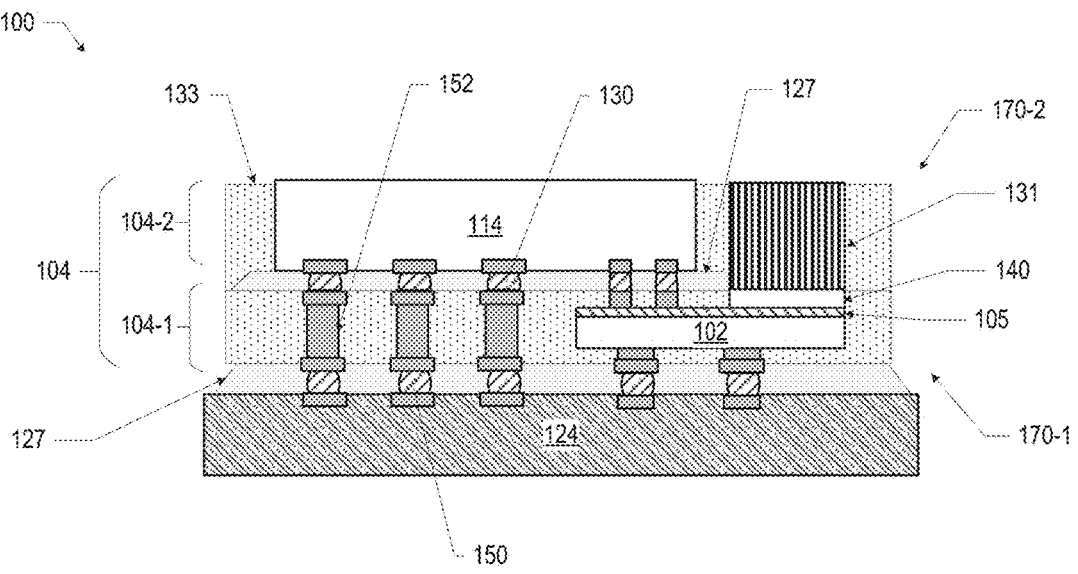
FIG. 3 is a schematic side, cross-sectional view of an example photonic packaging architecture, in accordance with various embodiments.

Microelectronic assemblies including PICs, related devices and methods, are disclosed herein. For example, in some embodiments, a photonic microelectronic assembly may include a PIC and an optical component coupled to an active surface of the PIC, where the PIC is embedded in an insulating material.

Contemporary optical communications and other systems often employ PICs. Smaller, faster, and less expensive optical elements can enable universal, low-cost, high-volume optical communications needed for fast and efficient communication technologies demanded by high volume internet data traffic. In optical communications, information is transmitted by way of an optical carrier whose frequency typically is in the visible or near-infrared region of the electromagnetic spectrum. A carrier with such a high frequency is sometimes referred to as an optical signal, an optical carrier, a light wave signal, or simply light. A typical optical communications network includes several optical fibers, each of which may include several channels. A channel is a specified frequency band of an electromagnetic signal and is sometimes referred to as a wavelength. Technological advances today enable implementing portions of optical communication systems at the integrated circuit (IC) (or chip or die) level in PICs. Packaging such PICs presents many challenges.

For purposes of illustrating photonic packages described herein, it is important to understand phenomena that may come into play during packaging of PICs. The following foundational information may be viewed as a basis from which the present disclosure may be properly explained. Such information is offered for purposes of explanation only and, accordingly, should not be construed in any way to limit the broad scope of the present disclosure and its potential applications.

In a general sense, a PIC integrates photonic functions for information signals imposed on electromagnetic waves, e.g., electromagnetic waves of optical wavelengths. PICs find application in fiber-optic communication, medical, security, sensing, and photonic computing systems. The PIC may implement one or more optical and electro-optical devices such as lasers, photodetectors, waveguides, and modulators on a single semiconductor chip. In addition, the PIC may also include electrical circuitry to process electrical signals corresponding to these optical signals. Such integrated PICs can enable a cost-effective solution for optical communication and optical interconnects.

Packaging the PIC is not trivial. Among the challenges is a need for parallel tight-pitch interconnects that enable high density, high bandwidth electrical communication between the PIC and other electrical devices, such as processing units (XPU) and electronic integrated circuits (EIC) with simultaneous optical access to the PIC for the optical signals. Indeed, getting optical signals into and out of PICs is a driver of manufacturing cost and complexity. In addition, coupling a fiber-optic cable, also sometimes referred to as "optical fiber" or, simply, a "fiber," to a PIC so that electromagnetic signals, e.g., optical signals, may exchange between the two is challenging. One way to couple a PIC to a fiber is to implement edge-coupling by using an intermediate optical coupling structure (OCS) (sometimes referred to as "fiber assembly unit" (FAU) or "fiber array block") that has one end coupled to a fiber and an opposite end placed proximate to a PIC die (i.e., a die that houses one or more PICs) so that electromagnetic signals may be exchanged between the PICs of the PIC die and the fiber, via the OCS.

However, because the signals require a transparent medium for propagation, the PIC must be typically exposed in the package to allow the fiber to be coupled to the PIC with sufficient stability even in such edge-coupled assemblies. For example, in some packaging architectures, the PIC has an overhang to couple to the fiber which presents at the edge of the package. In another example, the PIC is located in a cavity so that it is exposed, and the fiber, which presents at the package edge, is coupled to the exposed face. Both these architectures cannot support small footprint PICs because a substantial area of the PIC having functional structures and circuitry is used up in coupling to the fiber. They are also limited in the density of their electrical interconnects to other ICs in the package.

In one aspect of the present disclosure, an example of a photonic packaging architecture includes a photonic package that comprises a package substrate, an IC, an insulating material, a PIC having an active side and a lateral side substantially perpendicular to the active side, and an optical lens coupled to the PIC on the lateral side. The PIC includes at least one optical element on the active side. A substantial portion of the active side of the PIC is in contact with the insulating material, and the PIC is electrically coupled to the package substrate and to the IC.

As used herein, the term "optical element" includes arrangements of forms fabricated in ICs to receive, transform and/or transmit optical signals as described herein. It may include optical conductors such as waveguides, grating coupler, electromagnetic radiation sources such as lasers, and electro-optical devices such as photodetectors. As used herein, a "package" and an "IC package" are synonymous, as are a "die, an "IC die," and an "IC." As used herein, the term "insulating" means "electrically insulating," unless otherwise specified. Although certain elements may be referred to in the singular herein, such elements may include multiple sub-elements. For example, "an insulating material" may include one or more insulating materials. As used herein, a "conductive contact" may refer to a portion of conductive material (e.g., metal) serving as an electrical interface between different components (e.g., part of an interconnect); conductive contacts may be recessed in, flush with, or extending away from a surface of a component, and may take any suitable form (e.g., a conductive pad or socket, or portion of a conductive line or via). In a general sense, an "interconnect" refers to any element that provides a physical connection between two other elements. For example, an electrical interconnect provides electrical connectivity between two electrical components, facilitating communication of electrical signals between them; an optical interconnect provides optical connectivity between two optical components, facilitating communication of optical signals between them. As used herein, both electrical interconnects and optical interconnects are comprised in the term "interconnect." The nature of the interconnect being described is to be understood herein with reference to the signal medium associated therewith. Thus, when used with reference to an electronic device, such as an IC that operates using electrical signals, the term "interconnect" describes any element formed of an electrically conductive material for providing electrical connectivity to one or more elements associated with the IC or/and between various such elements. In such cases, the term "interconnect" may refer to both conductive traces (also sometimes referred to as "metal traces," "lines," "metal lines," "wires," "metal wires," "trenches," or "metal trenches") and conductive vias (also sometimes referred to as "vias" or "metal vias"). Sometimes, electrically conductive traces and vias may be referred to as "conductive traces" and "conductive vias", respectively, to highlight the fact that these elements include electrically conductive materials such as metals. Likewise, when used with reference to a device that operates on optical signals as well, such as a photonic IC (PIC), "interconnect" may also describe any element formed of a material that is optically conductive for providing optical connectivity to one or more elements associated with the PIC. In such cases, the term "interconnect" may refer to optical waveguides (e.g., structures that guide and confine light waves), including optical fiber, optical splitters, optical combiners, optical couplers, and optical vias.

Each of the structures, assemblies, packages, methods, devices, and systems of the present disclosure may have several innovative aspects, no single one of which is solely responsible for all the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art. For example, the term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20% of a target value (e.g., within +/−5 or 10% of a target value) based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," "at," and "on" as used herein refer to a relative position of one material layer or component with respect to other layers or components. For example, one layer disposed over or under another layer may be directly in contact with the other layer or may have one or more intervening layers. Moreover, one layer between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

In the drawings, same reference numerals refer to the same or analogous elements shown so that, unless stated otherwise, explanations of an element with a given reference numeral provided in context of one of the drawings are applicable to other drawings where element with the same reference numerals may be illustrated. The drawings are not necessarily drawn to scale. Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, the phrase "FIG. 5" may be used to refer to the collection of drawings of FIGS. 5A-5F, the phrase "FIG. 6" may be used to refer to the collection of drawings of FIGS. 6A-6F, etc.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

FIG. 1A is a side, cross-sectional illustration of a photonic package 100, according to some embodiments of the present disclosure. The photonic package 100 may include a multi-layer die subassembly 104 having an integrated optical component 137 optically coupled to a PIC 102. As used herein, the terms "photonic package," "photonic microelectronic assembly," and similar variations may be used interchangeably. As used herein, the term a "multi-layer die subassembly" 104 may refer to a composite die having two or more stacked layers with one or more dies in each layer, and conductive interconnects and/or conductive pathways connecting the one or more dies, including dies in non-adjacent layers. As used herein, the terms a "multi-layer die subassembly" and a "composite die" may be used interchangeably. As shown in FIG. 1A, the multi-layer die subassembly 104 may include a first layer 104-1 having a PIC 102, a bridge die 202, and conductive pillars 152 embedded in an insulating material 133, and a second layer 104-2 having an optical component 137 optically coupled to the PIC 102, an EIC 114, and an XPU 118 embedded in the insulating material 133. The multi-layer die subassembly 104 may include a first surface 170-1 and an opposing second surface 170-2. In particular, the multi-layer die subassembly 104 may include a PIC 102, a bridge die 202, and a conductive pillar 152 in a first layer 104-1 electrically coupled via interconnects 130 to an EIC 114 and an XPU 118 in a second layer 104-2 on the first layer 104-1, and an optical component 137 extending through the second layer 104-2 and optically coupled to the active side 105 of the PIC 102. In some embodiments, PIC 102 may include optical elements, such as a grating coupler, at an active surface 105 that allow PIC 102 to transmit and/or receive light through the active surface 105 (e.g., vertical transmission and reception of light, as shown in FIG. 1A). In some embodiments, PIC 102 may include optical elements, such as an edge connector, a v-groove connector, or an angled reflector with a grating coupler, at an active surface 105 that allow PIC 102 to transmit and/or receive light through a lateral surface that is substantially perpendicular to the active surface 105 (e.g., lateral transmission and reception of light, as shown below, for example, in FIG. 20). The multi-layer die subassembly 104 may further include an optical lens 138 optically coupled at the top surface (e.g., at the second surface 170-2) of the second layer 104-2 to the optical component 137 at the active surface of PIC 102. Examples of optical components 137 include any suitable optical structures for propagating optical signals, such as, a glass block, a fiber array block, an optical lens, a planar lens (e.g., for beam collimation), a micro-lens, a glass block with a reflector, a glass block with a curved surface, a mirror reflector, a multi-directional reflector, a waveguide, a laser written waveguide, and combinations thereof. As shown in FIG. 1A, in some embodiments, the multi-layer die subassembly 104 may further include an optical surface component 140 optically coupled to the active surface 105 of PIC 102 at a first end and optically coupled to the second optical component 137 at an opposing second end. Examples of optical surface components 140 include any suitable optical structures for propagating optical signals, including any of the optical structures as described above with reference to optical component 137. In some embodiments, the optical surface component 140 may include an oxide material, such as silicon oxide (e.g., in the form of silicon and oxygen). In embodiments having multiple optical components (e.g., optical surface component 140, optical component 137, and/or optical lens 138), the optical components may be aligned at the bonding interfaces to minimize optical loss across the optical path. In some embodiments, index matching epoxy may be used to further reduce optical loss. For glass-to-glass bonding interface (e.g., glass block to glass block, or glass block to PIC 102), alignment may not be required as the glass block is configured for beam expansion and optical loss is likely to be minimal. For optical lens 138 to optical component 137 bonding, optical lens 138 may be designed (e.g., with specific dimensions of thickness, height, and/or diameter) and optically aligned to the optical component 137 to achieve a desired beam expansion target.

As shown in FIG. 1A, PIC 102 may be optically coupled to an optical component 137 and may further be optically coupled to an optical lens 138 using any suitable attachment means, for example, optical glue. In various embodiments, one or more waveguide 110 of PIC 102 may be exposed on an active surface 105 enabling optical coupling to optical surface component 140 or to optical component 137 and further to optical lens 138. Optical lens 138 may be of any type, including lensed fiber (lens integrated with optical fiber), polymer micro lens, prism lens, graded refractive-index (GRIN) lens or any other suitable lens that can serve as an optical coupler between waveguide 110 and an optical fiber (not shown) that facilitates optical coupling to other parts of a system. In various embodiments, optical component 137 with optical lens 138 may comprise an array of multiple such optical components situated proximate to active side 105. In an example embodiment, an array may comprise 12 to 24 such optical components. In another example, an array may be a two-dimensional (2D) array.

Optical glue may comprise any suitable material that can permit optical signals to pass through while serving to adhere optical lens 138 to optical component 137 and optical component 137 to optical surface component 140 and/or PIC 102. The materials can include, by way of examples, and not as limitations, ultraviolet curing optical adhesives, epoxies, silicone, modified silane, and acrylates. A top surface of optical surface component 140 and a top surface of optical component 137 may be ground and polished to suitable surface quality enabling optical interconnection with no substantial loss in optical signal integrity across boundaries of PIC 102 and optical lens 138.

Figure 20:
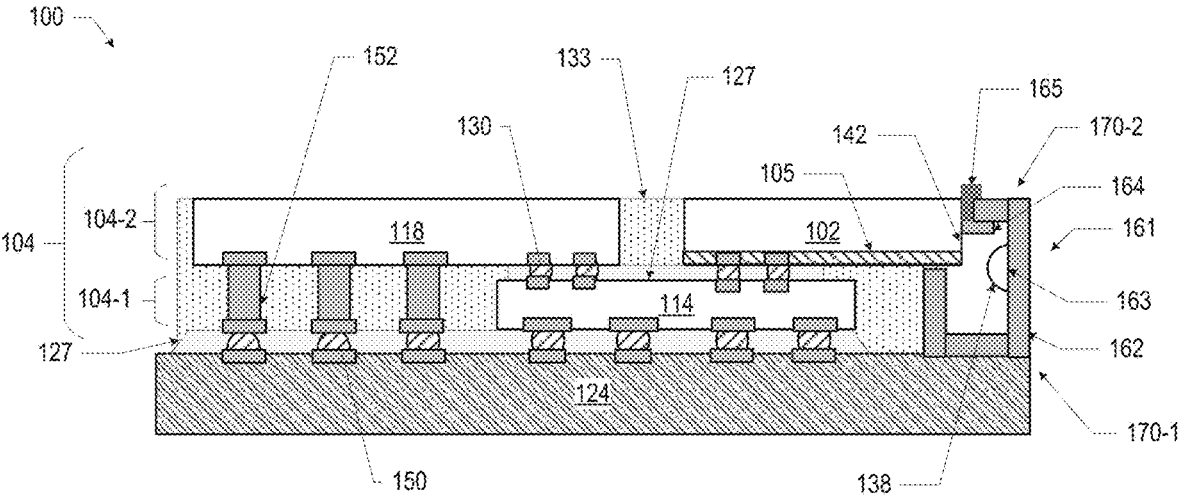
FIG. 20 is a schematic side, cross-sectional view of an example photonic packaging architecture, in accordance with various embodiments.

As shown, photonic package 100 may include a PIC 102 having an active side 105 with optical elements. Example optical elements over a portion of active side 105 are shown in more detail in FIG. 18. FIG. 18 is a schematic of a face of active side 105 (e.g., looking down at the active side 105 of the PIC 102). Example optical elements include an electromagnetic radiation source 106, an electro-optical device 108, and a waveguide 110 on active side 105. In many embodiments, the optical elements may be fabricated on active side 105 using any known method in the art, including semiconductor photolithographic and deposition methods. In some embodiments, the optical elements may extend substantially across an entire area of active side 105. In some embodiments, the optical elements may be confined within a portion of active side 105. In some embodiments, a PIC 102 may be configured to transmit and/or receive an optical signal at an active surface 105 (e.g., as depicted in FIG. 1A). In some embodiments, a PIC 102 may be configured to transmit and/or receive an optical signal at a lateral side substantially perpendicular to an active side 105 (e.g., as depicted in FIG. 20).

Electromagnetic radiation source 106 can enable generating optical signals and may include lasers, for example if PIC 102 supports wavelengths between about 0.8 and 1.7 micrometer; or oscillators, for example, if PIC 102 supports wavelengths on a millimeter scale; or some combination of lasers and oscillators, for example, if PIC 102 supports wavelengths between 0.8 micrometer and millimeter or centimeter. Electro-optical device 108 can enable receiving, transforming, and transmitting optical signals. In some embodiments, electro-optical device 108 may be any device or component configured to encode information in/on to the electromagnetic signals, such as modulator, polarizer, phase shifter, and photodetector.

Waveguide 110 can guide optical signals and also perform coupling, switching, splitting, multiplexing and demultiplexing optical signals. In some embodiments, waveguide 110 may include any component configured to feed, or launch, the electromagnetic signal into the medium of propagation such as an optical fiber. In some embodiments, waveguide 110 may further be configured as optical multiplexers and/or demultiplexers, for example, to perform a frequency division multiplexing (FDM) or wavelength division multiplexing (WDM). In some embodiments, waveguide 110 may include a de-multiplexer, such as Arrayed Waveguide Grating (AWG) de-multiplexer, an Echelle grating, a single-mode waveguide, or a thin film filter (TFF) de-multiplexer. Waveguide 110 may comprise planar and non-planar waveguides of any type. In one example, waveguide 110 may comprise a silicon photonic waveguide based on silicon-on-isolator (SOI) platform, configured to guide electromagnetic radiation of any wavelength bands from about 0.8 micrometer to about 5 centimeter. In another example, waveguide 110 may support wavelengths from about 1.2 micrometer to about 1.7 micrometer in the near infrared and infrared bands for use in data communications and telecommunications. In another example, waveguide 110 may support wavelengths from about 1 millimeter to about 10 millimeter extremely high frequency (EHF) band of radio/micro-waves), and in particular, wavelengths of about 2 millimeter may be used for radar and radio frequency (RF) wireless communications.

Although only three such example optical elements are illustrated in FIG. 1B, it may be understood that PIC 102 may include more optical elements of the same or different types that enable it to function appropriately as a photonic device receiving, transforming, and transmitting optical and electrical signals.

In some embodiments, the optical elements on active side 105 may be covered with a protective layer (not shown) of suitable material, such as optical epoxy or silicon oxide. The protective layer enables maintaining integrity of the optical elements during fabrication processes to which PIC 102 may be subjected, for example, attaching, solder reflowing, grinding, polishing, underfilling, and molding. The protective layer may ensure, for example, that optical transmission properties of the optical elements are not compromised during the fabrication processes by contamination with mold or underfill material, or that optical functionality is not compromised by tearing, breaking, or other destructive events during the fabrication processes. The protective layer may also serve to avoid leaking optical signals from the optical elements, including waveguide 110, during operation of PIC 102. For example, the protective layer may further serve to provide oxide-to-oxide bonding between the optical elements of PIC 102 and the optical surface component 140 when a silicon oxide material is used. In another example, the protective layer may serve to provide nitride-to-nitride bonding between the optical elements of PIC 102 and the optical surface component 140 when a silicon nitride material is used. The silicon oxide layers in oxide-to-oxide bonding, or the silicon nitride layers in nitride-to-nitride bonding, may be bonded initially by Van-der-Waals forces and subsequently by high temperature fusion bonding. The oxide-to-oxide bonding and nitride-to-nitride bonding may decrease optical signal losses.

In general, the light provided to PIC 102 may include any electromagnetic signals having information encoded therein (or, phrased differently, any electromagnetic signals modulated to include information). Often times, the electromagnetic signals are signals associated with optical amplitudes, phases, and wavelengths and, therefore, descriptions provided herein refer to "optical" signals (or light) and "optical" components (e.g., "electro-optical device 108"). However, photonic package 100 with PIC 102, as described herein, are not limited to operating with electromagnetic signals of optical spectrum and descriptions provided herein with reference to optical signals and/or optical elements are equally applicable to electromagnetic signals of any suitable wavelength, such as electromagnetic signals in near-infrared (NIR) and/or infrared (IR) bands, as well as electromagnetic signals in the RF and/or microwave bands.

PIC 102 may comprise a semiconductor material including, for example, N-type or P-type materials. PIC 102 may include, for example, a crystalline substrate formed using a bulk silicon (or other bulk semiconductor material) or a SOI structure (or, in general, a semiconductor-on-insulator structure). In some embodiments, PIC 102 may be formed using alternative materials, which may or may not be combined with silicon, that include, but are not limited to, lithium niobite, indium phosphide, silicon dioxide, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-N or group IV materials. In some embodiments, PIC 102 may comprise a non-crystalline material, such as polymers. In some embodiments, PIC 102 may be formed on a printed circuit board (PCB). In some embodiments, PIC 102 may be inhomogeneous, including a carrier material (such as glass or silicon carbide) as a substrate with a thin semiconductor layer over which is active side 105. Although a few examples of the material for PIC 102 are described here, any material or structure that may serve as a foundation upon which PIC 102 may be built falls within the spirit and scope of the present disclosure.

Turning back to FIG. 1A, PIC 102 may be electrically coupled by way of interconnects 130 to an EIC 114. Interconnects 130 may comprise die-to-die (DTD) interconnects along with associated conductive traces, planes, vias, and pads enabling electrical coupling between PIC 102 and EIC 114. Note that some component parts of interconnects are shown in FIG. 1A but are not labeled separately so as not to clutter the drawing. In some embodiments, interconnects 130 may comprise flip-chip interconnects that enable photonic package 100 to achieve a smaller footprint and higher die-to-package-substrate connection density than could be achieved using conventional wire-bond techniques, in which conductive contacts between PIC 102 and EIC 114 are constrained to be located on a periphery of PIC 102 and/or EIC 114. For example, PIC 102 having a square shape with side length N may be able to form 4N wire-bond interconnects, versus $N^2$ flip-chip interconnects utilizing the entire "full field" surface area of PIC 102. Implementing interconnects 130 in a high-density configuration may enable photonic package 100 to have much lower parasitic inductance relative to using wire-bonds, which may result in improved signal integrity for high-speed signals between PIC 102 and EIC 114.

In addition, by co-packaging PIC 102 with EIC 114 using interconnects 130 in a high-density configuration, input/output power can be reduced by limiting electrical signaling to intra-package distances while also reducing cost and signal loss (among other advantages). The three-dimensional (3D) stacked architecture can lower power requirements for data transfer, for example, to 2-3 picoJoules/bit. The high-density configuration can also enable serialization of electromagnetic signals in PIC 102, further allowing fewer number of electrical interconnects with EIC 114. In some example embodiments, interconnects 130 may be formed with a high-density pitch between 18 and 36 micrometer. In an example embodiment, interconnects 130 may be formed with a high-density pitch of 25 micrometer.

In some embodiments, EIC 114 may comprise an IC configured to electrically integrate with PIC 102 to achieve an intended functionality of photonic package 100. For example, EIC 114 may be an Application Specific IC (ASIC), such as a switch circuit or driver/receiver circuit used in optical communication systems. In some embodiments, EIC 114 may comprise a bridge circuit, for example, including an embedded multi-die interconnect bridge having appropriate circuitry on/in a semiconductor substrate to connect at silicon-interconnect speeds with a small footprint as part of an Omni-Directional Interface (ODI) architecture, for example, of 2.5D packages. In some embodiments, EIC 114 may comprise active components, including one or more transistors, voltage converters, trans-impedance amplifiers (TIA), clock and data recovery (CDR) components, microcontrollers, etc. In some embodiments, EIC 114 may comprise passive circuitry sufficient to enable interconnection to PIC 102 and other components in photonic package 100 without any active components. In some embodiments, EIC 114 may extend under a substantial area of PIC 102; in other embodiments, EIC 114 may overlap with PIC 102 along one or more edges. In various embodiments, EIC 114 and PIC 102 may overlap sufficiently to enable disposing interconnects 130 with a desired pitch and number of interconnections that enable photonic package 100 to function appropriately.

Interconnects 130 may further provide electrical coupling between EIC 114 and an XPU 118 via bridge die 202. Interconnects 130 may enable electrical coupling between PIC 102, EIC 114, bridge die 202, and XPU 118. XPU 118 may comprise any suitable integrated chip with processing functionality, such as Central Processing Unit (CPU), Graphics Processing Unit (GPU), Field-Programmable Gate Array (FPGA), ASIC, and accelerator. In various embodiments, XPU 118 may be, or include, one or more voltage converters, Trans Impedance Amplifier (TIA), Clock and Data Recovery (CDR) components, microcontrollers, etc. In some embodiments, interconnects 130 may comprise high-density flip-chip interconnects. In some embodiments, bridge die 202 may comprise appropriate circuitry on/in a semiconductor substrate to connect at silicon-interconnect speeds with a small footprint. In some embodiments, bridge die 202 may comprise active components, such as transistors and diodes in addition to bridge circuitry including metallization traces, vias and passive components for enabling electrical coupling between two ICs; in other embodiments, bridge die 202 may include bridge circuitry including metallization traces, vias and passive components for enabling electrical coupling between two dies, and may not include active components.

EIC 114 and XPU 118 in the second layer 104-2 may be coupled to the package substrate 124 via the conductive pillars 152 to form multi-level (ML) interconnects. In particular, EIC 114 and XPU 118 may be coupled to the package substrate 124 via the conductive pillars 152 and the interconnects 150. The ML interconnects may be power delivery interconnects or high speed signal interconnects. As used herein, the term "ML interconnect" may refer to an interconnect that includes a conductive pillar between a first component and a second component where the first component and the second component are not in adjacent layers, or may refer to an interconnect that spans one or more layers (e.g., an interconnect between a package substrate and a die in a second layer, or an interconnect between a first die in a first layer and a second die in a third layer (not shown)).

Interconnects 150 comprising die-to-package-substrate (DTPS) interconnects, ML interconnects, and associated conductive traces, planes, vias, and pads may provide electrical coupling between EIC 114 and a package substrate 124, and XPU 118 and package substrate 124. In various embodiments, package substrate 124 may comprise a single or multi-layered insulating material with metallization including planes, traces, vias, and passive components (e.g., inductors, capacitors) within the insulating material and/or on the surfaces. Package substrate 124 may comprise ceramic (e.g., alumina) and/or organic material (e.g., epoxy based FR4, resin based bismaleimide triazine (BT), or polyimide) and may be formed in various varieties including rigid and tape. Package substrate 124 may provide mechanical base support and appropriate interfaces to access components in photonic package 100 electrically and optically. Interconnects 150 comprising DTPS interconnects, and associated conductive traces, planes, vias and pads may provide electrical coupling between PIC 102 and package substrate 124. Likewise, interconnects 128 comprising DTPS interconnects, and associated conductive traces, planes, vias and pads may provide electrical coupling between XPU 118 and package substrate 124.

Interconnects 150 may comprise any suitable interconnection, including flip-chips and ball-grid array (BGA) with corresponding metallization, pads and vias, including through-substrate-vias (TSVs) (not shown) through bridge die 202, PIC 102, EIC 114 and/or XPU 118. For example, PIC 102 may include TSVs (not shown) that electrically couple the package substrate 124 to the active surface 105 of the PIC 102 via interconnects 150. Note that the shapes of various interconnects shown in the figure are merely for illustrative purposes and are not to be construed as limitations. The actual shapes of interconnects 130 and/or 150 for example, may result from natural processes occurring during solder reflow. The shapes may depend on material viscosity in liquid state, temperatures of processing, surface tension forces, capillary action, and other mechanisms beyond the scope of the present disclosure. Interconnects 130 and 150 may enable a stacked architecture that enables low power, low loss, high-speed electrical signals between bridge die 202, PIC 102, EIC 114, and XPU 118. Such architecture allows for top-packaged chips (e.g., PIC 102, EIC 114 and XPU 118) to communicate with each other horizontally or vertically, permitting smaller footprint, higher speeds, and reduced power usage for photonic package 100.

The multi-layer die subassembly 104 may include an insulating material 133 (e.g., a dielectric material formed in multiple layers, as known in the art) to form the multiple layers and to embed one or more dies in a layer. In some embodiments, the insulating material 133 of the multi-layer die subassembly 104 may be a dielectric material, such as an organic dielectric material, a fire retardant grade 4 material (FR-4), bismaleimide triazine (BT) resin, polyimide materials, glass reinforced epoxy matrix materials, or low-k and ultra low-k dielectric (e.g., carbon-doped dielectrics, fluorine-doped dielectrics, porous dielectrics, and organic polymeric dielectrics). In some embodiments, the dies (e.g., bridge die 202, PIC 102, EIC 114 and XPU 118) may be embedded in an inhomogeneous dielectric, such as stacked dielectric layers (e.g., alternating layers of different inorganic dielectrics). In some embodiments, the insulating material 133 of the multi-layer die subassembly 104 may be a mold material, such as an organic polymer with inorganic silica particles. In some embodiments, the individual layers of the multi-layer die subassembly 104 (e.g., first and second layers 104-1, 104-2) may include a same insulating material 133. In some embodiments, the individual layers of the multi-layer die subassembly 104 (e.g., first and second layers 104-1, 104-2) may include one or more different insulating materials 133. The multi-layer die subassembly 104 may include one or more ML interconnects through the dielectric material (e.g., including conductive vias and/or conductive pillars, as shown). The multi-layer die subassembly 104 may have any suitable dimensions. For example, in some embodiments, a thickness of the multi-layer die subassembly 104 may be between 100 um and 2000 um. In some embodiments, the multi-layer die subassembly 104 may be a composite die, such as stacked dies. The multi-layer die subassembly 104 may have any suitable number of layers, any suitable number of dies, and any suitable die arrangement. For example, in some embodiments, the multi-layer die subassembly 104 may have between 3 and 20 layers of dies. In some embodiments, the multi-layer die subassembly 104 may include a layer having between 2 and 50 dies.

The photonic package 100 of FIG. 1A may also include an underfill material 127. In some embodiments, the underfill material 127 may extend between the multi-layer die subassembly 104 and the package substrate 124 around the associated interconnects 150. In some embodiments, the underfill material 127 may extend between the first layer 104-1 and the second layer 104-2 and around the associated interconnects 130 (e.g., between EIC 114 and XPU 118 in the second layer 104-2 and the bridge die 202 in the first layer, and between EIC 114 in the second layer 104-2 and PIC 102 and bridge die 202 in the first layer 104-1). In some embodiments, the underfill material 127 around the interconnects 130 is a same material as the underfill material 127 around the interconnects 150. In some embodiments, the underfill material 127 around the interconnects 130 is a different material than the underfill material 127 around the interconnects 150. The underfill material 127 may comprise any suitable material that can perform underfill functions, such as supporting the dies and reducing thermal stress on interconnects. The underfill material 127 may be an insulating material, such as an appropriate epoxy material. In some embodiments, the underfill material 127 may include a capillary underfill, non-conductive film (NCF), or molded underfill. In some embodiments, the underfill material 127 may include an epoxy flux that assists with soldering the bridge die 202 and/or PIC 102 in the first layer 104-1 to the EIC 114 and/or XPU 118 in the second layer 104-2 when forming the interconnects 130, and then polymerizes and encapsulates the interconnects 130. In some embodiments, the underfill material 127 may include an epoxy flux that assists with soldering multi-layer die subassembly 104 to the package substrate 124 when forming the interconnects 150, and then polymerizes and encapsulates the interconnects 150. The underfill material 127 may be selected to have a coefficient of thermal expansion (CTE) that may mitigate or minimize the stress within the multi-layer die subassembly 104 and/or between the multi-layer die subassembly 104 and the package substrate 124 arising from uneven thermal expansion in the photonic package 100. In some embodiments, the CTE of the underfill material 127 may have a value that is intermediate to the CTE of the package substrate 124 (e.g., the CTE of the dielectric material of the package substrate 124) and a CTE of the multi-layer die subassembly 104.

Although not specifically shown in all of the present illustrations in order to not clutter the drawings, when DTD or DTPS interconnects are described, a surface of a first IC (including PICs) may include a first set of conductive contacts, and a surface of a second IC (including PICs) or a package substrate may include a second set of conductive contacts. One or more conductive contacts of the first set may then be electrically and mechanically coupled to some of the conductive contacts of the second set by the DTD or DTPS interconnects. In some embodiments, the pitch of the DTD interconnects may be different from the pitch of the DTPS interconnects, although, in other embodiments, these pitches may be substantially the same. In some embodiments, the DTPS interconnects disclosed herein may have a pitch between about 80 micrometer and 300 micrometer, while the DTD interconnects disclosed herein may have a pitch between about 7 micrometer and 100 micrometer. In an example embodiment, some DTD interconnects have a pitch of 25 micrometer. In some embodiments, the conductive contacts may be formed of aluminum, and may include a layer of gold (e.g., with a thickness of less than 1 micrometer) between the aluminum and adjacent interconnects to limit surface oxidation of the contacts and improve adhesion with adjacent contacts. Alternate materials for the surface finish include palladium, platinum, silver, copper, and tin. In some embodiments, the conductive contacts may be formed of aluminum, and may include a layer of a barrier metal such as nickel, as well as a layer of gold, or other appropriate material, wherein the layer of barrier metal is disposed between aluminum and gold, and the layer of gold is disposed between the barrier metal and the adjacent interconnect. In such embodiments, the gold, or other surface finish, may protect the barrier metal surface from oxidation before assembly, and the barrier metal may limit diffusion of solder from the adjacent interconnects into aluminum. In some embodiments, surfaces of bridge die 202, PIC 102, EIC 114, and XPU 118 in contact with solder may be covered by a suitable solder mask material (not shown) that prevents solder from melting and bridging adjacent contacts during solder reflow.

The DTPS interconnects disclosed herein may take any suitable form. In some embodiments, a set of DTPS interconnects may include solder (e.g., solder bumps or balls that are subject to a thermal reflow to form the DTPS interconnects). DTPS interconnects that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In some embodiments, a set of DTPS interconnects may include an anisotropic conductive material, such as an anisotropic conductive film or an anisotropic conductive paste. An anisotropic conductive material may include conductive materials dispersed in a non-conductive material. In some embodiments, an anisotropic conductive material may include microscopic conductive particles embedded in a binder or a thermoset adhesive film (e.g., a thermoset biphenyl-type epoxy resin, or an acrylic-based material). In some embodiments, the conductive particles may include a polymer and/or one or more metals (e.g., nickel or gold). For example, the conductive particles may include nickel-coated gold or silver-coated copper that is in turn coated with a polymer. In another example, the conductive particles may include nickel. When an anisotropic conductive material is uncompressed, there may be no conductive pathway from one side of the material to the other. However, when the anisotropic conductive material is adequately compressed (e.g., by conductive contacts on either side of the anisotropic conductive material), the conductive materials near the region of compression may contact each other so as to form a conductive pathway from one side of the film to the other in the region of compression.

The DTD interconnects disclosed herein may take any suitable form. In some embodiments, some or all of the DTD interconnects as described herein may be metal-to-metal interconnects (e.g., copper-to-copper interconnects, or plated interconnects). In such embodiments, the conductive contacts on either side of the DTD interconnect may be bonded together (e.g., under elevated pressure and/or temperature) without the use of intervening solder or an anisotropic conductive material. In some embodiments, a thin cap of solder may be used in a metal-to-metal interconnect to accommodate planarity, and this solder may become an intermetallic compound during processing. In some metal-to-metal interconnects that utilize hybrid bonding, a dielectric material (e.g., silicon oxide, silicon nitride, silicon carbide, or an organic layer) may be present between the metals bonded together (e.g., between copper pads or posts that provide the associated conductive contacts). In some embodiments, one side of a DTD interconnect may include a metal pillar (e.g., a copper pillar), and the other side of the DTD interconnect may include a metal contact (e.g., a copper contact) recessed in a dielectric. In some embodiments, a metal-to-metal interconnect (e.g., a copper-to-copper interconnect) may include a noble metal (e.g., gold) or a metal whose oxides are conductive (e.g., silver). In some embodiments, a metal-to-metal interconnect may include metal nanostructures (e.g., nanorods) that may have a reduced melting point. Metal-to-metal interconnects may be capable of reliably conducting a higher current than other types of interconnects; for example, some solder interconnects may form brittle intermetallic compounds when current flows, and the maximum current provided through such interconnects may be constrained to mitigate mechanical failure.

In some embodiments, the ICs on either side of a set of DTD interconnects may be unpackaged dies, and/or the DTD interconnects may include small conductive bumps or pillars (e.g., copper bumps or pillars) attached to the respective conductive contacts by solder. In some embodiments, some or all of the DTD interconnects may be solder interconnects that include a solder with a higher melting point than a solder included in some or all of the DTPS interconnects. For example, when the DTD interconnects are formed before the DTPS interconnects are formed, solder-based DTD interconnects may use a higher-temperature solder (e.g., with a melting point above 200 degrees Celsius), while the DTPS interconnects may use a lower-temperature solder (e.g., with a melting point below 200 degrees Celsius). In some embodiments, a higher-temperature solder may include tin; tin and gold; or tin, silver, and copper (e.g., 96.5% tin, 3% silver, and 0.5% copper). In some embodiments, a lower-temperature solder may include tin and bismuth (e.g., eutectic tin bismuth) or tin, silver, and bismuth. In some embodiments, a lower-temperature solder may include indium, indium and tin, or gallium.

In some embodiments, a set of DTD interconnects may include solder. DTD interconnects that include solder may include any appropriate solder material, such as any of the materials discussed above for the DTPS interconnects. In some embodiments, a set of DTD interconnects may include an anisotropic conductive material, such as any of the materials discussed above for the DTPS interconnects. In some embodiments, the DTD interconnects may be used as data transfer lanes, while the DTPS interconnects may be used for power and ground lines, among others.

In photonic packages as described herein, some or all of the DTD interconnects may have a finer pitch than the DTPS interconnects. In some embodiments, the DTD interconnects may have too fine a pitch to couple to the package substrate directly (e.g., too fine to serve as DTPS interconnects). The DTD interconnects may have a smaller pitch than the DTPS interconnects due to the greater similarity of materials in the different dies on either side of a set of DTD interconnects than between a die (or PIC) and a package substrate on either side of a set of DTPS interconnects. In particular, the differences in the material composition of ICs and package substrates may result in differential expansion and contraction of the ICs and package substrates due to heat generated during operation (as well as the heat applied during various manufacturing operations). To mitigate damage caused by this differential expansion and contraction (e.g., cracking, solder bridging, etc.), the DTPS interconnects in any of the photonic packages as described herein may be formed larger and farther apart than DTD interconnects, which may experience less thermal stress due to the greater material similarity of the pair of dies on either side of the DTD interconnects.

In some embodiments, conductive metallization lines and optical elements may extend into and out of the plane of the drawing, providing conductive pathways to route electrical and/or optical signals to and/or from various elements in photonic package 100. The conductive vias and/or lines that provide conductive pathways in/on the photonic package 100 may be formed using any suitable techniques. Examples of such techniques may include subtractive fabrication techniques, additive or semi-additive fabrication techniques, single Damascene fabrication techniques, dual Damascene fabrication techniques, or any other suitable techniques. In some embodiments, layers of insulator material, such as a silicon oxide material or a silicon nitride material, may insulate various structures in the conductive pathways from proximate structures, and/or may serve as etch stops during fabrication. In some embodiments, additional layers, such as diffusion barrier layers or/and adhesion layers may be disposed between conductive material and proximate insulating material. Diffusion barrier layers may reduce diffusion of the conductive material into the insulating material. Adhesion layers may improve mechanical adhesion between the conductive material and the insulating material.

In some embodiments, a photonic package 100 may include a redistribution layer (RDL) comprising at least one layer of an insulating material and metallization at the first surface 170-1, at the second surface 170-2, and/or between the first and second surfaces 170-1, 170-2 to enable any desired placement of solder balls with respect to vias and other circuitry of the dies (e.g., bridge die 202, PIC 102, EIC 114, and XPU 118). In a general sense, interconnect structures may be arranged within photonic package 100 to route electrical signals according to a wide variety of designs. During operation of photonic package 100, electrical signals (such as power, input/output (I/O) signals, including various control signals for external and internal control of PIC 102)

may be routed to and/or from PIC 102 through the conductive contacts and conductive pathways of photonic package 100.

The photonic microelectronic assembly 100 of FIG. 1A may also include a TIM 154. The TIM 154 may include a thermally conductive material (e.g., metal particles) in a polymer or other binder. The TIM 154 may be a thermal interface material paste or a thermally conductive epoxy (which may be a fluid when applied and may harden upon curing, as known in the art). The TIM 154 may provide a path for heat generated by the dies (e.g., one or more of the bridge die 202, EIC 114, XPU 118, and PIC 102) to readily flow to the heat transfer structure 156, where it may be spread and/or dissipated. Some embodiments of the photonic microelectronic assembly 100 of FIG. 1A may include a sputtered metallization (not shown) across the top surface of the insulating material 133, EIC 114, and XPU 118; the TIM 154 (e.g., a solder TIM) may be disposed on this metallization.

The photonic microelectronic assembly 100 of FIG. 1A may also include a heat transfer structure 156 on the top surface 170-2 of the multi-layer die subassembly 104 (e.g., on the top surface of EIC 114 and XPU 118). The heat transfer structure 156 may be used to move heat away from one or more of the dies (e.g., one or more of the bridge die 202, EIC 114, XPU 118, and PIC 102), so that the heat may be more readily dissipated. The heat transfer structure 156 may include any suitable thermally conductive material (e.g., metal, appropriate ceramics, etc.), and may include any suitable features (e.g., a heat spreader, a heat sink including fins, a cold plate, an aperture for optical communication to optical components (e.g., optical lens 138), etc.). In some embodiments, a heat transfer structure 156 may be or may include an integrated heat spreader (IHS).

The photonic microelectronic assembly 100 of FIG. 1A may also include a heat transfer structure 155 in the package substrate 124. The heat transfer structure 155 may be used to move heat away from one or more of the dies (e.g., one or more of the bridge die 202, EIC 114, XPU 118, and PIC 102), so that the heat may be more readily dissipated. The heat transfer structure 155 may include any suitable thermally conductive material (e.g., metal, appropriate ceramics, etc.), and may include any suitable features. In some embodiments, a heat transfer structure 155 may be or may include an integrated heat spreader (IHS).

Many of the elements of the photonic package 100 of FIG. 1A are included in other ones of the accompanying drawings; the discussion of these elements is not repeated when discussing these drawings, and any of these elements may take any of the forms disclosed herein. Further, a number of elements are illustrated in FIG. 1A as included in the photonic microelectronic assembly 100, but a number of these elements may not be present in a photonic microelectronic assembly 100. For example, in various embodiments, the bridge die 202, the XPU 118, the TIM 154, the heat transfer structure 156, the heat transfer structure 155, the underfill material 127, and the package substrate 124 may not be included.

FIG. 2 is a side, cross-sectional illustration of a photonic package 100, according to some embodiments of the present disclosure. The photonic package 100 may include a multi-layer die subassembly 104 having an integrated optical component 137 optically coupled to a PIC 102. As shown in FIG. 2, the multi-layer die subassembly 104 may include a first layer 104-1 having a PIC 102, a bridge die 202, and conductive pillars 152 embedded in an insulating material 133, and a second layer 104-2 having an optical component

137 optically coupled to the PIC 102, and an EIC 114 embedded in the insulating material 133. In various embodiments, EIC 114 and/or PIC 102 may include electrical components and circuitry that are equivalents of XPU 118 to allow suitable functionality of PIC 102 in photonic package 100. In other embodiments, PIC 102 and EIC 114 may function suitably without the need for XPU 118 or its equivalents. In particular, the multi-layer die subassembly 104 may include a PIC 102, a bridge die 202, and a conductive pillar 152 in a first layer 104-1 electrically coupled via interconnects 130 to an EIC 114 in a second layer 104-2 on the first layer 104-1, and an optical component 137 extending through the second layer 104-2 and optically coupled to an optical element on an active surface 105 of the PIC 102 (e.g., the active surface 105 of PIC 102 facing towards the second surface 170-2) using any suitable means, such as by optical glue or by oxide-to-oxide bonding. The multi-layer die subassembly 104 may further include an optical lens 138 optically coupled at the top surface (e.g., at the second surface 170-2 of the second layer 104-2) to the optical component 137. In some embodiments, the multi-layer die subassembly 104 may further include an optical surface component 140, having a first end and an opposing second end, optically coupled to the active surface 105 of PIC 102 at the first end and optically coupled to the optical component 137 at the second end. In such embodiments, the optical surface component 140 may include a same material as the optical component 137, or the optical surface component 140 may include a different material than the optical component 137. Examples of such materials include, for example, silicon and oxygen (e.g., in the form of silicon oxide), silicon and nitrogen (e.g., in the form of silicon nitride), optical epoxy, and silicon for certain wavelengths. Although FIG. 2 depicts the optical surface component 140 and the optical component 137 as separate components, in some embodiments, the optical surface component 140 and the optical component 137 are a single component. In some embodiments, the optical surface component 140 and the optical component 137 are optically coupled and configured to function as a solitary optical component. The optical components 140, 137, and 138 may have any suitable dimensions. In some embodiments, the optical components 140, 137, and 138 may have a same cross-sectional size and shape. In some embodiments, the optical components 140, 137, and 138 may have different cross-sectional sizes and shapes. For example, a cross-sectional dimension (e.g., diameter or area) of the optical component 137 may be smaller than a cross-sectional dimension of the optical component 140.

FIG. 3 is a side, cross-sectional illustration of a photonic package 100, according to some embodiments of the present disclosure. The photonic package 100 may include a multi-layer die subassembly 104 having an integrated optical component with defined pathways 131 optically coupled to an active surface 105 of a PIC 102 (e.g., the active surface 105 of PIC 102 facing towards the second surface 170-2). As shown in FIG. 3, the multi-layer die subassembly 104 may include a first layer 104-1 having a PIC 102 and conductive pillars 152 embedded in an insulating material 133, and a second layer 104-2 having an optical component with defined pathways 131 and an EIC 114 embedded in the insulating material 133. In particular, the multi-layer die subassembly 104 may include a PIC 102 and a conductive pillar 152 in a first layer 104-1 electrically coupled via interconnects 130 to an EIC 114 in a second layer 104-2, and an optical component with defined pathways 131 extending through the second layer 104-2 and optically coupled to an optical surface component 140 on PIC 102 (e.g., optical surface component 140 is optically coupled to an optical element on an active surface 105 of the PIC 102 at a first end and optically coupled to the optical component having defined pathways 131 at a second end) using any suitable means, such as by optical glue or by oxide-to-oxide bonding. In some embodiments, the optical surface component 140 and the optical component with defined pathways 131 are a same type of optical components. For example, in some embodiments, the optical surface component 140 and the optical component having defined pathways 131 are optically aligned fiber array blocks, waveguides, laser written waveguides, lens arrays, pass-through structures, or composite optical components (e.g., components with two or more different optical parts, such as, lenses and waveguides or lenses and fiber array), among others. In some embodiments, the optical surface component 140 and the optical component with defined pathways 131 are different types of optical components. For example, in some embodiments, the optical surface component 140 is a glass block and the optical component having defined pathways 131 is a fiber array block, a waveguide, a laser written waveguide, a lens array, a pass-through structure, or a composite optical component, among others. The optical component having defined pathways 131 may be aligned with optical elements in PIC 102 and the optical surface component 140 by, for example, actively aligning optical pathways or attaching a glass block and subsequently creating a laser written waveguide that aligns with optical pathways of PIC 102. Although FIG. 3 depicts the optical surface component 140 and the optical component with defined pathways 131 as separate components, in some embodiments, the optical surface component 140 and the optical component with defined pathways 131 are a single component.

Figure 4:
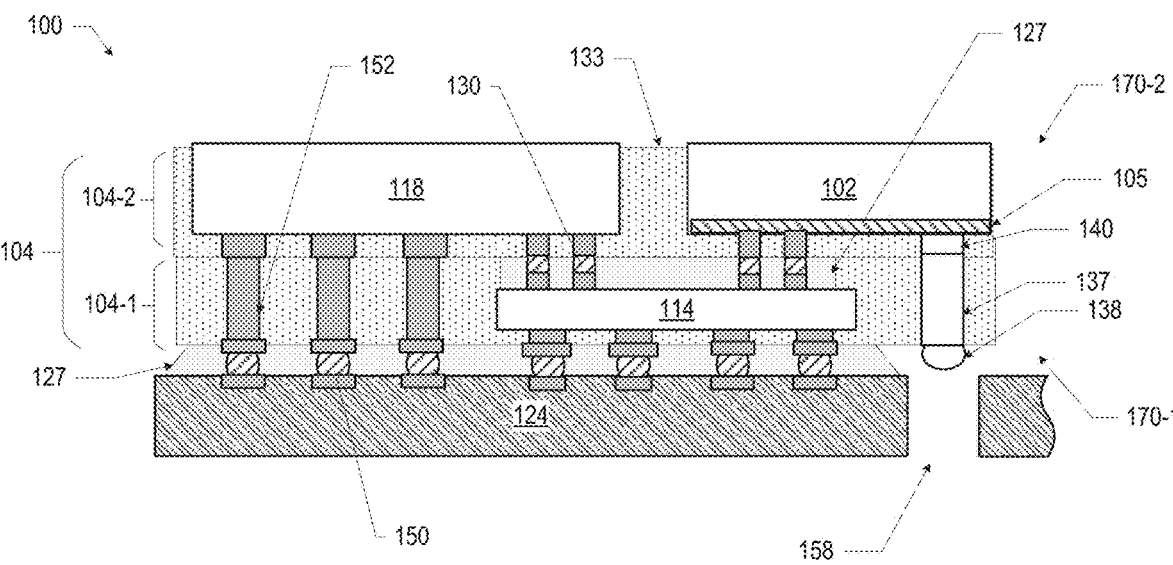
FIG. 4 is a schematic side, cross-sectional view of an example photonic packaging architecture, in accordance with various embodiments.

FIG. 4 is a side, cross-sectional illustration of a photonic package 100, according to some embodiments of the present disclosure. The photonic package 100 may include a multi-layer die subassembly 104 having an integrated optical component 137 optically coupled to a PIC 102. As shown in FIG. 4, the multi-layer die subassembly 104 may include a first layer 104-1 having an EIC 114, conductive pillars 152, and an optical component 137 embedded in an insulating material 133, and a second layer 104-2 having a PIC 102 and an XPU 118 embedded in the insulating material 133. In particular, the multi-layer die subassembly 104 may include a PIC 102 and an XPU 118 in a second layer 104-2 electrically coupled via interconnects 130 to an EIC 114 and conductive pillars 152 in a first layer 104-1, and an optical component 137 extending through the first layer 104-1 and optically coupled to the active side 105 of PIC 102 (e.g., active surface 105 of PIC 102 facing towards the first surface 170-1). The multi-layer die subassembly 104 may further include an optical lens 138 optically coupled at the bottom surface (e.g., at the first surface 170-1) to the optical component 137. As shown in FIG. 4, in some embodiments, the multi-layer die subassembly 104 may further include an optical surface component 140 optically coupled to the second optical component 137 at a first end and optically coupled to the active surface 105 of PIC 102 at an opposing second end. The photonic package 100 may further include a package substrate 124 having an aperture 158 (e.g., a through-hole) for propagating optical signals through the package substrate 124. In some embodiments, optical fiber may be placed within or proximate to the aperture so that optical signals may be exchanged between PIC 102 and the optical fiber. In some embodiments, an underfill material 127 may be included around the interconnects 150. In such embodiments, mechanical and/or chemical barriers (not shown) may be included to prevent the underfill material 127 from contaminating optical lens 138.

Any suitable techniques may be used to manufacture the photonic packages 100 disclosed herein. For example, FIGS. 5A-5F are side, cross-sectional views of various stages in an example process for manufacturing the photonic package 100 of FIG. 1A, in accordance with various embodiments. Although the operations discussed below with reference to FIGS. 5A-5F (and others of the accompanying drawings representing manufacturing processes) are illustrated in a particular order, these operations may be performed in any suitable order. Further, additional operations which are not illustrated may also be performed without departing from the scope of the present disclosure. Also, various ones of the operations discussed herein with respect to FIGS. 5A-5F may be modified in accordance with the present disclosure to fabricate others of photonic package 100 disclosed herein.

Figure 5A:
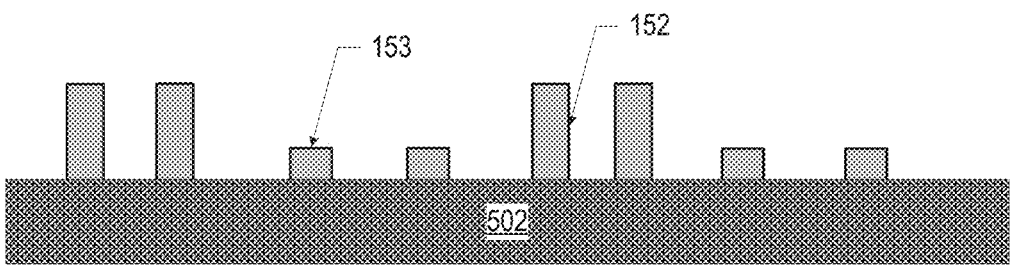
FIGS. 5A-5F are schematic side, cross-sectional views of various stages in an example process for manufacturing the photonic package of FIG. 1A, in accordance with various embodiments.

FIG. 5A illustrates an assembly comprising a carrier 502 plated or otherwise deposited with conductive material, such as copper, to generate traces (not shown), planes (not shown), conductive pillars 152, and short pillars 153. In some embodiments, the metallization may be formed using any known process in the art, including electroplating, photolithography, etc. In some embodiments, the short pillars 153 may be formed on the respective dies (e.g., bridge die 202 and/or PIC 102) and, as such, may be omitted. A carrier 502 may include any suitable material for providing mechanical stability during manufacturing operations, and in some embodiments, may include a semiconductor wafer (e.g., a silicon wafer) or glass (e.g., a glass panel). The conductive pillars 152 and short pillars 153 may be formed using any suitable technique, for example, a lithographic process or an additive process, such as cold spray or 3-dimensional printing. The conductive pillars 152 and short pillars 153 may have any suitable dimensions. In some embodiments, the conductive pillars 152 may span one or more layers. For example, in some embodiments, an individual conductive pillar 152 may have an aspect ratio (height:diameter) between 1:1 and 4:1 (e.g., between 1:1 and 3:1). In some embodiments, an individual conductive pillar 152 may have a diameter (e.g., cross-section) between 10 microns and 1000 microns. For example, an individual conductive pillar 152 may have a diameter between 50 microns and 400 microns. In some embodiments, an individual conductive pillar 152 may have a height (e.g., z-height or thickness) between 50 and 500 microns. The conductive pillars 152 and short pillars 153 may have any suitable cross-sectional shape, for example, square, triangular, and oval, among others.

Figure 5B:
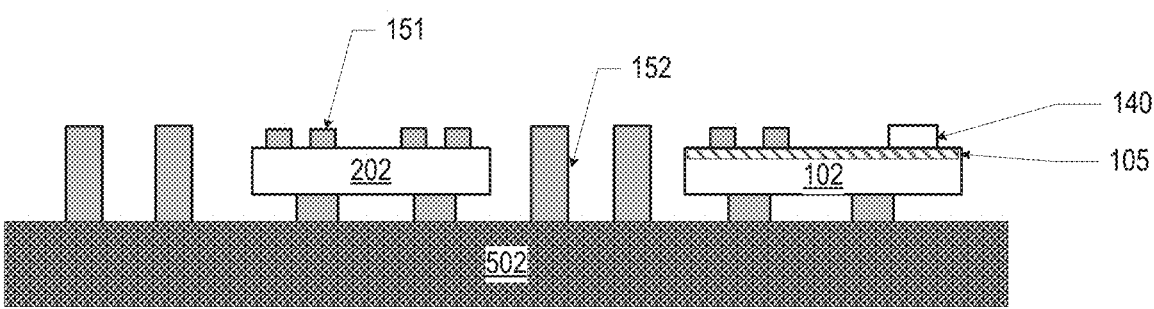

FIG. 5B illustrates an assembly subsequent to placing and attaching bridge die 202 and PIC 102 to short pillars 153. Any suitable method may be used to place bridge die 202 and PIC 102, for example, automated pick-and-place. As shown in FIG. 5B, active side 105 of PIC 102 may be placed facing away from carrier 502 and PIC 102 may include TSVs (not shown) for electrically coupling to the short pillars 153. In some embodiments, optical elements at active side 105 of PIC 102 may be covered by a protective coating (not shown) for various reasons, for example, to prevent any breakage or contamination during the fabrication process, to facilitate optical coupling, or to prevent leakage of optical signals during operation, among others. Additional metal traces and/or small pillars 151 may be formed on the bridge die 202 and PIC 102. In some embodiments, metal traces and/or small pillars 151 may be formed on the bridge die 202 and PIC 102 prior to placing them on the carrier 502. Optical surface component 140 may be optically aligned and optically coupled to optical elements at the active surface 105 of PIC 102 using any suitable technique, such as optical glue or oxide-to-oxide bonding. In some embodiments, optical surface component 140 may be placed on and optically coupled to the active surface 105 of PIC 102 prior to placing PIC 102 on the carrier 502. In some embodiments, optical surface component 140 may be omitted.

Figure 5C:
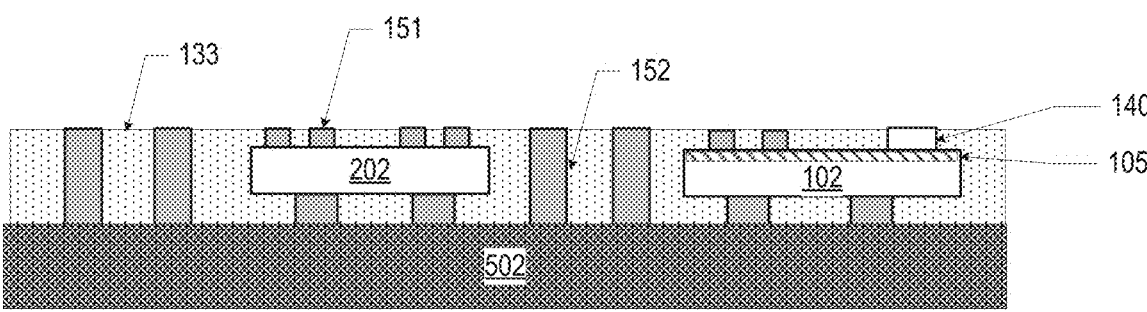

FIG. 5C illustrates an assembly subsequent to depositing an insulating material 133 on and around the bridge die 202, PIC 102, and the conductive pillars 152. The insulating material 133 may be a mold material, such as an organic polymer with inorganic silica particles, or an epoxy material. In some embodiments, the insulating material 133 is a dielectric material. In some embodiments, the dielectric material may include an organic dielectric material, a fire retardant grade 4 material (FR-4), BT resin, polyimide materials, glass reinforced epoxy matrix materials, or low-k and ultra low-k dielectric (e.g., carbon-doped dielectrics, fluorine-doped dielectrics, porous dielectrics, and organic polymeric dielectrics). The insulating material 133 may be formed using any suitable process, including lamination, or slit coating and curing. In some embodiments, the insulating material 133 may be dispensed in liquid form to flow around and conform to various shapes of components and metallization, and, subsequently, may be subjected to a process, for example, curing, that solidifies the insulating material 133. In some embodiments, the insulating material 133 may be initially deposited on and over the top surfaces of the bridge die 202, PIC 102, and the conductive pillars 152, then polished back to expose the top surface of the bridge die 202, PIC 102, and the conductive pillars 152. In such embodiments, the conductive pillars 152 and/or small pillars 151 on the bridge die 202 and PIC 102 may be thinned (e.g., a thickness or z-height may be reduced). If the insulating material 133 is formed to completely cover the bridge die 202, PIC 102, and the conductive pillars 152, the insulating material 133 may be removed using any suitable technique, including grinding, or etching, such as a wet etch, a dry etch (e.g., a plasma etch), a wet blast, or a laser ablation (e.g., using excimer laser). In some embodiments, the thickness of the insulating material 133 may be minimized to reduce the etching time required. In some embodiments, the top surface of the insulating material 133 may be planarized using any suitable process, such as chemical mechanical polishing (CMP). A top surface of the optical surface component 140 may be further subjected to grinding and polishing to form an optically smooth surface. In some embodiments, for example, when the optical surface component 140 is omitted, a top surface of PIC 102 may be subjected to grinding and polishing to form an optically smooth surface subsequent to removing the insulating material 133.

Figure 5D:
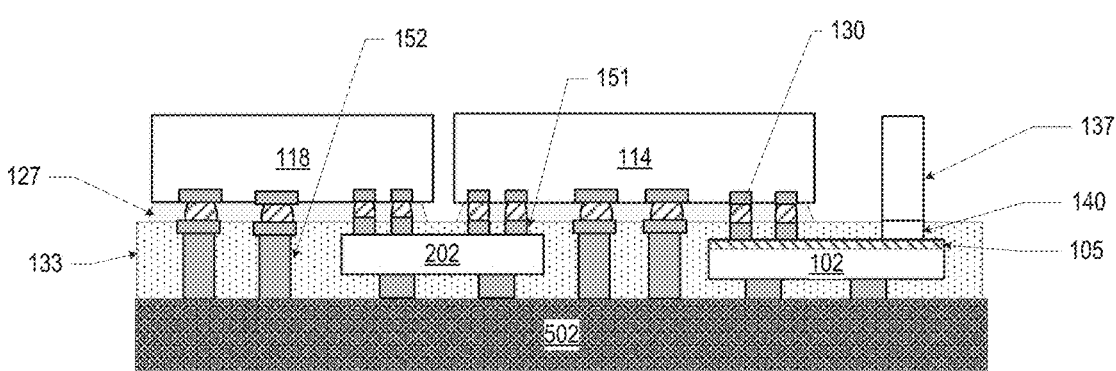

FIG. 5D illustrates an assembly subsequent to optically coupling an optical component 137 to a top surface of the optical surface component 140 on PIC 102 and placing EIC 114 and XPU 118 on, and electrically coupling EIC 114 and XPU 118 to, a top surface of the assembly of FIG. 5C. Optical component 137 may be optically aligned, if necessary, and optically coupled using any suitable technique, such as optical glue or oxide-to-oxide bonding. EIC 114 may be electrically coupled to PIC 102 and bridge die 202 by interconnects 130, small pillars 151, and associated conductive traces, planes, and pads. EIC 114 and XPU 118 also may be electrically coupled with conductive pillars 152 through associated conductive traces, planes, and pads. In some embodiments, interconnects 130 may include solder. In such embodiments, the assembly of FIG. 5D may be subjected to a solder reflow process during which solder components of interconnects 130 melt and bond to mechanically and electrically couple EIC 114 and XPU 118 to the top surface of the assembly of FIG. 5C. In some embodiments, underfill 127 may be dispensed around the interconnects 130. In some embodiments, underfill 127 around interconnects 130 may be omitted.

Figure 5E:
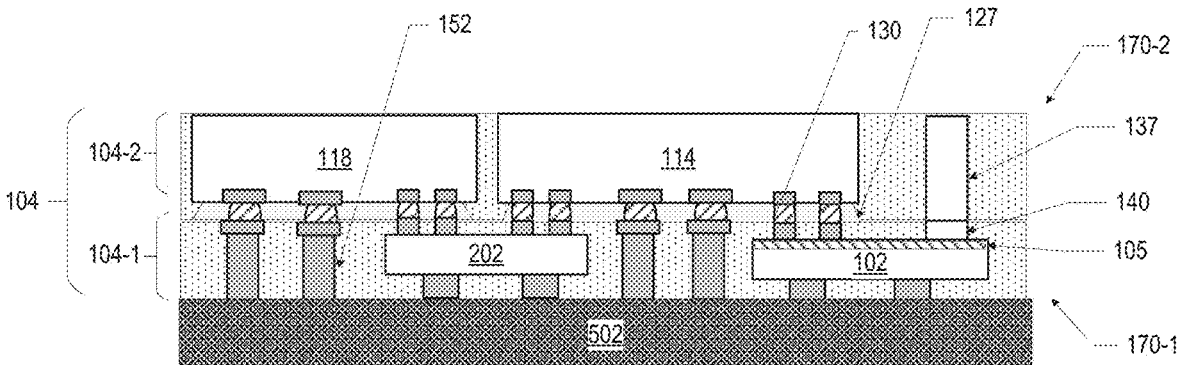

FIG. 5E illustrates an assembly subsequent to depositing an insulating material 133 on and around EIC 114, XPU 118, and the optical component 137 (e.g., on a top surface of the assembly of FIG. 5D), and planarizing the top surface of the insulating material 133. The insulating material 133 may include any suitable material and may be formed using any suitable process, including as described above with reference to FIG. 5C. In some embodiments, the insulating material 133 in the first layer 104-1 (e.g., deposited in FIG. 5C) is different material than the insulating material 133 in the second layer 104-2 (e.g., deposited in FIG. 5E). In some embodiments, the insulating material 133 in the first layer 104-1 (e.g., deposited in FIG. 5C) is a same material as the insulating material 133 in the second layer 104-2 (e.g., deposited in FIG. 5E). A top surface (e.g., at the second surface 170-2) of the optical component 137 may be further subjected to grinding and polishing to form an optically smooth surface. Although FIGS. 5D and 5E illustrate the optical component 137 being optically coupled to PIC 102 prior to depositing the insulating material 133, in some embodiments, the optical component 137 or an optical component assembly (e.g., an assembly including an optical surface component 140, an optical component 137, and/or an optical lens that are optically coupled) may be optically coupled subsequent to deposition of the insulating material 133, where the insulating material 133 is removed by laser drilling, by pre-filling with a sacrificial material, or by other suitable techniques, then the optical component 137 or optical component assembly is attached and optically coupled to PIC 102.

Figure 5F:
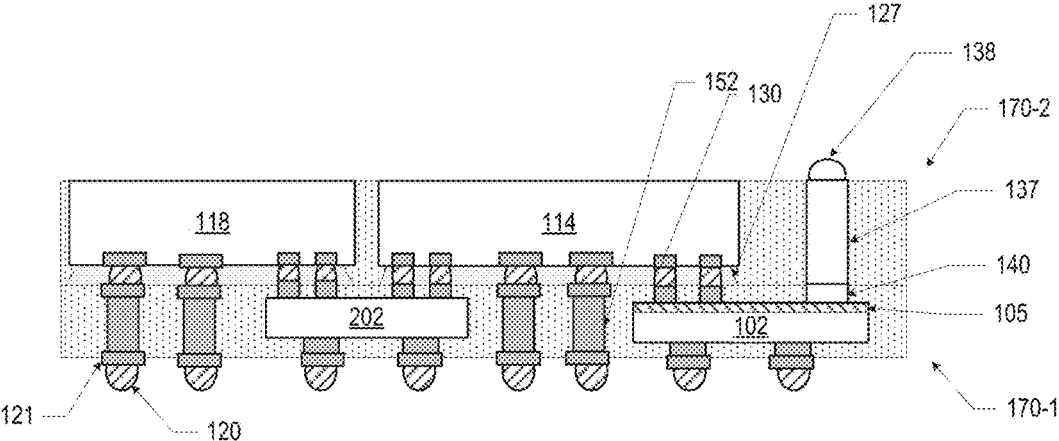

FIG. 5F illustrates an assembly subsequent to optically coupling an optical lens 138 to a top surface (e.g., at the second surface 170-2) of the optical component 137, removing the carrier 502, and performing finishing operations, such as forming conductive contacts 121, depositing solder resist (e.g., a passivation layer)(not shown), and depositing solder 120 on a bottom surface (e.g., at the first surface 170-1) for coupling to a package substrate (e.g., the package substrate 124 of FIG. 1A). The optical lens 138 may be optically aligned, if necessary, and optically coupled using any suitable technique, such as optical glue or oxide-to-oxide bonding. If multiple assemblies are manufactured together, the assemblies may be singulated after removal of the carrier 502. The assembly of FIG. 5F may itself be a photonic package 100, as shown. Further manufacturing operations may be performed on the photonic package 100 of FIG. 5F to form other photonic packages 100; for example, the solder 120 may be used to couple the photonic package 100 of FIG. 5F to a package substrate 124, and a TIM 154 and heat transfer structure 156 may be provided on the top surface of the photonic package 100 of FIG. 5F, similar to the photonic package 100 of FIG. 1A.

Figure 6A:
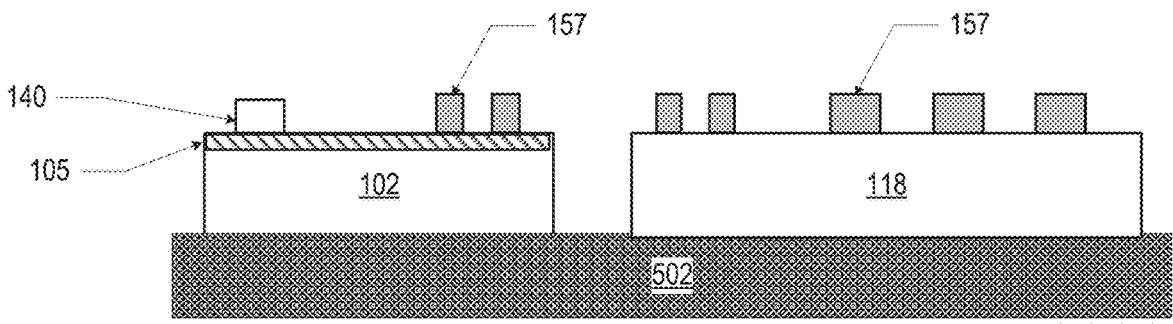
FIGS. 6A-6F are schematic side, cross-sectional views of various stages in an example process for manufacturing the photonic package of FIG. 4, in accordance with various embodiments.

FIGS. 6A-6F are schematic side, cross-sectional views of various stages in an example process for manufacturing the photonic package of FIG. 4, in accordance with various embodiments. FIG. 6A illustrates an assembly subsequent to placing and attaching a PIC 102 and an XPU 118 on a carrier 502. PIC 102 may include an active side 105 with conductive contacts 157 and an optical surface component 140 optically coupled to an optical element at the active surface of PIC 102. XPU 118 may include an active side with conductive contacts 157 and an opposing non-active side (e.g., backside), such that PIC 102 and XPU 118 are single-sided. In some embodiments, PIC 102 and/or XPU 118 may be double-sided (not shown), such that PIC 102 and/or XPU 118 include conductive contacts on both sides and may further include TSVs. PIC 102 and XPU 118 may be placed on the carrier with their respective active sides facing away from the carrier 502. Any suitable method may be used to place PIC 102 and XPU 118, for example, automated pick-and-place. PIC 102 and XPU 118 may be attached to the carrier 502 using any suitable technique, such as die attach film (DAF). In some embodiments, an optical element at the active side 105 of PIC 102 may be covered by a protective coating (not shown). Optical surface component 140 may be optically aligned and optically coupled to an optical element at the active surface 105 of PIC 102 using any suitable technique, such as optical glue or oxide-to-oxide bonding. In some embodiments, optical surface component 140 may be placed on and optically coupled to the active surface 105 of PIC 102 prior to placing PIC 102 on the carrier 502. In some embodiments, optical surface component 140 may be omitted. In some embodiments, conductive contacts 157 may be formed on PIC 102 and XPU 118 subsequent to placing them on the carrier 502.

Figure 6B:
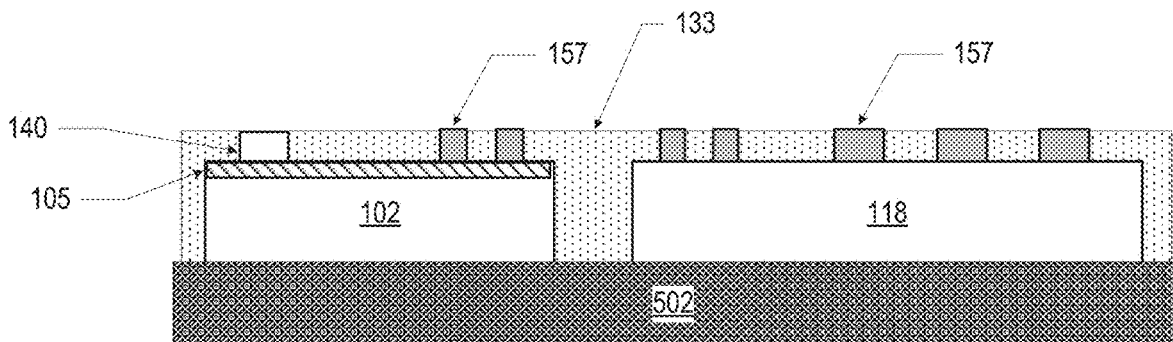

FIG. 6B illustrates an assembly subsequent to depositing an insulating material 133 on and around PIC 102 and XPU 118. The insulating material 133 may be any suitable material and may be formed using any suitable process, as described above with reference to FIG. 5. In some embodiments, the insulating material 133 may be initially deposited on and over the top surfaces of PIC 102 and XPU 118, and then polished back to expose the conductive contacts 157 at the top surfaces and optical surface component 140. The insulating material 133 may be removed using any suitable technique, as described above with reference to FIG. 5. A top surface of the optical surface component 140 may be further subjected to grinding and polishing to form an optically smooth surface. In some embodiments, for example, when the optical surface component 140 is omitted, a top surface of PIC 102 may be subjected to grinding and polishing to form an optically smooth surface subsequent to removing the insulating material 133.

Figure 6C:
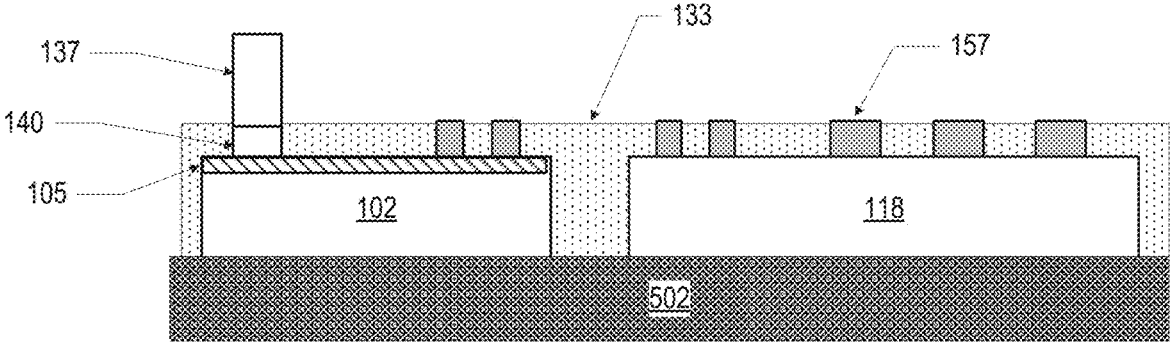

FIG. 6C illustrates an assembly subsequent to optically coupling an optical component 137 to a top surface of the optical surface component 140 on PIC 102. Optical component 137 may be optically aligned, if necessary, and optically coupled using any suitable technique, such as optical glue or oxide-to-oxide bonding.

Figure 6D:
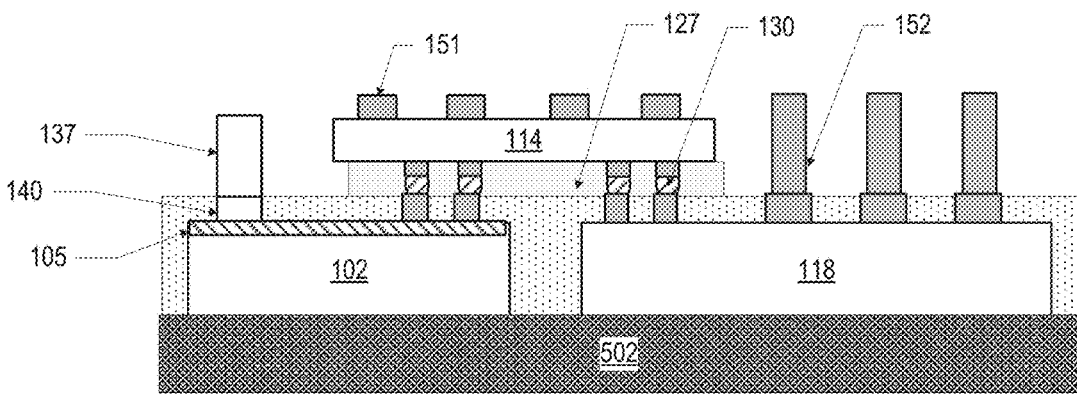

FIG. 6D illustrates an assembly subsequent to forming conductive pillars 152 on a top surface of XPU 118, forming short pillars 151 and/or metal traces on the top surfaces of PIC 102 and XPU 118, if necessary, and placing and electrically coupling EIC 114 to PIC 102 and XPU 118. Any suitable method may be used to place EIC 114, for example, automated pick-and-place. Additional metal traces and/or small pillars 151 may be formed on a top surface of EIC 114. In some embodiments, metal traces and/or small pillars 151 may be formed on EIC 114 prior to placing on the carrier 502. EIC 114 may be electrically coupled to PIC 102 and XPU 118 by interconnects 130, small pillars 151, and associated conductive traces, planes, and pads. In some embodiments, interconnects 130 may include solder. In such embodiments, the assembly of FIG. 6D may be subjected to a solder reflow process during which solder components of interconnects 130 melt and bond to mechanically and electrically couple EIC 114 to the top surface of the assembly of FIG. 6C. In some embodiments, underfill 127 may be dispensed around the interconnects 130. In some embodiments, underfill 127 around interconnects 130 may be omitted.

Figure 6E:
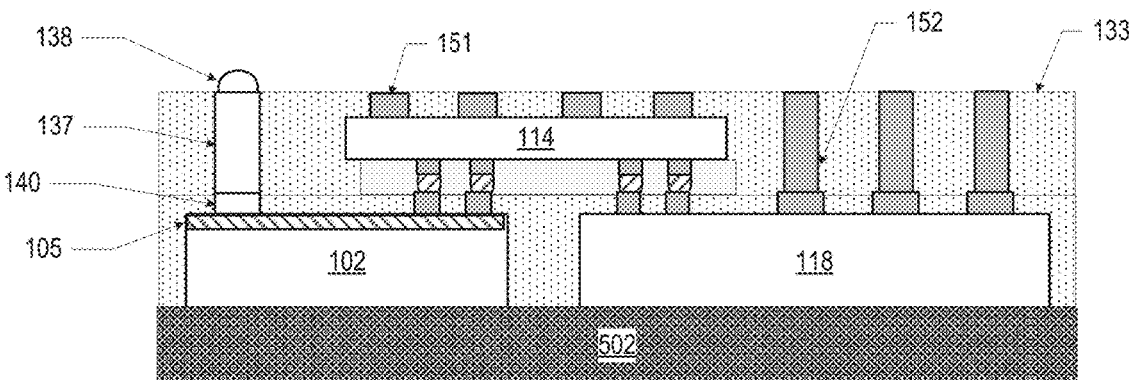

FIG. 6E illustrates an assembly subsequent to depositing an insulating material 133 on and around EIC 114, the conductive pillars 152, and the optical component 137 (e.g., on a top surface of the assembly of FIG. 6D), planarizing the top surface of the insulating material 133, and optically coupling an optical lens 138 to a top surface of the optical component 137. The insulating material 133 may include any suitable material and may be formed using any suitable process, as described above with reference to FIG. 5. A top surface of the optical component 137 may be further subjected to grinding and polishing to form an optically smooth surface prior to coupling the optical lens 138. The optical lens 138 may be optically aligned, if necessary, and optically coupled using any suitable technique, such as optical glue or oxide-to-oxide bonding.

Figure 6F:
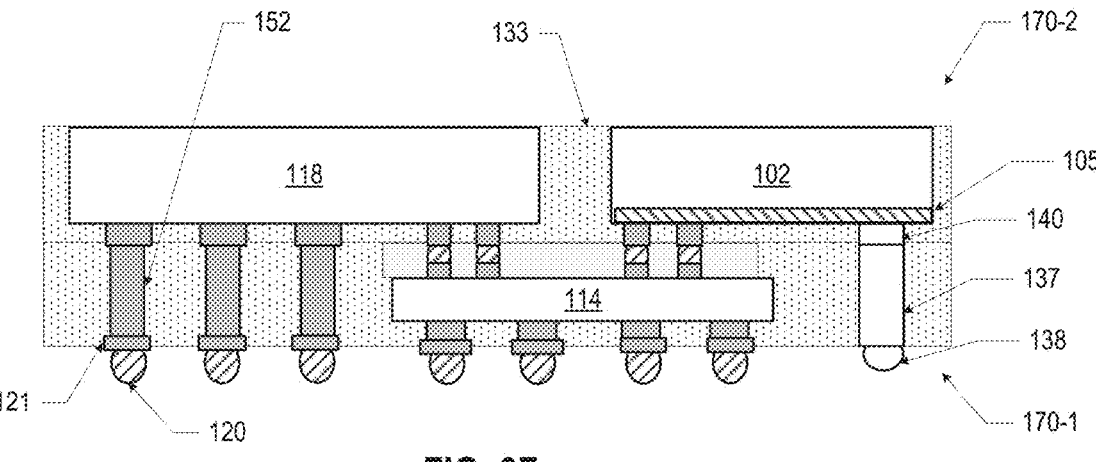

FIG. 6F illustrates an assembly subsequent to removing the carrier 502, inverting the assembly, and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 4). If multiple assemblies are manufactured together, the assemblies may be singulated after removal of the carrier 502. The assembly of FIG. 6F may itself be a photonic package 100, as shown. Further manufacturing operations may be performed on the photonic package 100 of FIG. 6F to form other photonic packages 100; for example, the solder 120 may be used to couple the photonic package 100 of FIG. 6F to a package substrate 124, and a TIM 154 and heat transfer structure 156 may be provided on the top surface (e.g., at the second surface 170-2) of the photonic package 100 of FIG. 6F.

Figure 7:
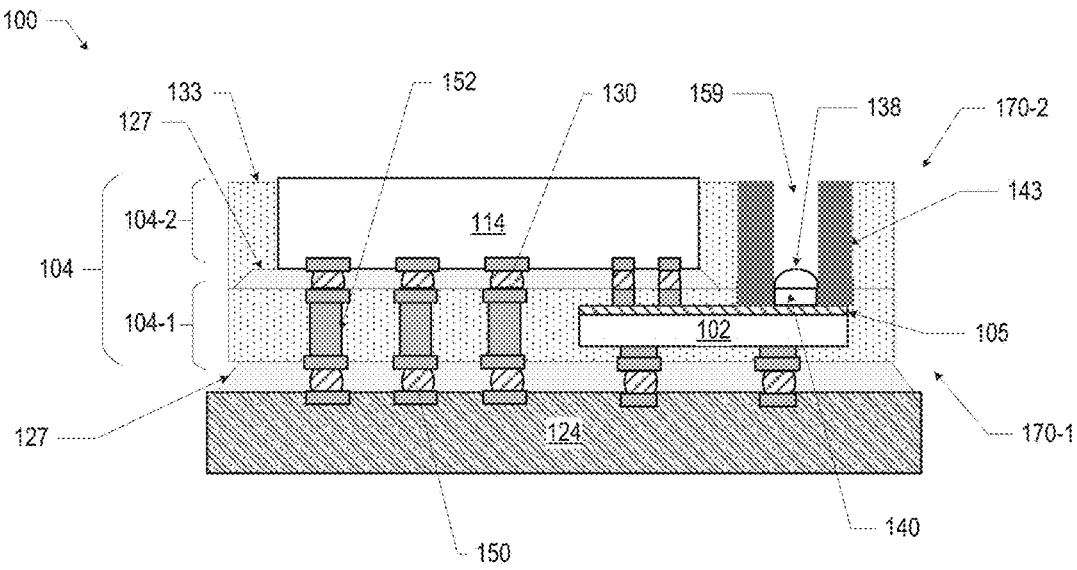
FIG. 7 is a schematic side, cross-sectional view of an example photonic packaging architecture, in accordance with various embodiments.

FIG. 7 is a side, cross-sectional illustration of a photonic package 100, according to some embodiments of the present disclosure. The photonic package 100 may include an optical component optically coupled to an active surface 105 of a PIC 102 and a channel 159 surrounding the optical component and extending from the active surface 105 of PIC 102 through at least a portion of the multi-layer die subassembly 104. As shown in FIG. 7, the multi-layer die subassembly 104 may include a first layer 104-1 having a PIC 102 with an active surface 105 facing up (e.g., the active surface 105 is facing towards a second surface 170-2), an optical component optically coupled to the active surface 105 of PIC 102 (e.g., as shown in FIG. 7, an optical surface component 140 optically coupled to PIC 102 at a first end and optically coupled to an optical lens 138 at an opposing second end), and conductive pillars 152 embedded in an insulating material 133, and a second layer 104-2 having an EIC 114 embedded in the insulating material 133 and a channel 159 surrounding the optical component and extending from the active surface 105 of PIC 102 through the insulating material 133 of the second layer 104-2 (e.g., extending to the second surface 170-2). In some embodiments, the channel 159 may be hollow (e.g., empty and exposed to the surrounding atmospheric air). In some embodiments, the channel 159 may be filled with a material, such as an optical adhesive. In some embodiments, fiber may be placed into the channel 159 so that the fiber is adjacent the optical component. The channel 159 may be formed by a sidewall 143. The sidewall 143 may be formed of any suitable material, including an insulating material, such as described above with reference to insulating material 133 in FIG. 1, silicon, silicon and oxygen (e.g., in the form of silicon oxide), a plastic, a ceramic, a metal, such as copper, steel, a fiber reinforced material, and combinations thereof. The sidewall 143 may be formed to have any suitable cross-section, including, for example, a circle, an oval, a rectangle, or a triangle, among others. In some embodiments, the sidewall 143 may be formed to surround an array of lenses. In such embodiments, the sidewall 143 may form a channel with a plurality of connected openings for optical access to the lenses in the array. In some embodiments, a sidewall 143 may be attached to the active surface of PIC 102 by an adhesive or an optical glue (not shown). In some embodiments, a sidewall 143 may be formed of a same material as the surrounding insulating material 133, such that the sidewall 143 may not appear as a distinct and/or separate structure. In some embodiments, the sidewall 143 may be formed of multiple layers (e.g., as shown in FIG. 9C, a first sidewall 145 and a second sidewall 141 that form sidewall 143). PIC 102 may include TSVs (not shown) for electrically coupling to the package substrate 124 via interconnects 150.

Figure 8:
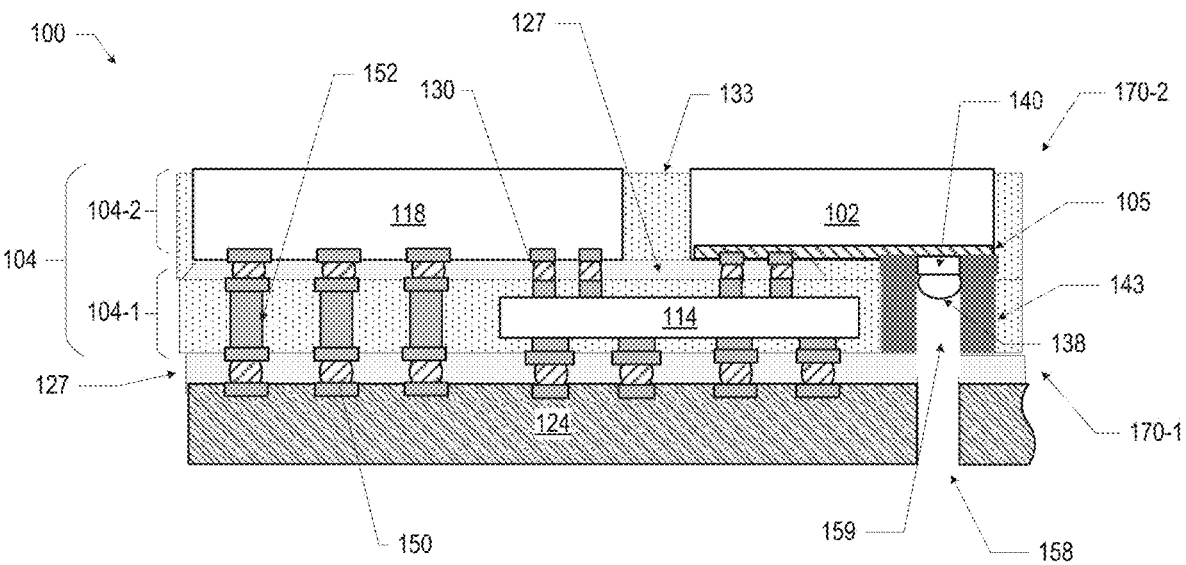
FIG. 8 is a schematic side, cross-sectional view of an example photonic packaging architecture, in accordance with various embodiments.

FIG. 8 is a side, cross-sectional illustration of a photonic package 100, according to some embodiments of the present disclosure. The photonic package 100 may include an optical component optically coupled to an active surface 105 of a PIC 102 and a channel 159 surrounding the optical component and extending from the active surface 105 of PIC 102 through at least a portion of the multi-layer die subassembly 104. As shown in FIG. 8, the multi-layer die subassembly 104 may include a first layer 104-1 having an EIC 114 and conductive pillars 152 embedded in an insulating material 133, and a second layer 104-2 having an XPU 118 and a PIC 102 with an active surface 105 facing down (e.g., the active surface 105 is facing towards a first surface 170-1) embedded in the insulating material 133, and an optical component optically coupled to the active surface 105 of PIC 102 (e.g., as shown in FIG. 8, an optical surface component 140 optically coupled to PIC 102 at a first end and optically coupled to an optical lens 138 at an opposing second end) and a channel 159 surrounding the optical component and extending from the active surface 105 of PIC 102 through the insulating material 133 of the first layer 104-1 (e.g., extending to the first surface 170-1). In some embodiments, the channel 159 may be hollow (e.g., empty and exposed to the surrounding atmospheric air). In some embodiments, the channel 159 may be filled with a material, such as an optical adhesive. In some embodiments, fiber may be placed into the channel 159 via the aperture 158 in the package substrate 124 so that the fiber is adjacent the optical component. The channel 159 may be formed by a sidewall 143. The sidewall 143 may be formed of any suitable material and may have any suitable size and shape, as described above with reference to FIG. 7. In some embodiments, the sidewall 143 may be attached to the active surface 105 of PIC 102 by optical glue (not shown). The photonic package 100 may further include a package substrate 124 having an aperture 158 (e.g., a through-hole) for propagating optical signals through the package substrate 124. In some embodiments, an underfill material 127 may be included around the interconnects 150. In such embodiments, mechanical and/or chemical barriers (not shown) may be included to prevent the underfill material 127 from entering the channel 159 and contaminating optical lens 138.

Figure 9A:
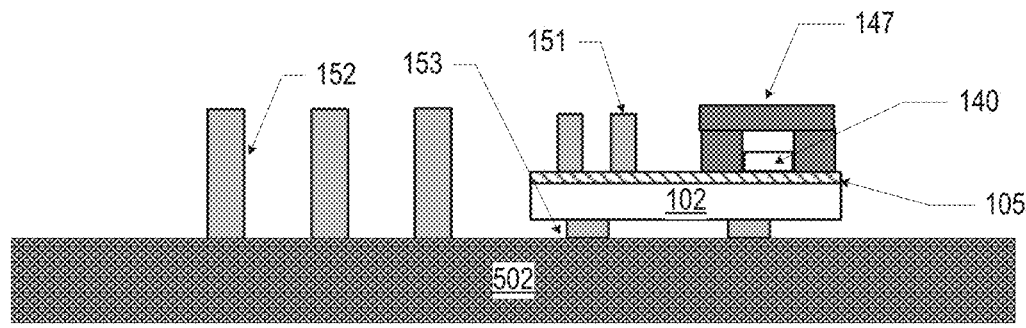
FIGS. 9A-9F are schematic side, cross-sectional views of various stages in an example process for manufacturing the photonic package of FIG. 7, in accordance with various embodiments.
Figure 9B:
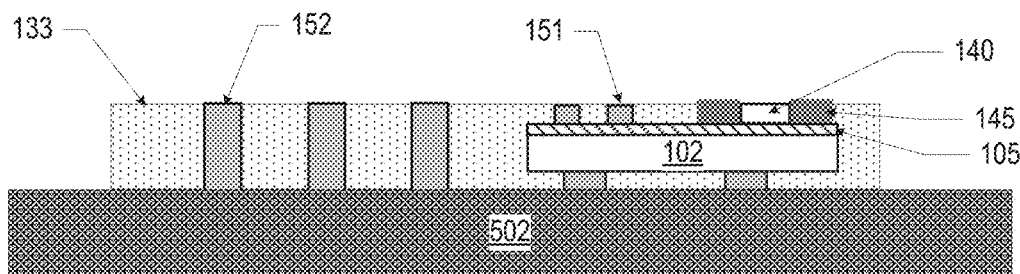
Figure 9C:
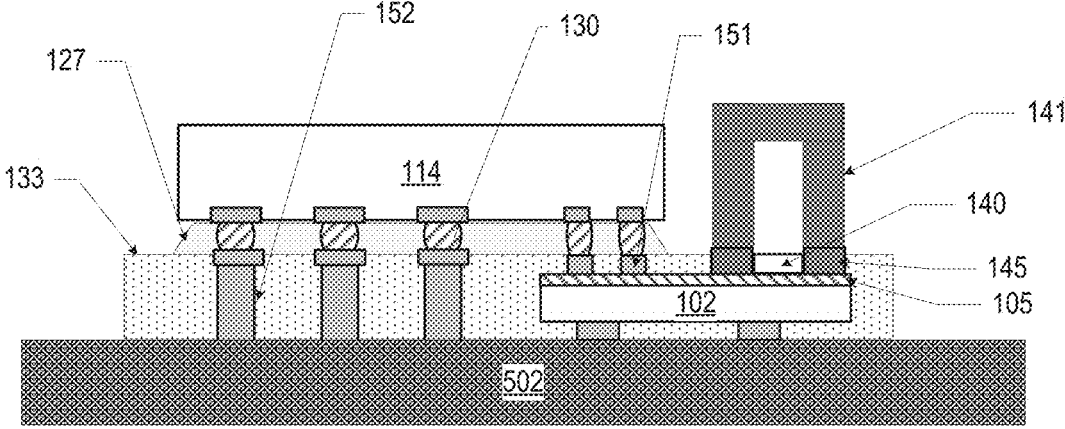

FIGS. 9A-9F are schematic side, cross-sectional views of various stages in an example process for manufacturing the photonic package of FIG. 7, in accordance with various embodiments. FIG. 9A illustrates an assembly subsequent to plating or otherwise depositing conductive material on a carrier 502 to generate traces (not shown), planes (not shown), conductive pillars 152, and short pillars 153, and attaching PIC 102 to the short pillars 153, where PIC 102 includes an optical surface component 140 optically coupled to an active surface 105 and a first lidded channel-forming structure 147 surrounding the optical surface component 140. The conductive pillars 152, short pillars 153, and metallization may be formed using any known process in the art, including as described above with reference to FIG. 5. In some embodiments, the short pillars 153 may be formed on PIC 102 prior to placing on carrier 502 and, as such, may be omitted. Any suitable method may be used to place PIC 102, for example, automated pick-and-place. As shown in FIG. 9A, active side 105 of PIC 102 may be placed facing away from carrier 502 and PIC 102 may include TSVs (not shown) for electrically coupling to the short pillars 153. Additional metal traces and/or small pillars 151 may be formed on PIC 102. In some embodiments, metal traces and/or small pillars 151 may be formed on PIC 102 prior to placing on the carrier 502. In some embodiments, optical elements at active side 105 of PIC 102 may be covered by a protective coating (not shown). Optical surface component 140 may be optically aligned and optically coupled to optical elements at the active surface 105 of PIC 102 using any suitable technique, such as optical glue or oxide-to-oxide bonding. In some embodiments, optical surface component 140 may be placed on and optically coupled to the active surface 105 of PIC 102 prior to placing PIC 102 on the carrier 502. In some embodiments, optical surface component 140 may be omitted. In some embodiments, the first lidded channel-forming structure 147 may be placed or constructed around optical component 140 on the active surface 105 of PIC 102 subsequent to placing PIC 102 on the carrier 502. The first lidded channel-forming structure 147 may be formed of any suitable material, including an insulating material, silicon, silicon and oxygen (e.g., in the form of silicon oxide), a plastic, a ceramic, a metal, steel, a fiber reinforced material, and combinations thereof. The first lidded channel-forming structure 147 may be formed and attached using any suitable technique, including plating, soldering, adhering, or fusion bonding, among others.

FIG. 9B illustrates an assembly subsequent to depositing an insulating material 133 on and around PIC 102 and the conductive pillars 152, and planarizing the top surface of the assembly of FIG. 9A to remove the lid from the first lidded channel-forming structure 147. The planarizing may further decrease a thickness (e.g., z-height) of the sidewall 145 of the first lidded channel-forming structure 147, the conductive pillars 152, the small pillars 151, and/or the insulating material 133. The insulating material 133 may be any suitable material and may be formed using any suitable process, as described above with reference to FIG. 5. The insulating material 133, the conductive material of the conductive pillars 152 and small pillars 151, and the material of the first lidded channel-forming structure 147 may be removed using any suitable technique, including grinding, or etching, such as a wet etch, a dry etch (e.g., a plasma etch), a wet blast, or a laser ablation (e.g., using excimer laser). In some embodiments, the top surface of the insulating material 133 may be further planarized using any suitable process, such as CMP. A top surface of the optical surface component 140 may be further subjected to grinding and polishing to form an optically smooth surface.

FIG. 9C illustrates an assembly subsequent to placing or constructing, on a top surface of the assembly of FIG. 9B, a second lidded channel-forming structure 141 around optical component 140 on the active surface 105 of PIC 102 and electrically coupling EIC 114 to a top surface of the assembly of FIG. 9B. The second lidded channel-forming structure 141 may be formed of any suitable material, including an insulating material, silicon, silicon and oxygen (e.g., in the form of silicon oxide), a plastic, a ceramic, a metal, steel, or a fiber reinforced material, and combinations thereof. The second lidded channel-forming structure 141 may be formed and attached using any suitable technique, including plating, soldering, adhering, or fusion bonding, among others. In some embodiments, a material of the second lidded channel-forming structure 141 is a same material as the first lidded channel-forming structure 147. In some embodiments, a material of the second lidded channel-forming structure 141 is a different material than the first lidded channel-forming structure 147. EIC 114 may be electrically coupled to PIC 102 by interconnects 130, small pillars 151, and associated conductive traces, planes, and pads. EIC 114 also may be electrically coupled with conductive pillars 152 through associated conductive traces, planes, and pads. In some embodiments, underfill 127 may be dispensed around the interconnects 130. In some embodiments, underfill 127 around interconnects 130 may be omitted.

Figure 9D:
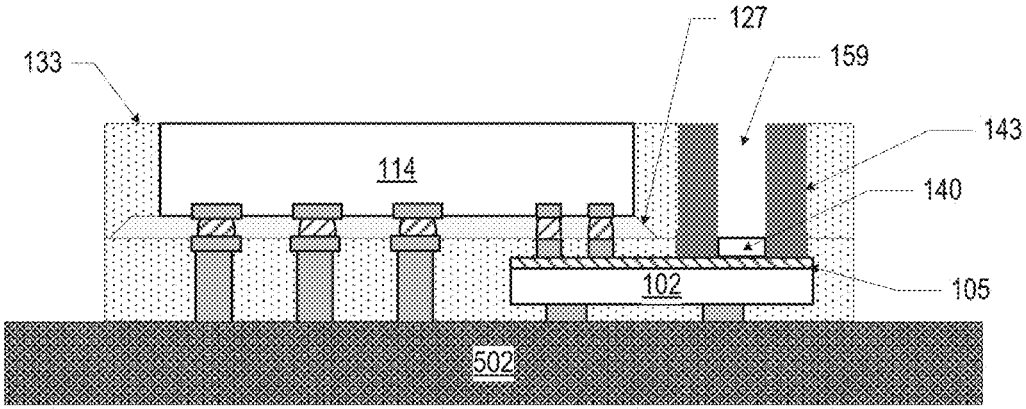

FIG. 9D illustrates an assembly subsequent to depositing an insulating material 133 on and around EIC 114 and the second lidded channel-forming structure 141 (e.g., on a top surface of the assembly of FIG. 9C), planarizing the insulating material 133, and removing the lid from the second lidded channel-forming structure 141 to form a channel 159 with sidewall 143. The insulating material 133 may include any suitable material and may be formed and removed using any suitable process, including as described above with reference to FIG. 5.

Figure 9E:
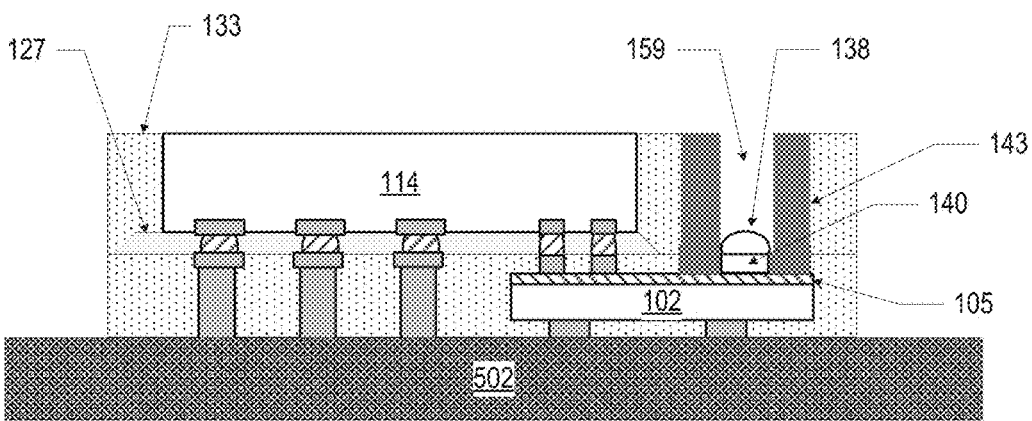

FIG. 9E illustrates an assembly subsequent to optically coupling an optical lens 138 to a top surface of the optical surface component 140 (e.g., via the channel 159). The optical lens 138 may be optically aligned, if necessary, and optically coupled using any suitable technique, such as optical glue or oxide-to-oxide bonding.

Figure 9F:
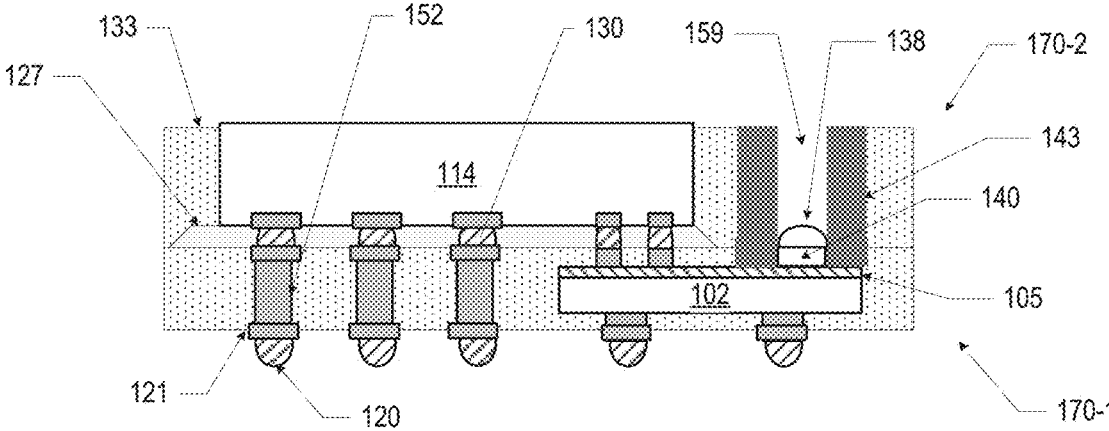

FIG. 9F illustrates an assembly subsequent to removing the carrier 502 and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 7). If multiple assemblies are manufactured together, the assemblies may be singulated after removal of the carrier 502. The assembly of FIG. 9F may itself be a photonic package 100, as shown. Further manufacturing operations may be performed on the photonic package 100 of FIG. 9F to form other photonic packages 100; for example, the solder 120 may be used to couple the photonic package 100 of FIG. 9F to a package substrate 124, and a TIM 154 and heat transfer structure 156 may be provided on the top surface of the photonic package 100 of FIG. 9F.

Figure 10A:
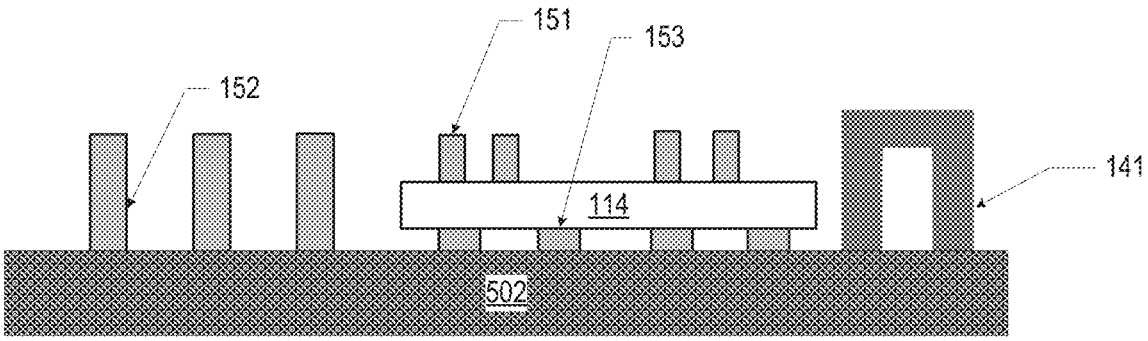
FIGS. 10A-10D are schematic side, cross-sectional views of various stages in an example process for manufacturing the photonic package of FIG. 8, in accordance with various embodiments.

FIGS. 10A-10D are schematic side, cross-sectional views of various stages in an example process for manufacturing the photonic package of FIG. 8, in accordance with various embodiments. FIG. 10A illustrates an assembly subsequent to plating or otherwise depositing conductive material on a carrier 502 to generate traces (not shown), planes (not shown), conductive pillars 152, and short pillars 153, attaching EIC 114 to the short pillars 153, and placing or constructing a lidded channel-forming structure 141 on the carrier 502. The lidded channel-forming structure 141 may be formed of any suitable material, including an insulating material, silicon, silicon and oxygen (e.g., in the form of silicon oxide), a plastic, a ceramic, a metal, steel, a fiber reinforced material, and combinations thereof. The lidded channel-forming structure 141 may be formed and attached using any suitable technique, including plating, soldering, adhering, or fusion bonding, among others. The conductive pillars 152, short pillars 153, and metallization may be formed using any known process in the art, including as described above with reference to FIG. 5. In some embodiments, the short pillars 153 may be formed on EIC 114 prior to placing on carrier 502 and, as such, may be omitted. Any suitable method may be used to place EIC 114, for example, automated pick-and-place. Additional metal traces and/or small pillars 151 may be formed on EIC 114. In some embodiments, metal traces and/or small pillars 151 may be formed on EIC 114 prior to placing on the carrier 502.

Figure 10B:
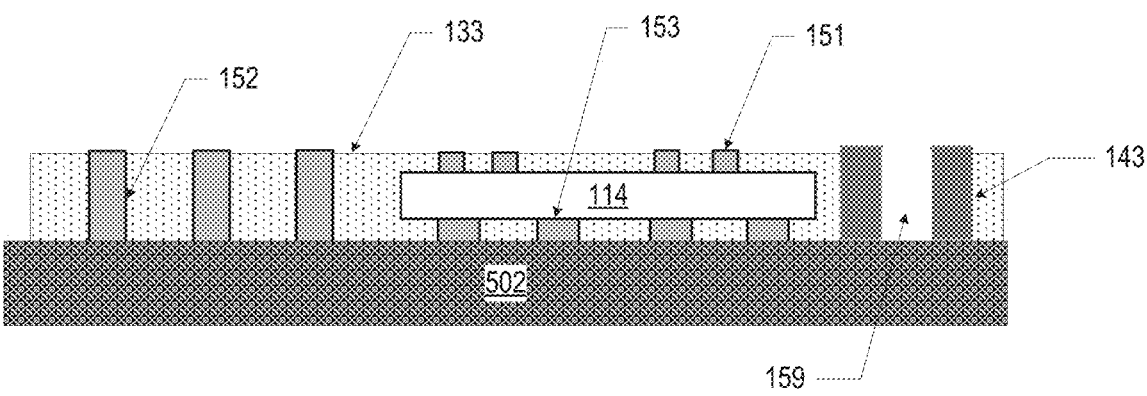

FIG. 10B illustrates an assembly subsequent to depositing an insulating material 133 on and around EIC 114, the conductive pillars 152, and the lidded channel-forming structure 141, and planarizing the top surface to remove the lid from the lidded channel-forming structure 141 to form the channel 159 with a sidewall 143. The planarizing may further decrease a thickness (e.g., z-height) of the sidewall 143 of the channel 159, the conductive pillars 152, the small pillars 151, and/or the insulating material 133. The insulating material 133 may be any suitable material and may be formed using any suitable process, as described above with reference to FIG. 5. The insulating material 133, the conductive material of the conductive pillars 152 and small pillars 151, and the material of the lidded channel-forming structure 141 may be removed using any suitable technique, including CMP, grinding, or etching, such as a wet etch, a dry etch (e.g., a plasma etch), a wet blast, or a laser ablation (e.g., using excimer laser). The top surface of the insulating material 133 may be further planarized using any suitable process, such as CMP.

Figure 10C:
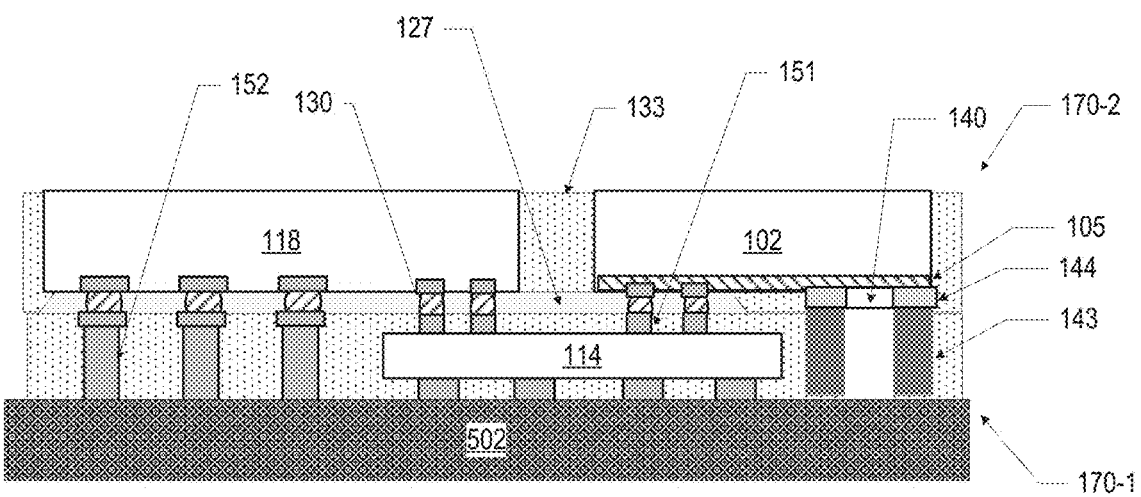

FIG. 10C illustrates an assembly subsequent to placing and attaching PIC 102 and XPU 118 to a top surface of the assembly of FIG. 10B, and depositing an insulating material 133 on and around PIC 102 and XPU 118. PIC 102 may include an optical surface component 140 optically coupled to an optical element on an active surface 105 of PIC 102 and may further include a surface sidewall 144 at the active surface 105 of PIC 102 surrounding the optical surface component 140. The surface sidewall 144 may have a same cross-section shape and size as the sidewall 143, such that, the surface sidewall 144 aligns with sidewall 143 to form a contiguous sidewall extending from the active surface 105 of PIC 102 through the insulating material 133 of the first layer 104-1. The surface sidewall 144 may be formed of any suitable material, including an insulating material, a metal, steel, a fiber reinforced material, and combinations thereof. The surface sidewall 144 may be formed using any suitable technique, including plating, soldering, adhering, or fusion bonding, among others. In some embodiments, a material of the surface sidewall 144 is a same material as a material of the sidewall 143. In some embodiments, a material of the surface sidewall 144 is a different material than a material of the sidewall 143. Optical surface component 140 may be optically aligned and optically coupled to optical elements at the active surface 105 of PIC 102 using any suitable technique, such as optical glue or oxide-to-oxide bonding. In some embodiments, optical surface component 140 may be omitted. In some embodiments, an oxide layer may be deposited on the optical elements at the active side 105 of PIC 102. Any suitable method may be used to place PIC 102 and XPU 118, for example, automated pick-and-place. As shown in FIG. 10C, active side 105 of PIC 102 may be placed facing towards carrier 502 (e.g., towards a first surface 170-1). In some embodiments, optical elements at the active side 105 of PIC 102 may be covered by a protective coating (not shown). PIC 102 and XPU 118 may be electrically coupled to EIC 114 by interconnects 130, small pillars 151, and associated conductive traces, planes, and pads. XPU 118 also may be electrically coupled with conductive pillars 152 through associated conductive traces, planes, and pads. In some embodiments, underfill 127 may be dispensed around the interconnects 130. In some embodiments, underfill 127 around interconnects 130 may be omitted. The insulating material 133 may be any suitable material and may be formed and removed using any suitable process, as described above with reference to FIG. 5.

Figure 10D:
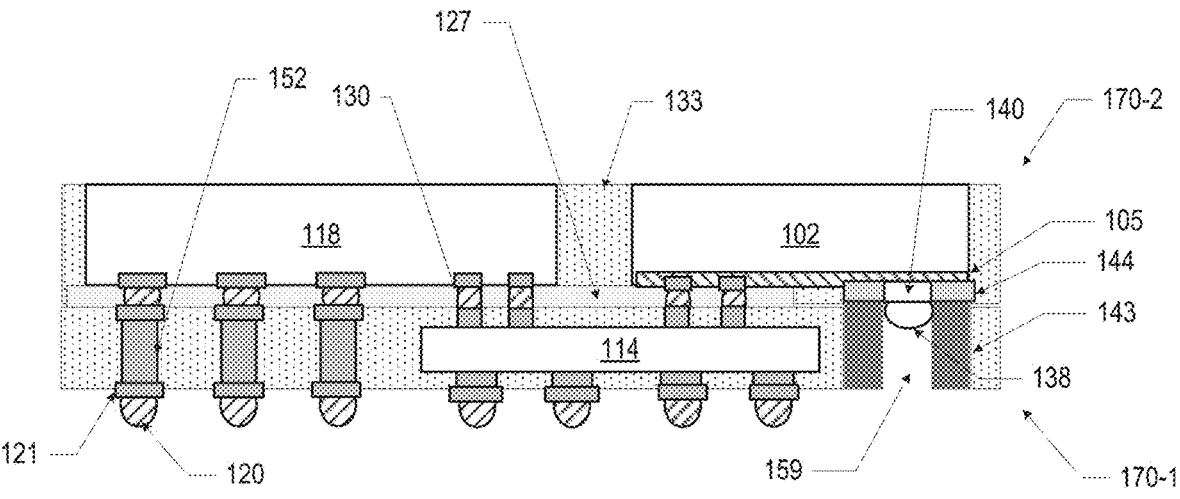

FIG. 10D illustrates an assembly subsequent to removing the carrier 502, optically coupling an optical lens 138 to a bottom surface of the optical surface component 140, and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 8). The optical lens 138 may be optically aligned, if necessary, and optically coupled, via the channel 159, using any suitable technique, such as optical glue or oxide-to-oxide bonding. If multiple assemblies are manufactured together, the assemblies may be singulated after removal of the carrier 502. The assembly of FIG. 10D may itself be a photonic package 100, as shown. Further manufacturing operations may be performed on the photonic package 100 of FIG. 10D to form other photonic packages 100; for example, the solder 120 may be used to couple the photonic package 100 of FIG. 10D to a package substrate 124, and a TIM 154 and heat transfer structure 156 may be provided on the top surface of the photonic package 100 of FIG. 10D.

Figure 11:
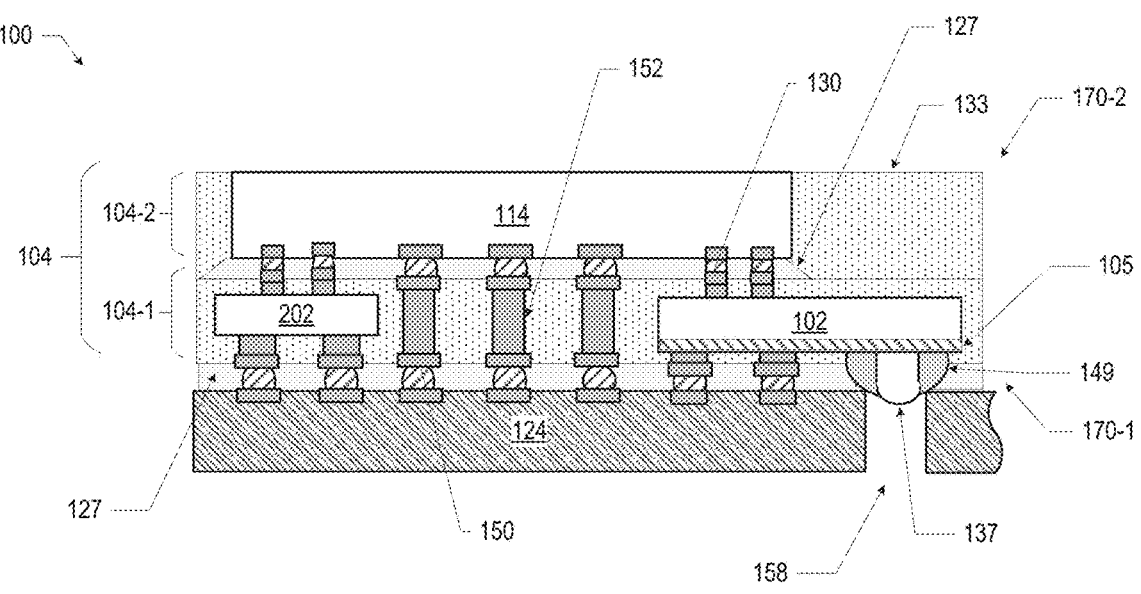
FIG. 11 is a schematic side, cross-sectional view of an example photonic packaging architecture, in accordance with various embodiments.

FIG. 11 is a side, cross-sectional illustration of a photonic package 100, according to some embodiments of the present disclosure. The photonic package 100 may include a package substrate 124 with an aperture 158 electrically coupled by interconnects 150 to a multi-layer die subassembly 104 having a PIC 102 with an optical component 137 optically coupled to an active surface 105 of PIC 102 facing the package substrate 124 and extending downward towards the aperture 158 in the package substrate 124. In particular, the multi-layer die subassembly 104 may be electrically coupled by interconnects 150 at a first surface 170-1 to a package substrate 124 having an aperture 158, where the multi-layer die subassembly 104 may include a PIC 102 with an active surface facing towards the first surface 170-1, a bridge die 202, and a conductive pillar 152 in a first layer 104-1 electrically coupled via interconnects 130 to an EIC 114 in a second layer 104-2, and an optical component 137 optically coupled to an optical element on an active surface 105 of the PIC 102 and extending downward from PIC 102 toward the aperture 158. In some embodiments, the optical component 137 may extend at least partially into the aperture 158. In some embodiments, the optical component 137 may not extend into the aperture 158. In some embodiments, the optical component 137 may be surrounded by optical glue 149, or other protective material, to protect the optical component 137 for damage and provide a contact surface for the package substrate 124. The optical component 137 may be optically coupled to optical elements at the active surface 105 of PIC 102 using any suitable means, such as by optical glue or by oxide-to-oxide bonding. Although FIG. 11 depicts the optical component 137 as a single component, in some embodiments, the optical component 137 may include two or more components that are optically coupled. PIC 102 may include TSVs (not shown) for electrically coupling to EIC 114.

Figure 12A:
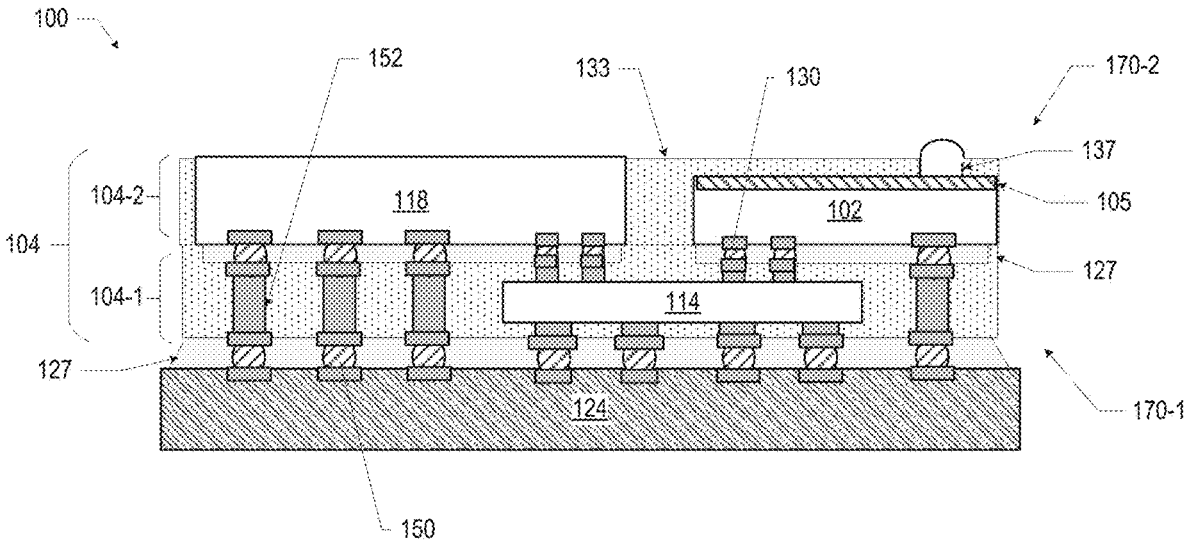
FIGS. 12A and 12B are schematic side, cross-sectional views of example photonic packaging architectures, in accordance with various embodiments.

FIG. 12A is a side, cross-sectional illustration of a photonic package 100, according to some embodiments of the present disclosure. The photonic package 100 may include a multi-layer die subassembly 104 having an integrated optical component 137 optically coupled to a PIC 102. As shown in FIG. 12A, the multi-layer die subassembly 104 may include a first layer 104-1 having an EIC 114 and conductive pillars 152 embedded in an insulating material 133, and a second layer 104-2 having an XPU 118 and PIC 102 embedded in the insulating material 133, and an optical component 137 optically coupled to a top surface (e.g., an active surface 105) of PIC 102 and extending at least partially through the insulating material 133 of the second layer 104-2. In particular, the multi-layer die subassembly 104 may include a PIC 102 and an XPU 118 in a second layer 104-2 electrically coupled via interconnects 130 to an EIC 114 and conductive pillars 152 in a first layer 104-1, and an optical component 137 optically coupled to the active side 105 of PIC 102 (e.g., active surface 105 of PIC 102 facing towards the second surface 170-2). The optical component 137 may be optically coupled to optical elements at the active surface 105 of PIC 102 using any suitable means, such as by optical glue or by oxide-to-oxide bonding. Although FIG. 12A depicts the optical component 137 as a single component, in some embodiments, the optical component 137 may include two or more components that are optically coupled. PIC 102 may include TSVs (not shown) for electrically coupling to EIC 114.

Figure 12B:
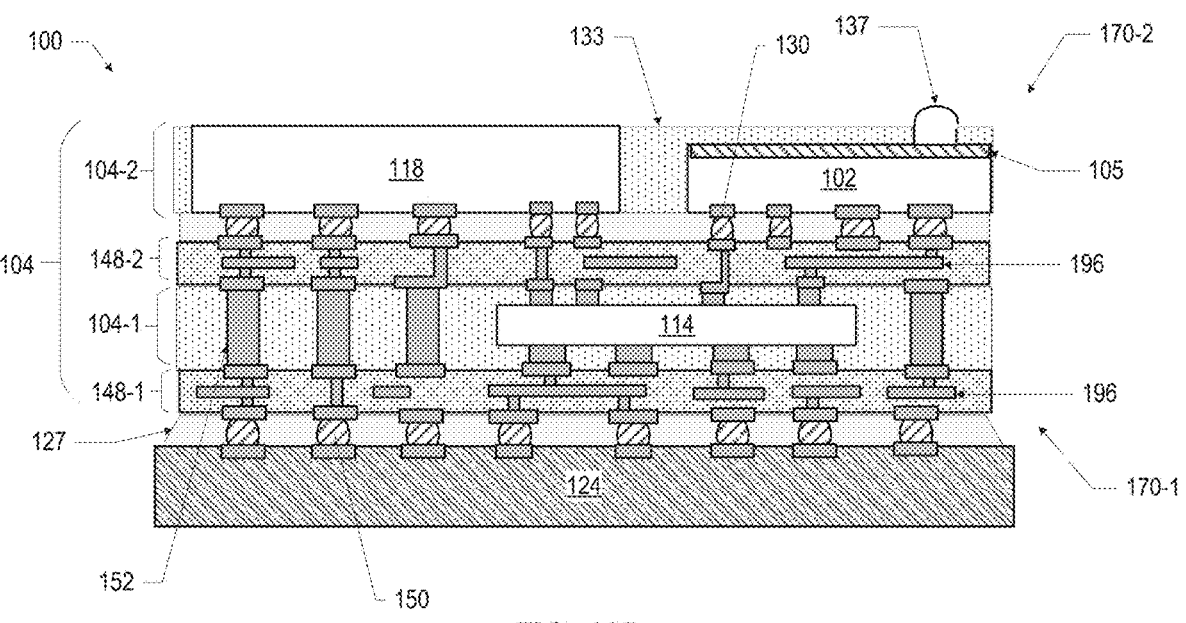

FIG. 12B is a side, cross-sectional illustration of a photonic package 100, according to some embodiments of the present disclosure. FIG. 12B illustrates the photonic package 100 of FIG. 12A including a first RDL 148-1 at the first surface 170-1 and a second RDL 148-2 between the first layer 104-1 and the second layer 104-2 of the multi-layer die subassembly 104. The first and second RDLs 148-1, 148-2 may include conductive pathways 196 through a dielectric material, as is known in the art. The first and second RDLs 148-1, 148-2 may be manufactured using any suitable technique, such as a PCB technique or a redistribution layer technique. In some embodiments, the RDL 148 may include an oxide material, such as silicon and oxygen (e.g., in the form of silicon oxide), a nitride material, such as or silicon and nitrogen (e.g., in the form of silicon nitride), or an organic material. Although FIG. 12B shows a photonic package 100 including a two RDLs 148 (e.g., first RDL 148-1 and second RDL 148-2), a photonic package 100 may include any number and arrangement of RDLs 148. PIC 102 may include TSVs (not shown) for electrically coupling to EIC 114 via the second RDL 148-2.

Figure 13A:
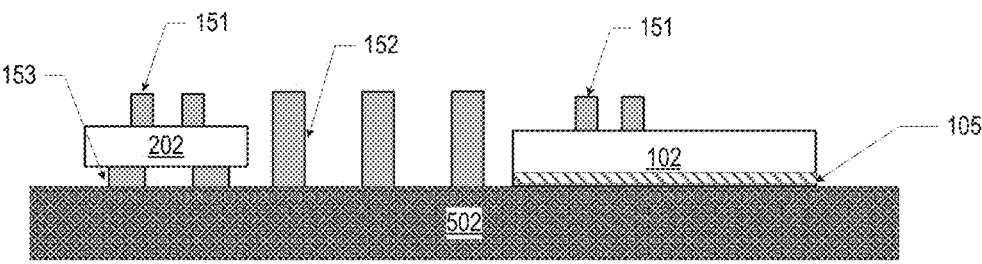
FIGS. 13A-13D are schematic side, cross-sectional views of various stages in an example process for manufacturing the photonic package of FIG. 11, in accordance with various embodiments.

FIGS. 13A-13D are schematic side, cross-sectional views of various stages in an example process for manufacturing the photonic package of FIG. 11, in accordance with various embodiments. FIG. 13A illustrates an assembly comprising a carrier 502 plated or otherwise deposited with conductive material, such as copper, to generate traces (not shown), planes (not shown), conductive pillars 152, and short pillars 153, placing and attaching bridge die 202 to short pillars 153, and attaching PIC 102 to carrier 502. Any suitable method may be used to place bridge die 202 and PIC 102, for example, automated pick-and-place. As shown in FIG. 13A, active side 105 of PIC 102 may be placed facing towards carrier 502. In some embodiments, optical elements at active side 105 of PIC 102 may be covered by a protective coating (not shown) for various reasons, for example, to prevent any breakage or contamination during the fabrication process, to facilitate optical coupling, or to prevent leakage of optical signals during operation, among others. Additional metal traces and/or small pillars 151 may be formed on the bridge die 202 and PIC 102. PIC 102 may include TSVs (not shown) for electrically coupling to the small pillars 151. In some embodiments, metal traces and/or small pillars 151 may be formed on the bridge die 202 and PIC 102 prior to placing them on the carrier 502. In some embodiments, the short pillars 153 may be formed on the bridge die 202 and, as such, may be omitted. The metallization, the small pillars 151, the conductive pillars 152, and the short pillars 153 may be formed using any suitable technique, for example, as described above with reference to FIG. 5.

Figure 13B:
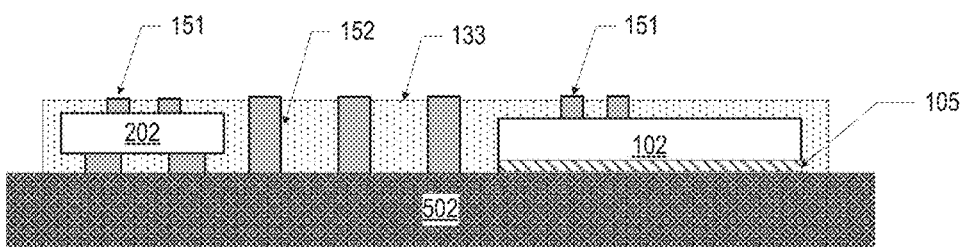

FIG. 13B illustrates an assembly subsequent to depositing an insulating material 133 on and around the bridge die 202, PIC 102, and the conductive pillars 152, and planarizing the top surface to decrease a thickness (e.g., z-height) of the conductive pillars 152, the small pillars 151, and/or the insulating material 133. The insulating material 133 may be any suitable material and may be formed using any suitable process, as described above with reference to FIG. 5. The insulating material 133 and the conductive material of the conductive pillars 152 and small pillars 151 may be removed using any suitable technique, including grinding, or etching, such as a wet etch, a dry etch (e.g., a plasma etch), a wet blast, a laser ablation (e.g., using excimer laser), or CMP.

Figure 13C:
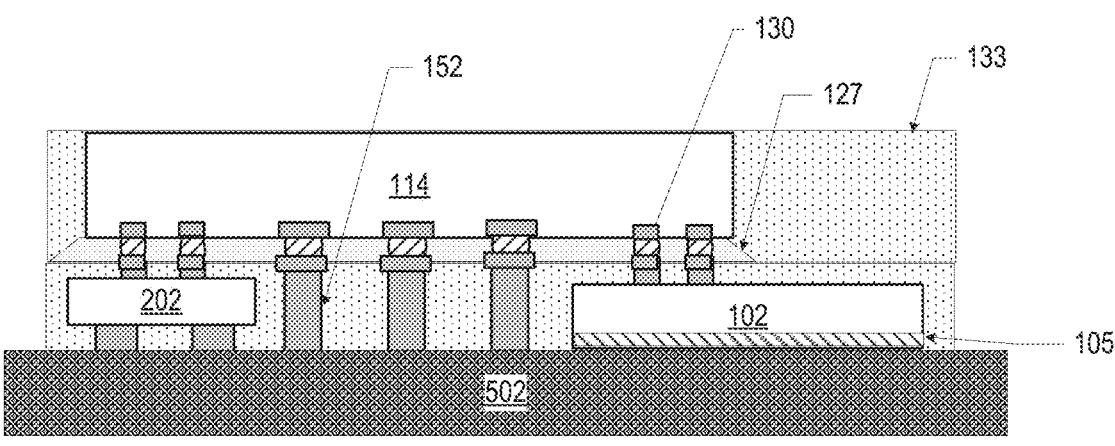

FIG. 13C illustrates an assembly subsequent to placing EIC 114 on, and electrically coupling EIC 114 to, a top surface of the assembly of FIG. 13B, depositing an insulating material 133 on and around EIC 114, and planarizing the top surface of the insulating material 133. EIC 114 may be electrically coupled to PIC 102 and bridge die 202 by interconnects 130, small pillars 151, and associated conductive traces, planes, and pads. EIC 114 also may be electrically coupled with conductive pillars 152 through associated conductive traces, planes, and pads. In some embodiments, interconnects 130 may include solder. In such embodiments, the assembly of FIG. 13C may be subjected to a solder reflow process during which solder components of interconnects 130 melt and bond to mechanically and electrically couple EIC 114 to the top surface of the assembly of FIG. 13B. In some embodiments, underfill 127 may be dispensed around the interconnects 130. In some embodiments, underfill 127 around interconnects 130 may be omitted. The insulating material 133 may include any suitable material and may be formed and remove using any suitable process, including as described above with reference to FIG. 5.

Figure 13D:
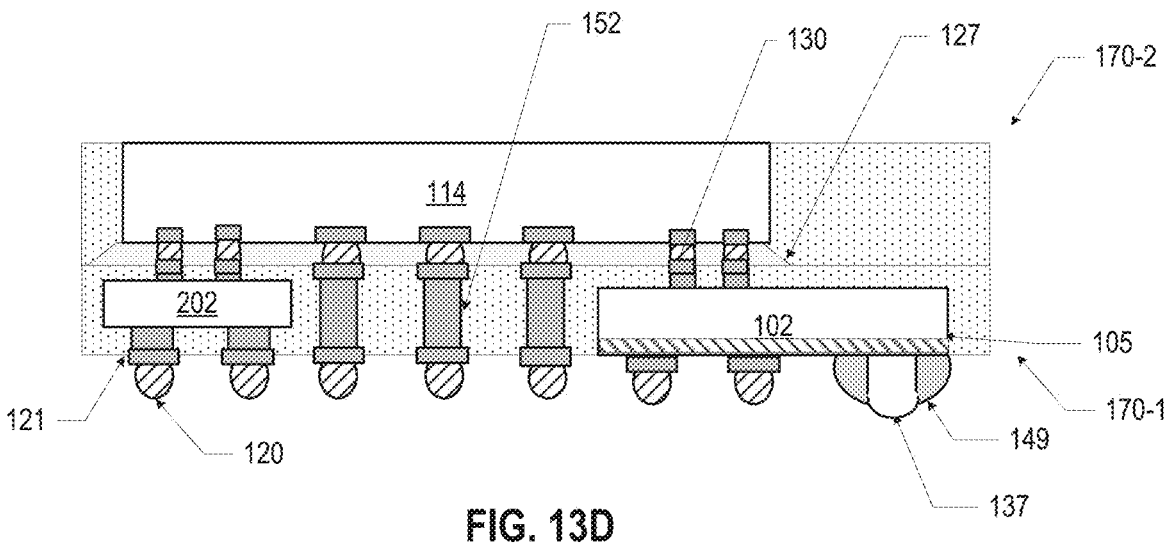

FIG. 13D illustrates an assembly subsequent to removing carrier 502, optically coupling an optical component 137 to the active surface 105 (e.g., at the first surface 170-1) of PIC 102, and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 11). The active surface 105 of PIC 102 may be further subjected to grinding and polishing to form an optically smooth surface for optically coupling the optical component 137. The optical component 137 may be optically aligned, if necessary, and optically coupled to optical elements at the active surface 105 of PIC 102 using any suitable technique, such as optical glue or oxide-to-oxide bonding. In some embodiments, an optical glue 149 or other protective material or mechanical structure, such as a hollow ring, a trench in silicon, or a hydrophilic chemical barrier, may be deposited around the optical component 137 to prevent breakage during the fabrication process, to prevent contamination of the optical component 137 by underfill 127 during attachment to the package substrate 124, to facilitate optical coupling, or to prevent leakage of optical signals during operation, among others. If multiple assemblies are manufactured together, the assemblies may be singulated after removal of the carrier 502. The assembly of FIG. 13D may itself be a photonic package 100, as shown. Further manufacturing operations may be performed on the photonic package 100 of FIG. 13D to form other photonic packages 100; for example, the solder 120 may be used to couple the photonic package 100 of FIG. 13D to a package substrate 124 having an aperture 158, and a TIM 154 and heat transfer structure 156 may be provided on the top surface of the photonic package 100 of FIG. 13D.

Figure 14A:
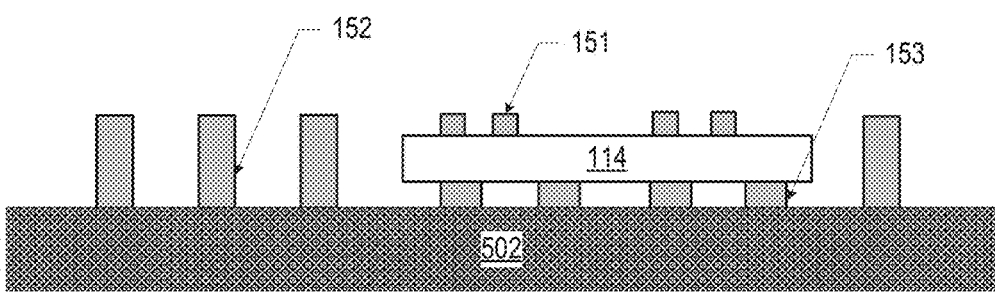
FIGS. 14A-14E are schematic side, cross-sectional views of various stages in an example process for manufacturing the photonic package of FIG. 12A, in accordance with various embodiments.

FIGS. 14A-14E are schematic side, cross-sectional views of various stages in an example process for manufacturing the photonic package of FIG. 12A, in accordance with various embodiments. FIG. 14A illustrates an assembly subsequent to plating or otherwise depositing conductive material on a carrier 502 to generate traces (not shown), planes (not shown), conductive pillars 152, and short pillars 153 on carrier 502 and attaching EIC 114 to the short pillars 153. The conductive pillars 152, short pillars 153, and metallization may be formed using any known process in the art, including as described above with reference to FIG. 5. In some embodiments, the short pillars 153 may be formed on EIC 114 prior to placing on carrier 502 and, as such, may be omitted. Any suitable method may be used to place EIC 114, for example, automated pick-and-place. Additional metal traces and/or small pillars 151 may be formed on EIC 114. In some embodiments, metal traces and/or small pillars 151 may be formed on EIC 114 prior to placing on the carrier 502.

Figure 14B:
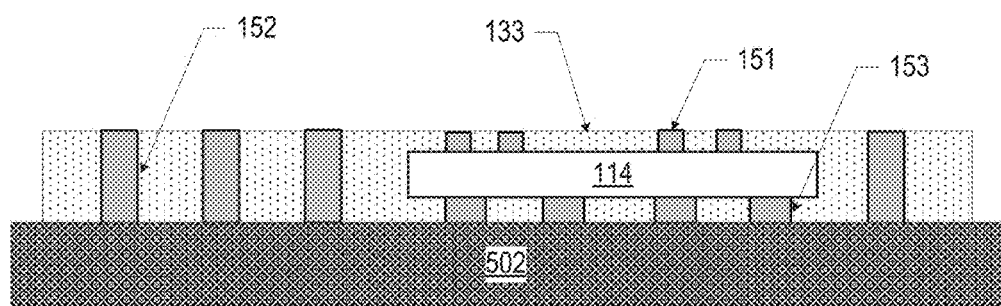

FIG. 14B illustrates an assembly subsequent to depositing an insulating material 133 on and around EIC 114 and the conductive pillars 152, and planarizing the top surface to decrease a thickness of the conductive pillars 152, the small pillars 151, and/or the insulating material 133. The insulating material 133 may be any suitable material and may be formed and removed using any suitable process, as described above with reference to FIG. 5.

Figure 14C:
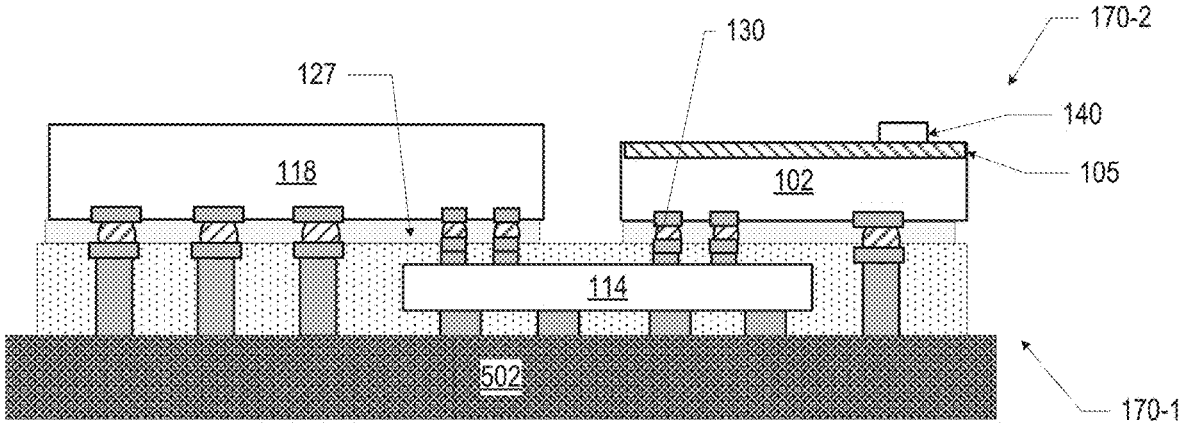

FIG. 14C illustrates an assembly subsequent to placing and attaching PIC 102 and XPU 118 to a top surface of the assembly of FIG. 14B. PIC 102 may include an optical surface component 140 optically coupled to an optical element on an active surface 105 of PIC 102. Optical surface component 140 may be optically aligned and optically coupled to optical elements at the active surface 105 of PIC 102 using any suitable technique, such as optical glue or oxide-to-oxide bonding. In some embodiments, optical surface component 140 may be omitted. In some embodiments, an oxide layer may be deposited on the optical elements at the active side 105 of PIC 102. Any suitable method may be used to place PIC 102 and XPU 118, for example, automated pick-and-place. As shown in FIG. 14C, active side 105 of PIC 102 may be placed facing away from carrier 502 (e.g., towards a second surface 170-2). In some embodiments, optical elements at the active side 105 of PIC 102 may be covered by a protective coating (not shown). PIC 102 and XPU 118 may be electrically coupled to EIC 114 by interconnects 130, small pillars 151, and associated conductive traces, planes, and pads. XPU 118 also may be electrically coupled with conductive pillars 152 through associated conductive traces, planes, and pads. In some embodiments, underfill 127 may be dispensed around the interconnects 130. In some embodiments, underfill 127 around interconnects 130 may be omitted.

Figure 14D:
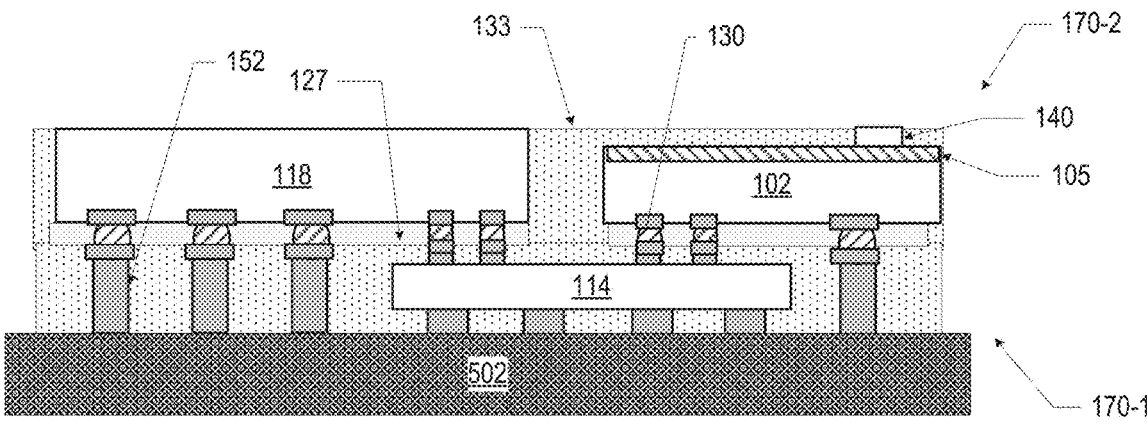

FIG. 14D illustrates an assembly subsequent to depositing an insulating material 133 on and around PIC 102 and XPU 118 (e.g., on a top surface of the assembly of FIG. 14C), and planarizing the insulating material 133. The insulating material 133 may include any suitable material and may be formed and removed using any suitable process, including as described above with reference to FIG. 5. The top surface (e.g., the second surface 170-2) of the optical surface component 140 may be further subjected to grinding and polishing to form an optically smooth surface.

Figure 14E:
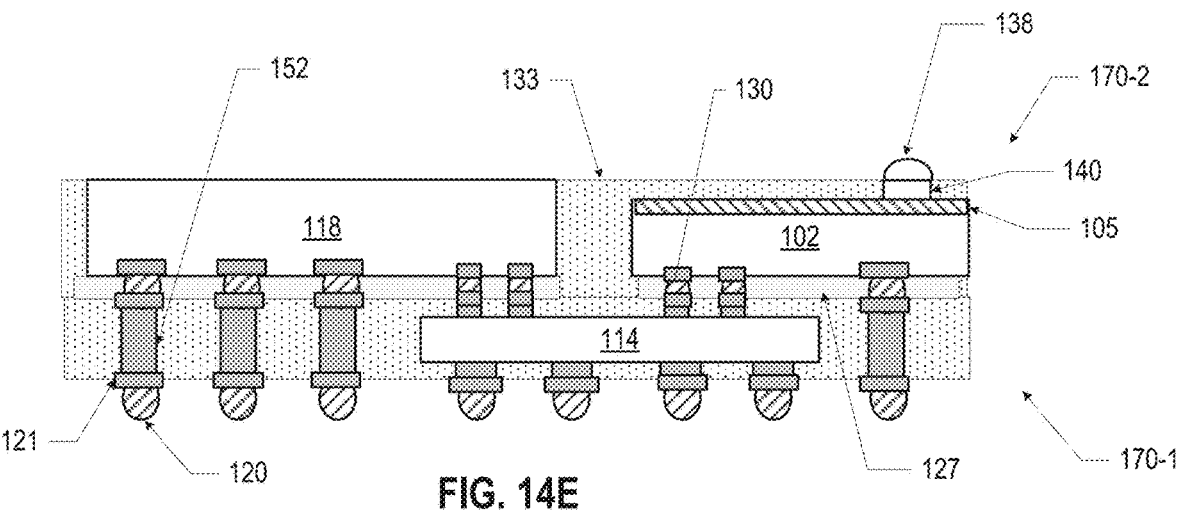

FIG. 14E illustrates an assembly subsequent to removing the carrier 502, optically coupling an optical lens 138 to a top surface (e.g., at the second surface 170-2) of the optical surface component 140, and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 8). The optical lens 138 may be optically aligned, if necessary, and optically coupled to the optical surface component 140 using any suitable technique, such as optical glue or oxide-to-oxide bonding. If multiple assemblies are manufactured together, the assemblies may be singulated after removal of the carrier 502. The assembly of FIG. 14E may itself be a photonic package 100, as shown. Further manufacturing operations may be performed on the photonic package 100 of FIG. 14E to form other photonic packages 100; for example, the solder 120 may be used to couple the photonic package 100 of FIG. 14E to a package substrate 124, and a TIM 154 and heat transfer structure 156 may be provided on the top surface of the photonic package 100 of FIG. 14E.

Figure 15A:
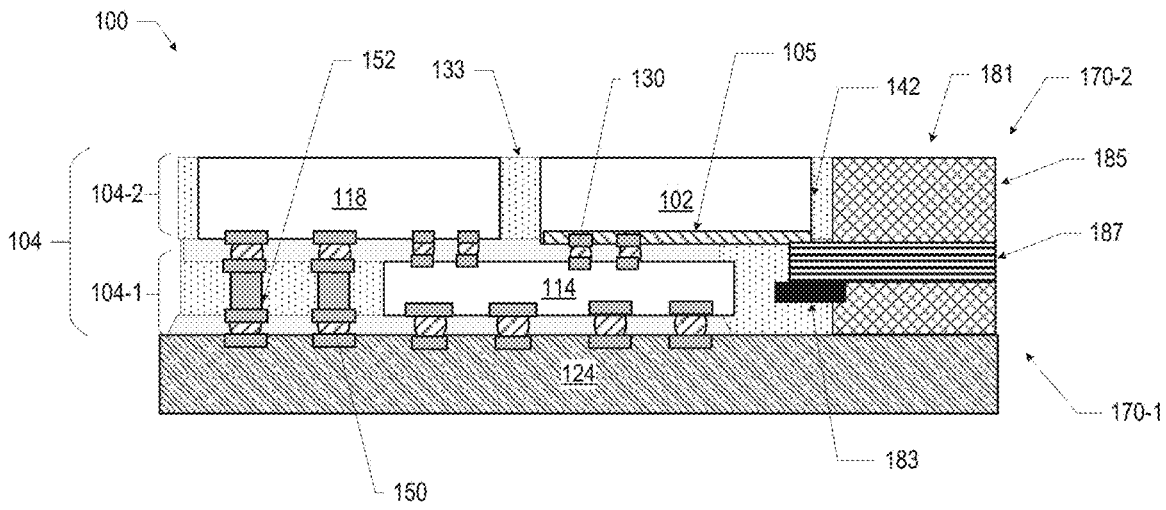
FIGS. 15A and 15B are schematic side, cross-sectional views of example photonic packaging architectures, in accordance with various embodiments.

FIG. 15A is a side, cross-sectional illustration of a photonic package 100, according to some embodiments of the present disclosure. The photonic package 100 may include a multi-layer die subassembly 104 having an integrated fiber array block 181 optically coupled to a PIC 102. As shown in FIG. 15A, the multi-layer die subassembly 104 may include a first layer 104-1 having an EIC 114 and conductive pillars 152 embedded in an insulating material 133, and a second layer 104-2 having an XPU 118 and PIC 102 embedded in the insulating material 133, and a fiber array block 181 optically coupled to a bottom surface (e.g., an active surface 105) of PIC 102 and extending at least partially through the first and second layers 104-1, 104-2 along a lateral side 142 of PIC 102, where the lateral side 142 of PIC 102 is substantially perpendicular to the active surface 105. In some embodiments, the fiber array block 181 may extend fully through the first and/or second layers 104-1, 104-2. In particular, the multi-layer die subassembly 104 may include a PIC 102 electrically coupled via interconnects 130 to an EIC 114, an XPU 118 in a second layer 104-2 electrically coupled via interconnects 130 to an EIC 114 and conductive pillars 152 in a first layer 104-1, and a fiber array block 181 optically coupled to the active side 105 of PIC 102 (e.g., active surface 105 of PIC 102 facing towards the first surface 170-1). The fiber array block 181 may be optically coupled to optical elements at the active surface 105 of PIC 102 using any suitable means, such as by optical glue or by oxide-to-oxide bonding. The fiber array block 181 may include a fiber array 187 in a glass v-groove block 185 and a glass lid 183 attached to a bottom surface of the fiber array 187, where the glass lid 183 may be configured to apply pressure to the fiber array 187 and may further secure the fiber array 187 to the optical elements on the active surface 105 of PIC 102, for example, by optical glue. In some embodiments, PIC 102 comprises V-grooves monolithically integrated therein and exposed on active side 105, fiber array 187 may be optically coupled to PIC 102 along the exposed V-grooves, for example, self-aligned along the corresponding V-grooves. In a general sense, V-grooves comprise inverted tapers (grooves) etched into a substrate such as silicon. In some embodiments, fiber array 187 may include a single-mode optical fiber (SMF). In some embodiments, fiber array 187 may include a graded-index (GRIN) optical fiber serving as a beam expansion purpose for easier alignment later on to external optical component. The exposed side wall of the fiber array block 181 may be polished to achieve sufficient surface roughness to reduce interface loss.

Figure 15B:
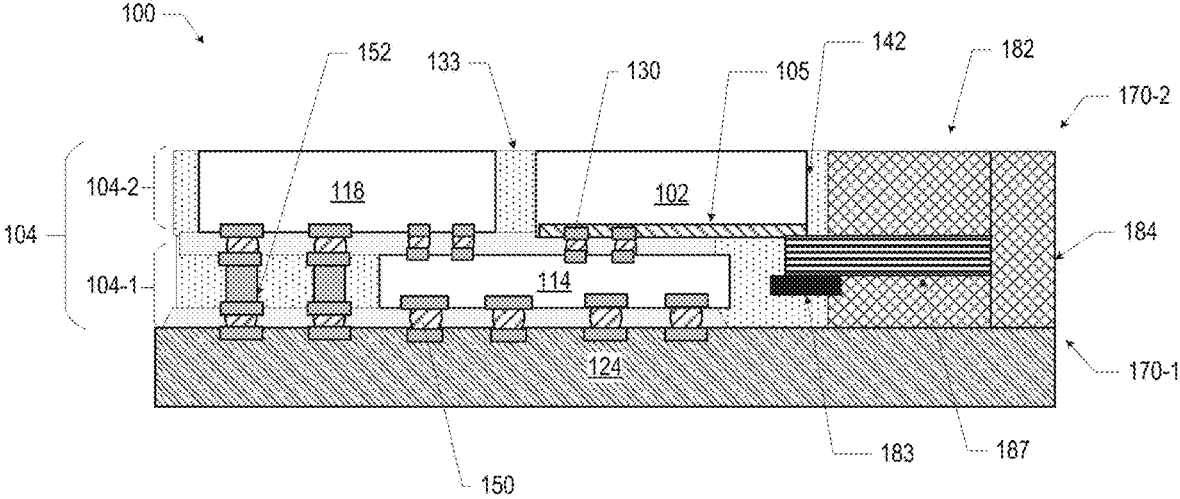

FIG. 15B is a side, cross-sectional illustration of a photonic package 100, according to some embodiments of the present disclosure. The photonic package 100 of FIG. 15B is similar to FIG. 15A except the multi-layer die subassembly 104 includes an extended fiber array block 182 optically coupled to a PIC 102, where the extended fiber array block 182 includes the fiber array block 181 of FIG. 15A with a lateral optical portion 184 (e.g., a glass block on a lateral side where the fiber array terminates). The extended fiber array block 182 may be optically coupled to optical elements on an active surface 105 (e.g., a bottom surface) of PIC 102 and may extend at least partially through the first and second layers 104-1, 104-2 along a lateral side 142 of PIC 102. In some embodiments, the extended fiber array block 182 may extend fully through the first and/or second layers 104-1, 104-2. The extended fiber array block 182 may be optically coupled to optical elements at the active surface 105 of PIC 102 using any suitable means, such as by optical glue or by oxide-to-oxide bonding. The extended fiber array block 182 may include a fiber array 187 in a glass v-groove block 185, a lateral optical portion 184, and a glass lid 183 attached to a bottom surface of the fiber array 187, where the glass lid 183 may be configured to apply pressure to the fiber array 187 and may further secure the fiber array 187 to the optical elements on the active surface 105 of PIC 102 to prevent contamination. In some embodiments, the lateral optical portion 184 (e.g., the glass block where the fiber array 187 terminates) may be laser written with a waveguide to connect the fiber array 187 with an external waveguide or fiber. In some embodiments, the lateral optical portion 184 may be laser written a waveguide subsequent to forming the multi-layer die subassembly 104 or the photonic package 100.

Figure 16:
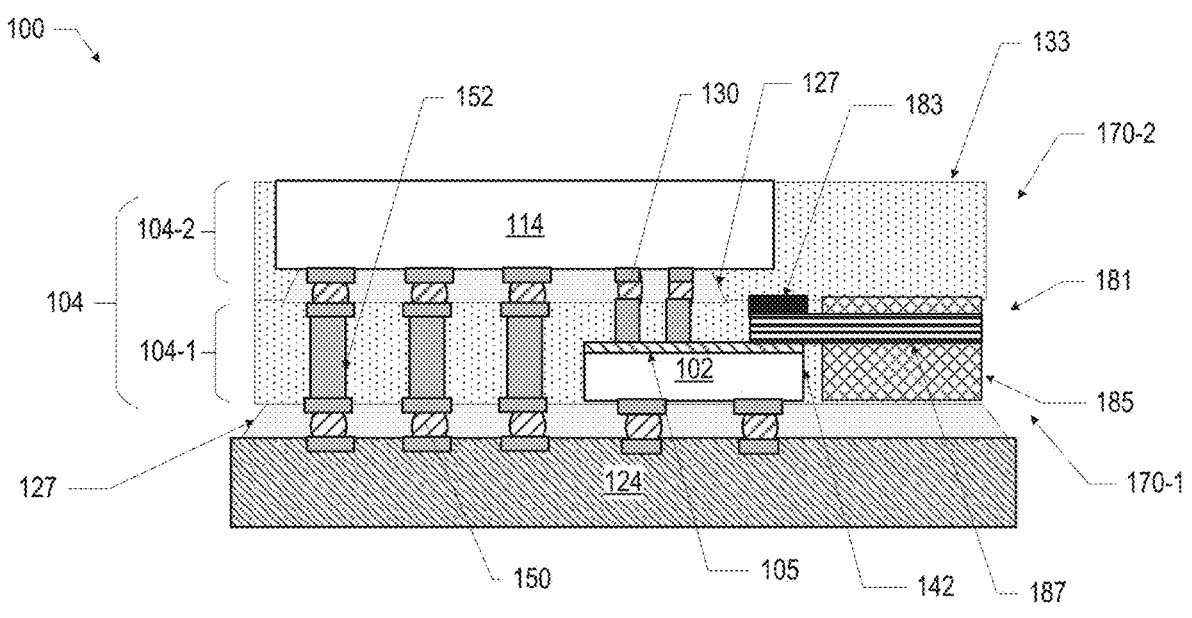
FIG. 16 is a schematic side, cross-sectional view of an example photonic packaging architecture, in accordance with various embodiments.

FIG. 16 is a side, cross-sectional illustration of a photonic package 100, according to some embodiments of the present disclosure. The photonic package 100 may include a multi-layer die subassembly 104 having an integrated fiber array block 181 optically coupled to a PIC 102. As shown in FIG. 16, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a fiber array block 181 optically coupled to the active surface 105 of PIC 102 and extending at least partially through the first layer 104-1 along a lateral side 142 of PIC 102, and a second layer 104-2 having an EIC 114 embedded in the insulating material 133. In some embodiments, the fiber array block 181 may extend fully through the first layer 104-1 and may extend at least partially through the second layer 104-2. In particular, the multi-layer die subassembly 104 may include an EIC 114 in a second layer 104-2 electrically coupled via interconnects 130 to a PIC 102 and conductive pillars 152 in a first layer 104-1, and a fiber array block 181 optically coupled to the active side 105 of PIC 102 (e.g., active surface 170-2). The fiber array block 181 may be optically coupled to optical elements at the active surface 105 of PIC 102 using any suitable means, such as by optical glue or by oxide-to-oxide bonding. The fiber array block 181 may include a fiber array 187 in a glass v-groove block 185 and a glass lid 183 attached to a top surface of the fiber array 187, where the glass lid 183 may be configured to apply pressure to the fiber array 187 and may further secure the fiber array 187 to the optical elements on the active surface 105 of PIC 102, for example, by optical glue. In some embodiments, fiber array 187 may include a single-mode optical fiber (SMF). In some embodiments, fiber array 187 may include a graded-index (GRIN) optical fiber. The insulating material 133 of the second layer 104-2 may be on and over top surface of the glass v-groove block 185 and a glass lid 183 of the fiber array block 181. PIC 102 may include TSVs (not shown) for electrically coupling to package substrate 124 via interconnects 150. The exposed side wall of the fiber array block 181 may be polished to achieve sufficient surface roughness to reduce interface loss.

Figure 17A:
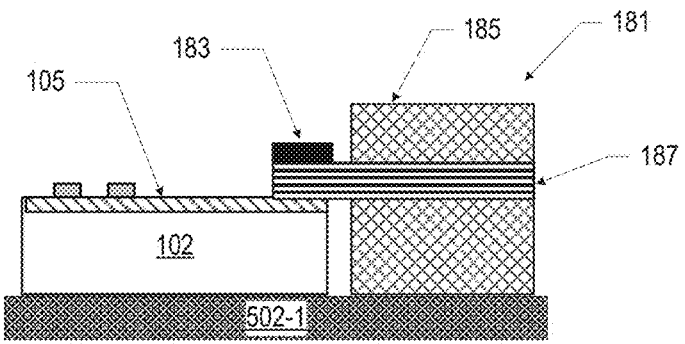
FIGS. 17A-17E are schematic side, cross-sectional views of various stages in an example process for manufacturing the photonic package of FIG. 15A, in accordance with various embodiments.

FIGS. 17A-17E are schematic side, cross-sectional views of various stages in an example process for manufacturing the photonic package of FIG. 15A, in accordance with various embodiments. FIG. 17A illustrates an assembly subsequent to attaching a PIC 102 to a first carrier 502-1 and optically coupling a fiber array block 181 to an active surface 105 of PIC 102. PIC 102 may be attached with the active surface 105 facing away from the first carrier 502-1. The fiber array block 181 may be optically aligned and optically coupled to optical elements (e.g., V-grooves monolithically integrated and exposed) at the active surface 105 of PIC 102 using any suitable technique, such as optical glue or oxide-to-oxide bonding. The fiber array block 181 may include a fiber array 187 in a glass v-groove block 185 and a glass lid 183 attached to a top surface of the fiber array 187. The fiber array block 181 may be pre-assembled prior to coupling to PIC 102. In some embodiments, the fiber array block 181 may be a pre-fab subassembly from a third-party manufacturer. In some embodiments, the fiber array block 181 may be optically coupled to PIC 102 prior to attachment to the first carrier 502-1, and, in some embodiments, the optically coupled PIC 102 and the fiber array block 181 may be a pre-fab subassembly from a third-party manufacturer. The assembly of FIG. 17A may be functionally tested to determine that PIC 102 with fiber array block 181 is a known good die (KGD) before further processing is performed. If multiple assemblies are manufactured together, the assemblies may be singulated after the first carrier 502-1 is removed.

Figure 17B:
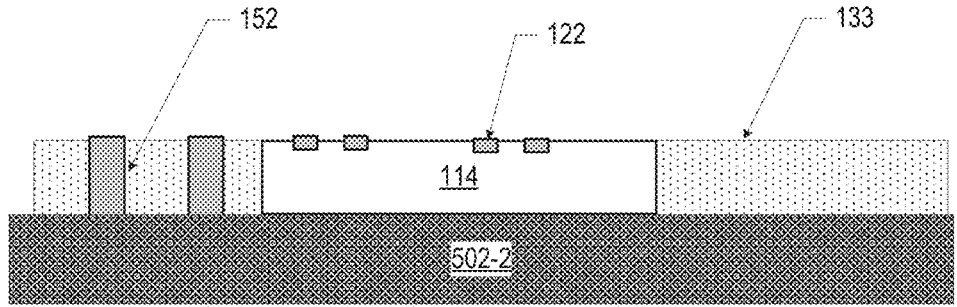

FIG. 17B illustrates an assembly subsequent to plating or otherwise depositing conductive material on a second carrier 502-2 to generate traces (not shown), planes (not shown), conductive pillars 152, and short pillars 153 (not shown) on second carrier 502-2, attaching EIC 114, depositing an insulating material 133 on and around EIC 114 and the conductive pillars 152, and planarizing the top surface of the insulating material 133 to expose a top surface of the conductive pillars 152 and conductive contacts 122 on a top surface of EIC 114. The conductive pillars 152 and metallization may be formed using any known process in the art, including as described above with reference to FIG. 5. Any suitable method may be used to place EIC 114, for example, automated pick-and-place. In some embodiments, additional metal traces and/or small pillars (not shown) may be formed on EIC 114 and/or conductive pillars 152. The insulating material 133 may be any suitable material and may be formed and removed using any suitable process, as described above with reference to FIG. 5.

Figure 17C:
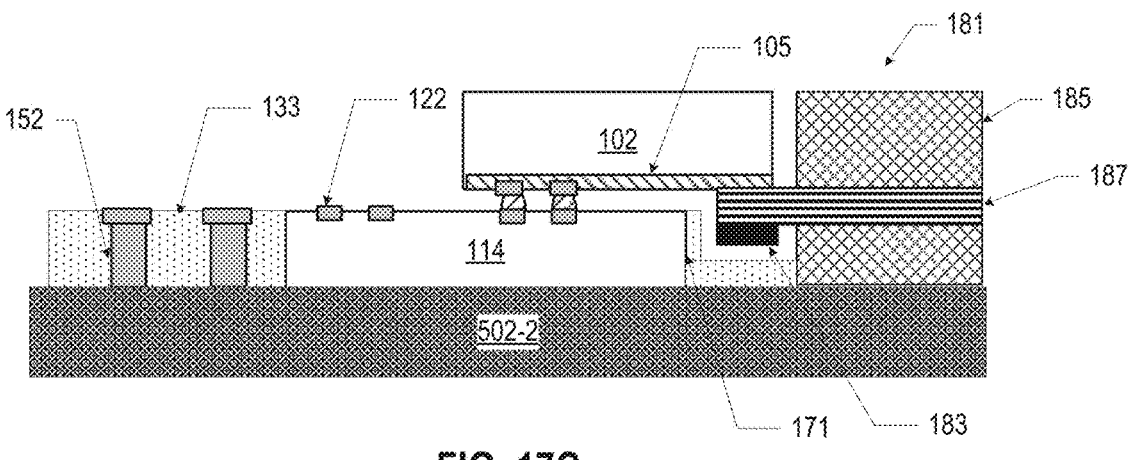

FIG. 17C illustrates an assembly subsequent to removing insulating material 133 at a lateral side 171 of EIC 114, inverting the assembly of FIG. 17A and placing the assembly of 17A on a top surface of the assembly of FIG. 17B. Any suitable method may be used to place the assembly of FIG. 17A, for example, automated pick-and-place. The insulating material 133 at the lateral side 171 may be removed using any suitable technique, including laser drilling or other gross material removal technique. In some embodiments, as shown, only a portion of the insulating material 133 at the lateral side 171 may be removed (e.g., forming a cavity that may contain the fiber array block 181).

Figure 17D:
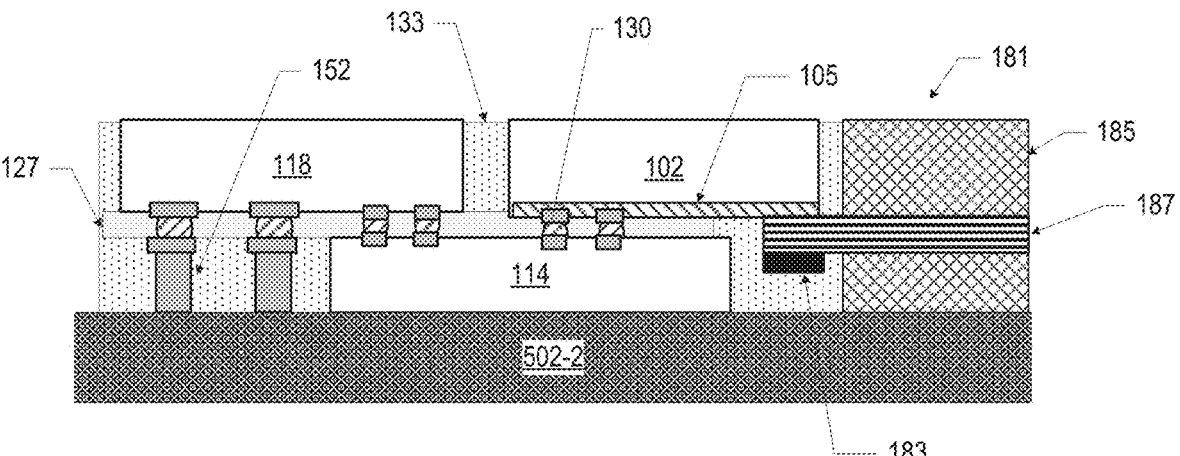

FIG. 17D illustrates an assembly subsequent to placing XPU 118 on a top surface of the assembly of FIG. 17C, electrically coupling PIC 102 and XPU 118, depositing an insulating material 133 on and around PIC 102, XPU 118, and the fiber array block 181, and planarizing the top surface of the insulating material 133. Any suitable method may be used to place XPU 118, for example, automated pick-and-place. PIC 102 and XPU 118 may be electrically coupled to EIC 114 by interconnects 130 and associated conductive traces, planes, and pads. XPU 118 also may be electrically coupled with conductive pillars 152 through associated conductive traces, planes, and pads. The insulating material 133 may include any suitable material and may be formed and removed using any suitable process, including as described above with reference to FIG. 5. In some embodiments, underfill 127 may be dispensed around the interconnects 130. In some embodiments, underfill 127 around interconnects 130 may be omitted.

Figure 17E:
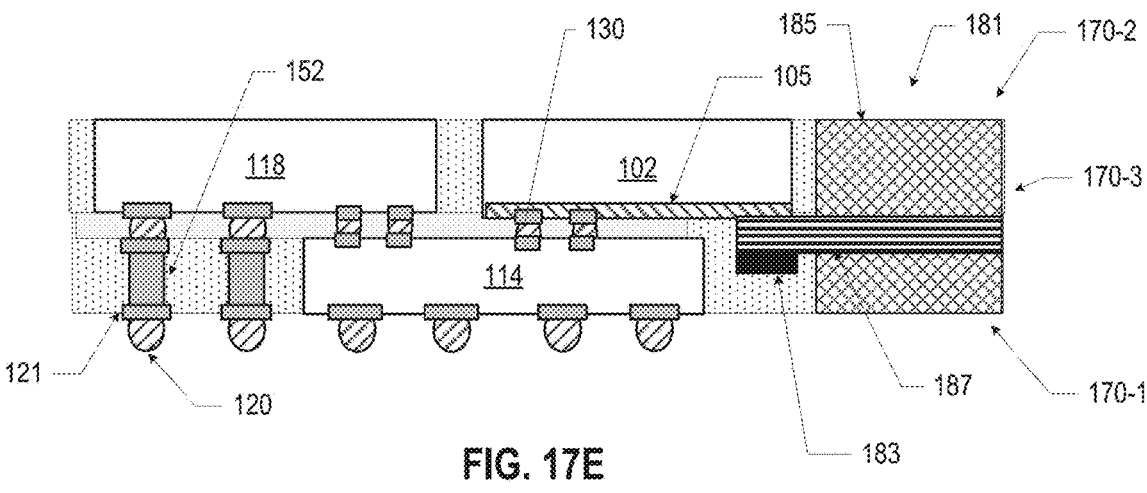

FIG. 17E illustrates an assembly subsequent to removing the second carrier 502-2 and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 15A). If multiple assemblies are manufactured together, the assemblies may be singulated after removal of the second carrier 502-2. The lateral surface (e.g., the third surface 170-3) of the fiber array block 181 may be further subjected to grinding and polishing to form an optically smooth surface. In some embodiments, an anti-reflection coating (not shown) may be deposited on the lateral surface of the fiber array block 181. In some embodiments, the lateral surface 170-3 of the fiber array block 181 may be coated with a sacrificial material (not shown) to protect the optical surface during manufacturing. A sacrificial material may include materials that may be removed during the fabrication process without significantly affecting other materials in the assembly of FIG. 17E, such as, meltable wax, etchable polymers, organic materials that have a lower burning point than other materials in the assembly, soluble compounds that can be washed off with water or other suitable solvents that do not significantly affect other materials in the assembly. The assembly of FIG. 17E may itself be a photonic package 100, as shown. Further manufacturing operations may be performed on the photonic package 100 of FIG. 17E to form other photonic packages 100; for example, the solder 120 may be used to couple the photonic package 100 of FIG. 17E to a package substrate 124, and a TIM 154 and heat transfer structure 156 may be provided on the top surface of the photonic package 100 of FIG. 17E.

Figure 18A:
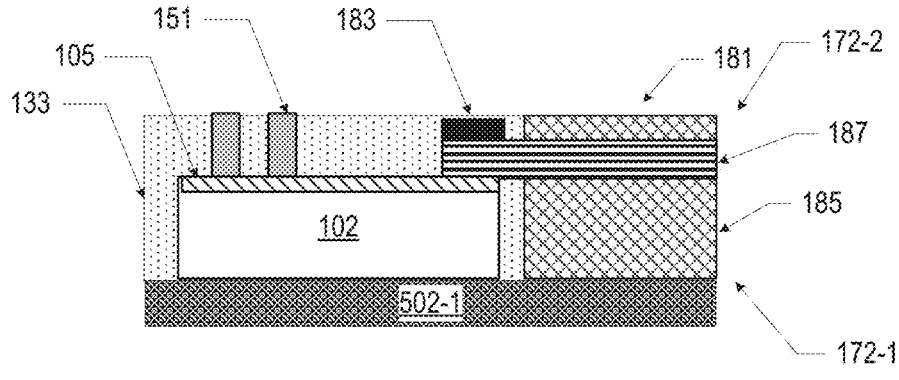
FIGS. 18A-18F are schematic side, cross-sectional views of various stages in an example process for manufacturing the photonic package of FIG. 16, in accordance with various embodiments.

FIGS. 18A-18F are schematic side, cross-sectional views of various stages in an example process for manufacturing the photonic package of FIG. 16, in accordance with various embodiments. FIG. 18A illustrates an assembly subsequent to attaching a PIC 102 to a first carrier 502-1 (e.g., at a first surface 172-1), optically coupling a fiber array block 181 to an active surface 105 of PIC 102, depositing an insulating material 133 on and around PIC 102 and the fiber array block 181, and planarizing the top surface (e.g., a second surface 172-2) of the insulating material 133. PIC 102 may be attached with the active surface 105 facing away from the first carrier 502-1 and may include small pillars 151. The fiber array block 181 may be optically aligned and optically coupled to optical elements (e.g., V-grooves monolithically integrated and exposed) at the active surface 105 of PIC 102 using any suitable technique, such as optical glue or oxide-to-oxide bonding. The fiber array block 181 may include a fiber array 187 in a glass v-groove block 185 and a glass lid 183 attached to a top surface of the fiber array 187. The fiber array block 181 may be pre-assembled prior to coupling to PIC 102. In some embodiments, the fiber array block 181 may be a pre-fab subassembly from a third-party manufacturer. In some embodiments, the fiber array block 181 may be optically coupled to PIC 102 prior to attachment to the first carrier 502-1, and, in some embodiments, the optically coupled PIC 102 and the fiber array block 181 may be a pre-fab subassembly from a third-party manufacturer. The insulating material 133 may be any suitable material and may be formed and removed using any suitable process, as described above with reference to FIG. 5.

Figure 18B:
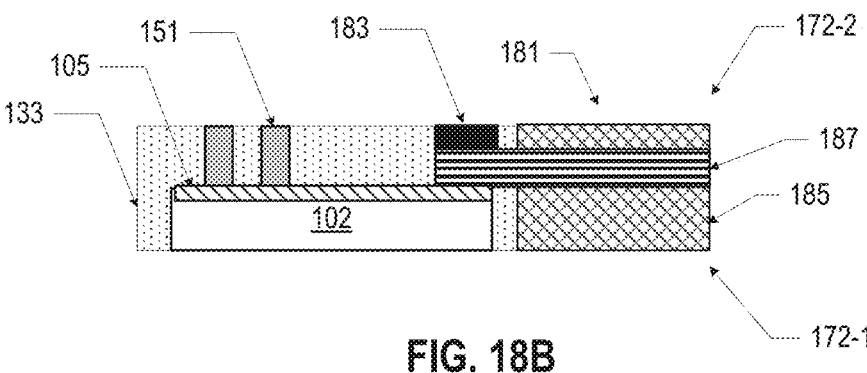

FIG. 18B illustrates an assembly subsequent to removing the first carrier 502-1 and planarizing a bottom surface (e.g., the first surface 172-1) of the assembly. In some embodiments, the bottom surface of the assembly may be planarized to decrease a thickness of PIC 102 and the glass v-groove block 185 of the fiber array block 181. The bottom surface of the assembly may be planarized using any suitable technique, including grinding, or etching, such as a wet etch, a dry etch (e.g., a plasma etch), a wet blast, a laser ablation (e.g., using excimer laser), or CMP. The exposed side wall of the fiber array block 181 may be polished to achieve sufficient surface roughness to reduce interface loss. The assembly of FIG. 18B may be functionally tested to determine that PIC 102 with fiber array block 181 is a known good die (KGD) before further processing is performed. If multiple assemblies are manufactured together, the assemblies may be singulated after the first carrier 502-1 is removed.

Figure 18C:
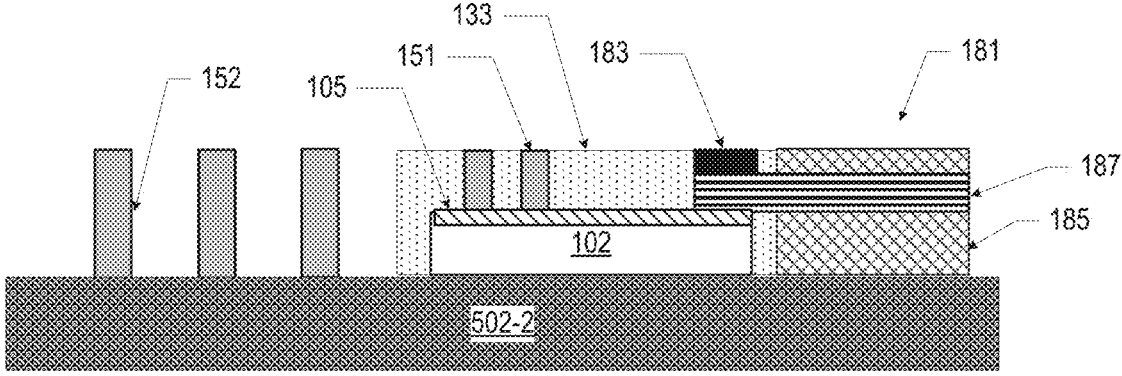

FIG. 18C illustrates an assembly subsequent to plating or otherwise depositing conductive material on a second carrier 502-2 to generate traces (not shown), planes (not shown), short pillars (not shown), conductive pillars 152, and attaching the assembly of FIG. 18B. The conductive pillars 152 and metallization may be formed using any known process in the art, including as described above with reference to FIG. 5. Any suitable method may be used to place assembly of FIG. 18B, for example, automated pick-and-place.

Figure 18D:
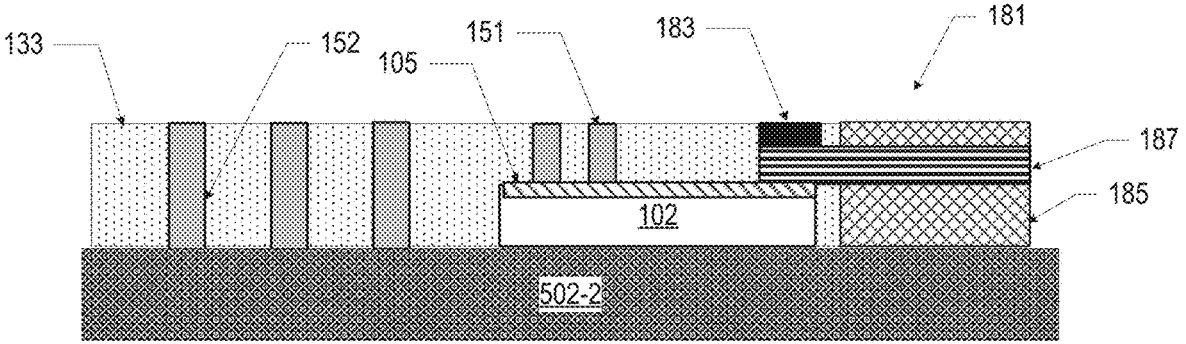

FIG. 18D illustrates an assembly subsequent to depositing an insulating material 133 on and around the conductive pillars 152 and the assembly of FIG. 18B, and planarizing the top surface. The insulating material 133 may be any suitable material and may be formed and removed using any suitable process, as described above with reference to FIG. 5.

Figure 18E:
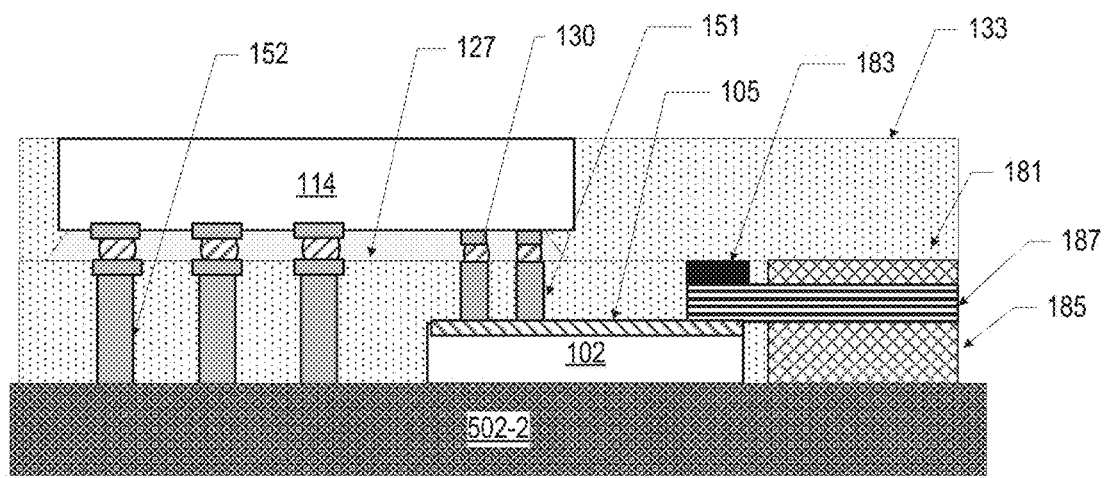

FIG. 18E illustrates an assembly subsequent to placing EIC 114 on a top surface of the assembly of FIG. 18D, electrically coupling EIC 114 to PIC 102 and conductive pillars 152, depositing an insulating material 133 on and around EIC 114, and planarizing the top surface. Any suitable method may be used to place EIC 114, for example, automated pick-and-place. EIC 114 may be electrically coupled to PIC 102 by interconnects 130, small pillars 151, and associated conductive traces, planes, and pads. EIC 114 also may be electrically coupled with conductive pillars 152 through associated conductive traces, planes, and pads. The insulating material 133 may include any suitable material and may be formed and removed using any suitable process, including as described above with reference to FIG. 5. In some embodiments, underfill 127 may be dispensed around the interconnects 130. In some embodiments, underfill 127 around interconnects 130 may be omitted.

Figure 18F:
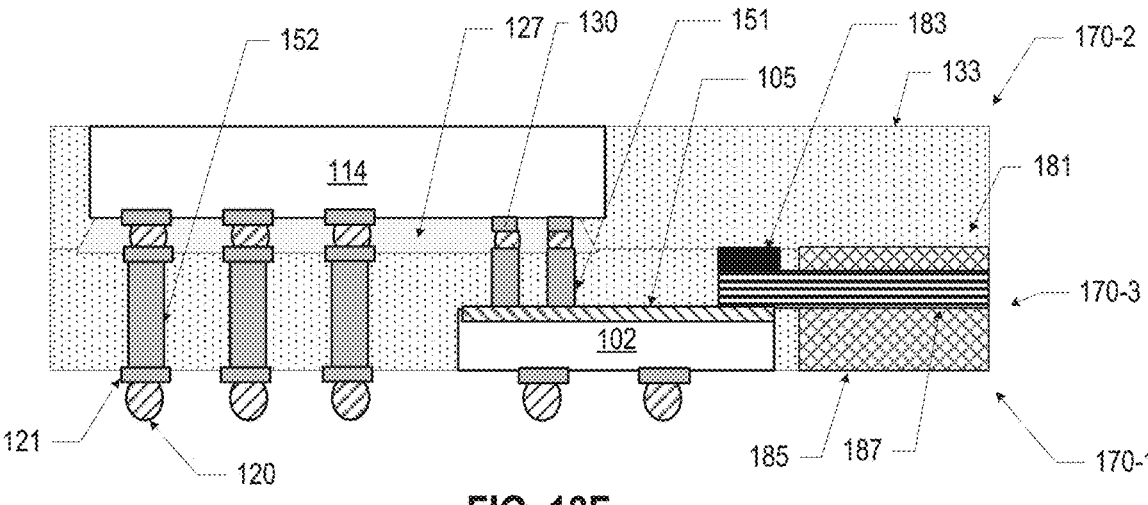

FIG. 18F illustrates an assembly subsequent to removing the second carrier 502-2 and performing finishing operations, such as forming conductive contacts 121, depositing solder resist (not shown), and depositing solder 120 on a bottom surface (e.g., at the first surface 170-1) for coupling to a package substrate (e.g., the package substrate 124 of FIG. 16). If multiple assemblies are manufactured together, the assemblies may be singulated after removal of the second carrier 502-2. The lateral surface (e.g., the third surface 170-3) of the fiber array block 181 may be further subjected to grinding and polishing to form an optically smooth surface. In some embodiments, an anti-reflection coating (not shown) may be deposited on the lateral surface of the fiber array block 181. In some embodiments, the lateral surface 170-3 of the fiber array block 181 may be coated with a sacrificial material (not shown) to protect the optical surface during manufacturing. A sacrificial material may include materials that may be removed during the fabrication process without significantly affecting other materials in the assembly of FIG. 18F, such as, meltable wax, etchable polymers, organic materials that have a lower burning point than other materials in the assembly, soluble compounds that can be washed off with water or other suitable solvents that do not significantly affect other materials in the assembly. The assembly of FIG. 18F may itself be a photonic package 100, as shown. Further manufacturing operations may be performed on the photonic package 100 of FIG. 18F to form other photonic packages 100; for example, the solder 120 may be used to couple the photonic package 100 of FIG. 18F to a package substrate 124, and a TIM 154 and heat transfer structure 156 may be provided on the top surface of the photonic package 100 of FIG. 18F.

Figure 19:
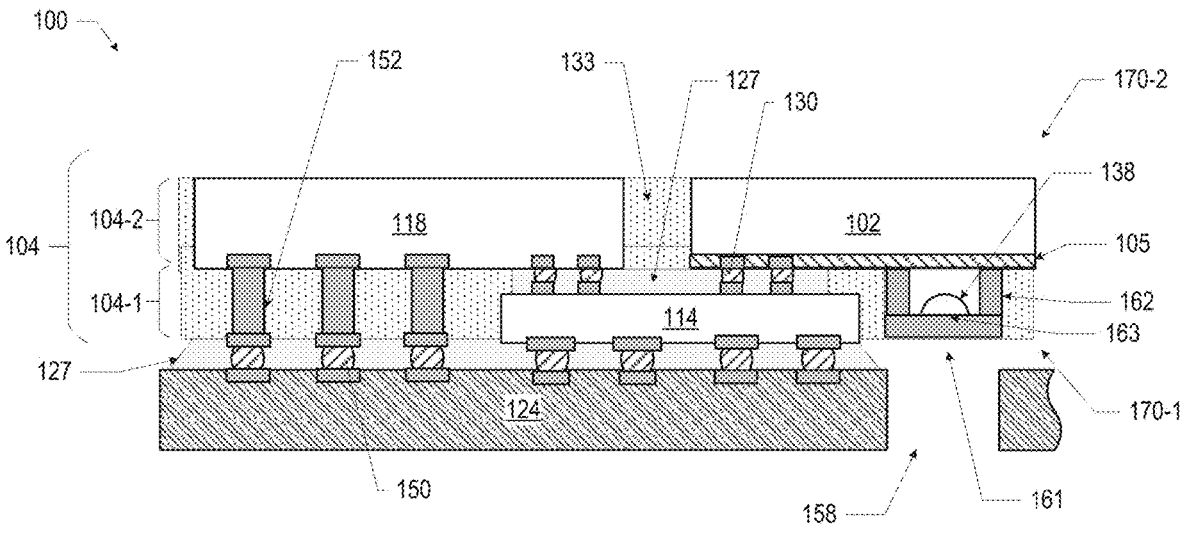
FIG. 19 is a schematic side, cross-sectional view of an example photonic packaging architecture, in accordance with various embodiments.

FIG. 19 is a side, cross-sectional illustration of a photonic package 100, according to some embodiments of the present disclosure. The photonic package 100 may include an encapsulated optical component 161 optically coupled to an active surface 105 of a PIC 102. As shown in FIG. 19, the multi-layer die subassembly 104 may include a first layer 104-1 having an EIC 114 and conductive pillars 152 embedded in an insulating material 133, and a second layer 104-2 having an XPU 118 and a PIC 102 with an active surface 105 facing down (e.g., the active surface 105 is facing towards a first surface 170-1) embedded in the insulating material 133, and an encapsulated optical component 161 coupled to the active surface 105 of PIC 102 and extended from the active surface 105 of PIC 102 through the insulating material 133 of the first layer 104-1 (e.g., extending to the first surface 170-1). The encapsulated optical component 161 may include a housing 162 with an optical lens 138 optically coupled to an internal surface 163 of the housing 162, where the housing 162 surrounds the optical lens 138 and couples to the active surface 105 of PIC 102 to form a hollow cavity around the optical lens 138. The housing 162 may be formed of any suitable optical material, for example, glass, and may have any suitable size and shape. In some embodiments, a plurality of optical lens 138 may be optically coupled to an internal surface 163 of the housing 162, such that the encapsulated optical component 161 includes an array of optical lens 138. In some embodiments, the optical lens 138 is a micro-lens. The encapsulated optical component 161 may be optically aligned and attached to the active surface 105 of PIC 102 using any suitable technique, including optical glue (not shown). The photonic package 100 may further include a package substrate 124 having an aperture 158 (e.g., a through-hole) for propagating optical signals through the package substrate 124. Any suitable techniques may be used to manufacture the photonic package 100 of FIG. 19, for example, the example process for manufacturing a photonic package 100 as described in FIG. 17.

FIG. 20 is a side, cross-sectional illustration of a photonic package 100, according to some embodiments of the present disclosure. The photonic package 100 may include an encapsulated optical component 161 optically coupled to an active surface 105 and a lateral surface 142 of a PIC 102, where PIC 102 transmits and receives light at the lateral surface 142. PIC 102 may include optical elements at an active surface 105 that allow PIC 102 to transmit and/or receive light through the lateral surface 142, as described above with reference to FIG. 1. As shown in FIG. 20, the multi-layer die subassembly 104 may include a first layer 104-1 having an EIC 114 and conductive pillars 152 embedded in an insulating material 133, and a second layer 104-2 having an XPU 118 and a PIC 102 with an active surface 105 facing down (e.g., the active surface 105 is facing towards a first surface 170-1) embedded in the insulating material 133, and an encapsulated optical component 161 coupled to the active surface 105 and the lateral surface 142 of PIC 102 and extending from the active surface 105 of PIC 102 through the insulating material 133 of the first layer 104-1 (e.g., extending to the first surface 170-1). In some embodiments, the encapsulated optical component 161 may extend partially through the first and/or second layers 104-1, 104-2. The encapsulated optical component 161 may include a housing 162 with an optical lens 138 optically coupled to an internal surface 163 of the housing 162, where the housing 162 surrounds the optical lens 138 and couples to the active surface 105 and the lateral surface 142 of PIC 102 to form a hollow cavity around the optical lens 138. The encapsulated optical component 161 may be optically aligned to the lateral surface 142 and attached to the active surface 105 and lateral surface 142 of PIC 102 using any suitable technique, including optical glue 165. The housing 162 may further include a glue stop structure 164 to prevent optical glue 165 from seeping into the housing 162 and contaminating the optical lens 138. The housing 162 may be formed of any suitable optical material, for example, glass, and may have any suitable size and shape. In some embodiments, a plurality of optical lens 138 may be optically coupled to an internal surface 163 of the housing 162, such that the encapsulated optical component 161 includes an array of optical lens 138. In some embodiments, the optical lens 138 is a micro-lens. Any suitable techniques may be used to manufacture the photonic package 100 of FIG. 20, for example, the example process for manufacturing a photonic package 100 as described in FIG. 17.

Figure 21A:
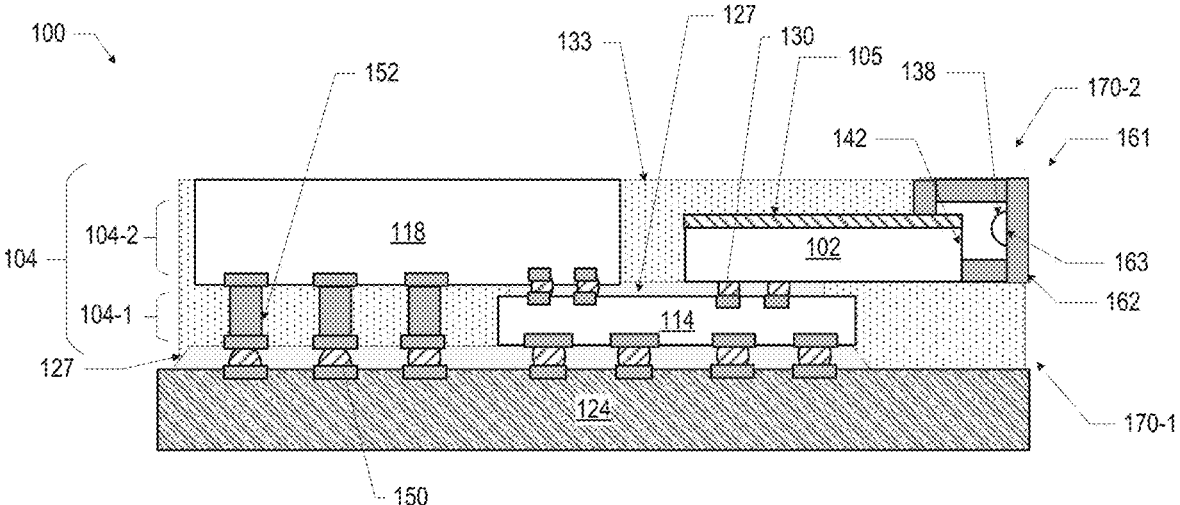
FIGS. 21A and 21B are schematic side, cross-sectional views of example photonic packaging architectures, in accordance with various embodiments.

FIG. 21A is a side, cross-sectional illustration of a photonic package 100, according to some embodiments of the present disclosure. The photonic package 100 may include an encapsulated optical component 161 optically coupled to an active surface 105 and a lateral surface 142 of a PIC 102, where PIC 102 transmits and receives light at the lateral surface 142. As shown in FIG. 21A, the multi-layer die subassembly 104 may include a first layer 104-1 having an EIC 114 and conductive pillars 152 embedded in an insulating material 133, and a second layer 104-2 having an XPU 118 and a PIC 102 with an active surface 105 facing up (e.g., the active surface 105 is facing towards a second surface 170-2) embedded in the insulating material 133, and an encapsulated optical component 161 coupled to the active surface 105 and the lateral surface 142 of PIC 102 and extending from the active surface 105 of PIC 102 through the insulating material 133 of the second layer 104-2 (e.g., extending to the second surface 170-2). PIC 102 may include TSVs (not shown) for electrically coupling to EIC 114. In some embodiments, the encapsulated optical component 161 may extend partially through the insulating material 133 of the second layer 104-2. The encapsulated optical component 161 may include a housing 162 with an optical lens 138 optically coupled to an internal surface 163 of the housing 162, where the housing 162 surrounds the optical lens 138 and couples to the active surface 105 and the lateral surface 142 of PIC 102 to form a hollow cavity around the optical lens 138. The encapsulated optical component 161 may be optically aligned to the lateral surface 142 and attached to the active surface 105 and lateral surface 142 of PIC 102 using any suitable technique, including optical glue (not shown). The housing 162 may be formed of any suitable optical material, for example, glass, and may have any suitable size and shape. In some embodiments, a plurality of optical lens 138 may be optically coupled to an internal surface 163 of the housing 162, such that the encapsulated optical component 161 includes an array of optical lens 138. In some embodiments, the optical lens 138 is a micro-lens. Any suitable techniques may be used to manufacture the photonic package 100 of FIG. 21A, for example, the example process for manufacturing a photonic package 100 as described in FIG. 17.

Figure 21B:
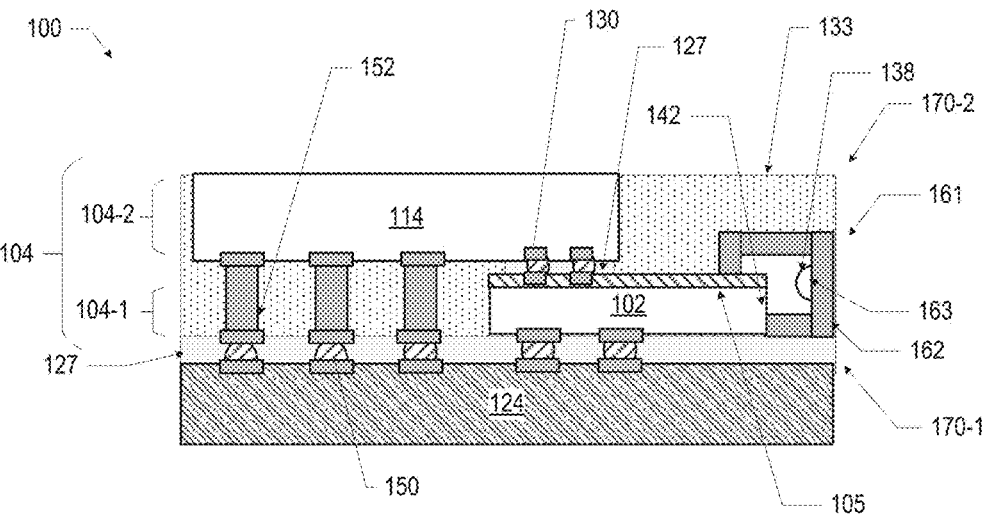

FIG. 21B is a side, cross-sectional illustration of a photonic package 100, according to some embodiments of the present disclosure. The photonic package 100 may include an encapsulated optical component 161 optically coupled to an active surface 105 and a lateral surface 142 of a PIC 102, where PIC 102 transmits and receives light at the lateral surface 142. As shown in FIG. 21B, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a second layer 104-2 having an EIC 114 embedded in the insulating material 133, and an encapsulated optical component 161 coupled to the active surface 105 and the lateral surface 142 of PIC 102 and extending from the active surface 105 of PIC 102 through at least a portion of the insulating material 133 of the second layer 104-2 (e.g., extending to the second surface 170-2). The encapsulated optical component 161 may include a housing 162 with an optical lens 138 optically coupled to an internal surface 163 of the housing 162, where the housing 162 surrounds the optical lens 138 and couples to the active surface 105 and the lateral surface 142 of PIC 102 to form a hollow cavity around the optical lens 138. The encapsulated optical component 161 may be optically aligned to the lateral surface 142 and attached to the active surface 105 and lateral surface 142 of PIC 102 using any suitable technique, including optical glue (not shown). The housing 162 may be formed of any suitable optical material, for example, glass, and may have any suitable size and shape. In some embodiments, a plurality of optical lens 138 may be optically coupled to an internal surface 163 of the housing 162, such that the encapsulated optical component 161 includes an array of optical lens 138. In some embodiments, the optical lens 138 is a micro-lens. PIC 102 may include TSVs (not shown) for electrically coupling to the package substrate 124 via interconnects 150. Any suitable techniques may be used to manufacture the photonic package 100 of FIG. 20, for example, the example process for manufacturing a photonic package 100 as described in FIG. 18.

Figure 22:
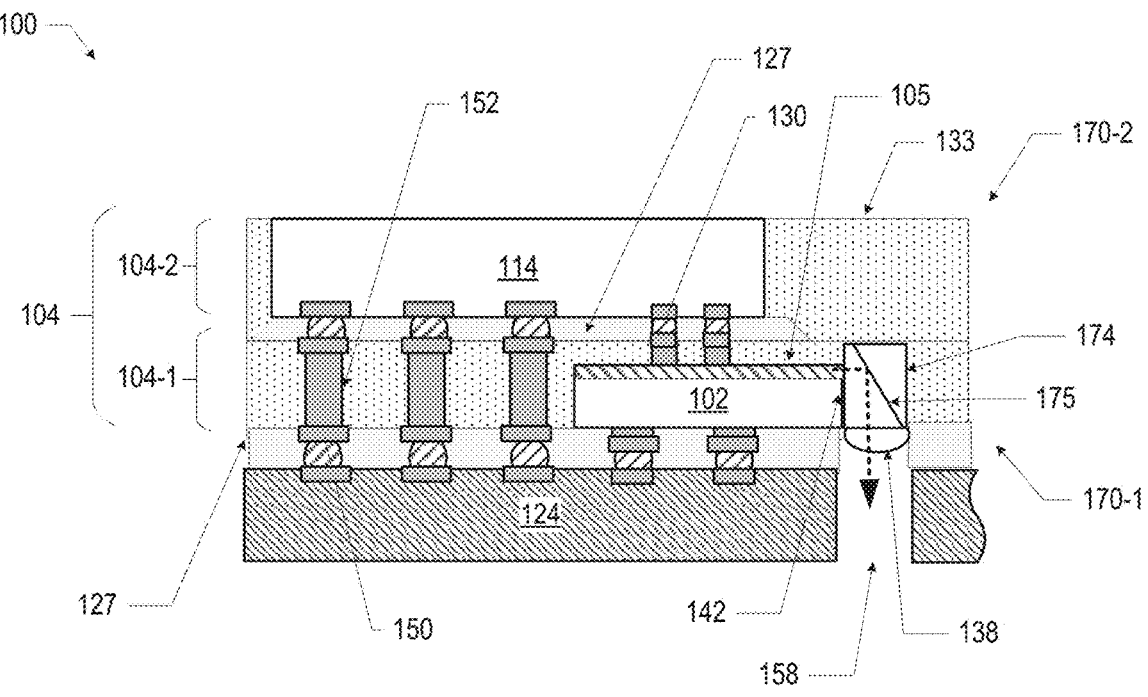
FIG. 22 is a schematic side, cross-sectional view of an example photonic packaging architecture, in accordance with various embodiments.

FIG. 22 is a side, cross-sectional illustration of a photonic package 100, according to some embodiments of the present disclosure. The photonic package 100 may include a multi-layer die subassembly 104 having an integrated light-reflective optical component 174 optically coupled to a PIC 102, where the light-reflective optical component 174 includes an embedded reflector 175 for reflecting light. As shown in FIG. 22, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a light-reflective optical component 174 optically coupled to a lateral surface 142 of PIC 102 and extending at least partially through the first layer 104-1 along the lateral side 142 of PIC 102, and a second layer 104-2 having an EIC 114 embedded in the insulating material 133. EIC 114 in the second layer 104-2 may be electrically coupled to PIC 102 and conductive pillars 152 in a first layer 104-1 via interconnects 130. The light-reflective optical component 174 may convert light traveling in a lateral direction from PIC to travelling in a vertical direction, as depicted by the dashed arrow. The light-reflective optical component 174 may also convert light traveling in a vertical direction through aperture 158 in package substrate 124 to travelling in a lateral direction (not shown). The light-reflective optical component 174 may be optically coupled to PIC 102 using any suitable means, such as by optical glue or by oxide-to-oxide bonding. The light-reflective optical component 174 may be formed of any suitable material, including, for example, glass or acrylic. The embedded reflector 175 may include any suitable reflector, including a mirror reflector. The insulating material 133 of the second layer 104-2 may be on and over a top surface of the light-reflective optical component 174. PIC 102 may include TSVs (not shown) for electrically coupling to package substrate 124 via interconnects 150. The multi-layer die subassembly 104 may further include an optical lens 138 optically coupled at the bottom surface (e.g., at the first surface 170-1) to the light-reflective optical component 174. The photonic package 100 may further include a package substrate 124 having an aperture 158 (e.g., a through-hole) for propagating optical signals through the package substrate 124. In some embodiments, optical fiber may be placed within or proximate to the aperture so that optical signals may be exchanged between PIC 102 and the optical fiber. Any suitable techniques may be used to manufacture the photonic package 100 of FIG. 22, for example, the example process for manufacturing a photonic package 100 as described in FIG. 18.

Figure 23:
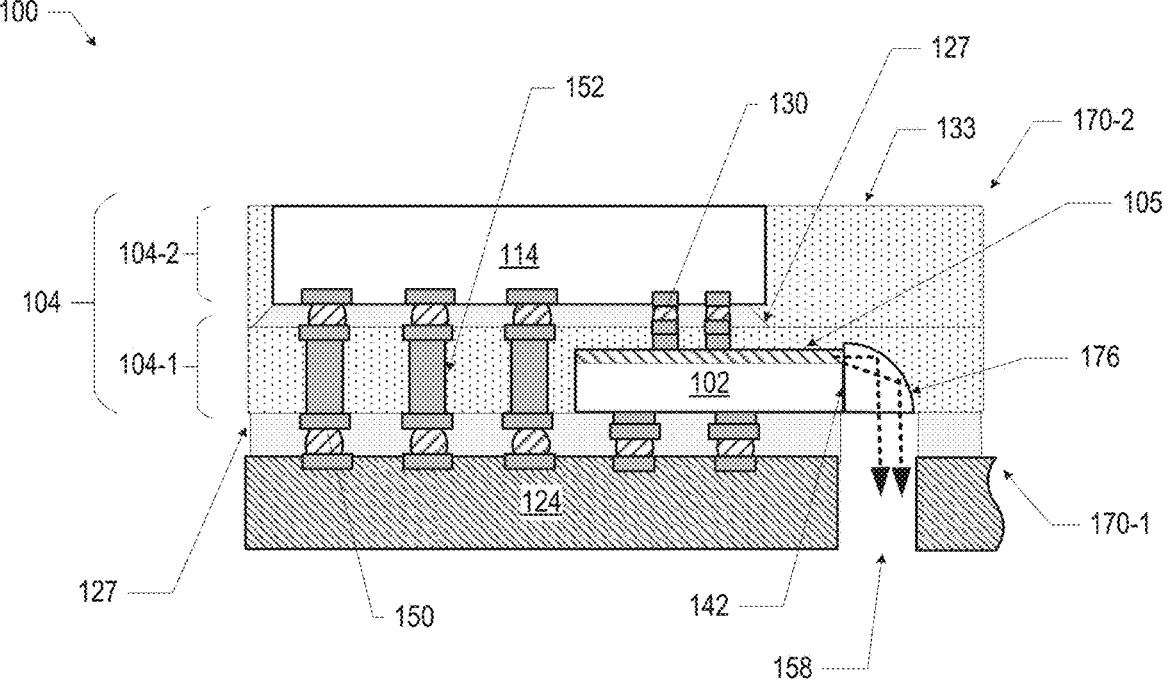
FIG. 23 is a schematic side, cross-sectional view of an example photonic packaging architecture, in accordance with various embodiments.

FIG. 23 is a side, cross-sectional illustration of a photonic package 100, according to some embodiments of the present disclosure. The photonic package 100 may include a multi-layer die subassembly 104 having an integrated curved-surface optical component 176 optically coupled to a PIC 102, where the curved-surface optical component 176 includes a curved-surface for reflecting light and collimating the beam. As shown in FIG. 23, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a curved-surface optical component 176 optically coupled to a lateral surface 142 of PIC 102 and extending at least partially through the first layer 104-1 along the lateral side 142 of PIC 102, and a second layer 104-2 having an EIC 114 embedded in the insulating material 133. EIC 114 in the second layer 104-2 may be electrically coupled to PIC 102 and conductive pillars 152 in a first layer 104-1 via interconnects 130. The curved-surface optical component 176 may convert light traveling in a lateral direction from PIC to travelling in a vertical direction, as depicted by the dashed arrows. While at the same time, collimate the beam for longer travel distance. The curved-surface optical component 176 may also convert light traveling in a vertical direction through aperture 158 in package substrate 124 to travelling in a lateral direction (not shown). The curved-surface optical component 176 may be optically coupled to PIC 102 using any suitable means, such as by optical glue or by oxide-to-oxide bonding. The curved-surface optical component 176 may be formed of any suitable material, including, for example, glass or acrylic. The insulating material 133 of the second layer 104-2 may be on and over a top surface of the curved-surface optical component 176. PIC 102 may include TSVs (not shown) for electrically coupling to package substrate 124 via interconnects 150. The photonic package 100 may further include a package substrate 124 having an aperture 158 (e.g., a through-hole) for propagating optical signals through the package substrate 124. In some embodiments, optical fiber may be placed within or proximate to the aperture so that optical signals may be exchanged between PIC 102 and the optical fiber. Any suitable techniques may be used to manufacture the photonic package 100 of FIG. 23, for example, the example process for manufacturing a photonic package 100 as described in FIG. 18.

Figure 24A:
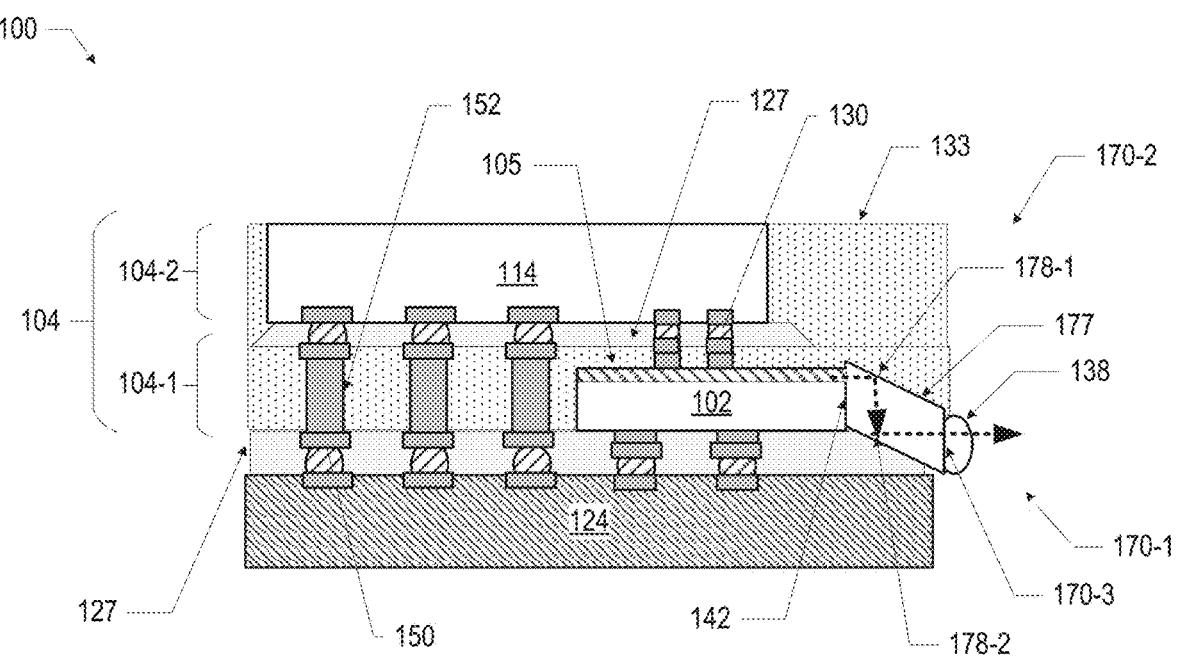
FIGS. 24A and 24B are schematic side, cross-sectional views of example photonic packaging architectures, in accordance with various embodiments.
Figure 24B:
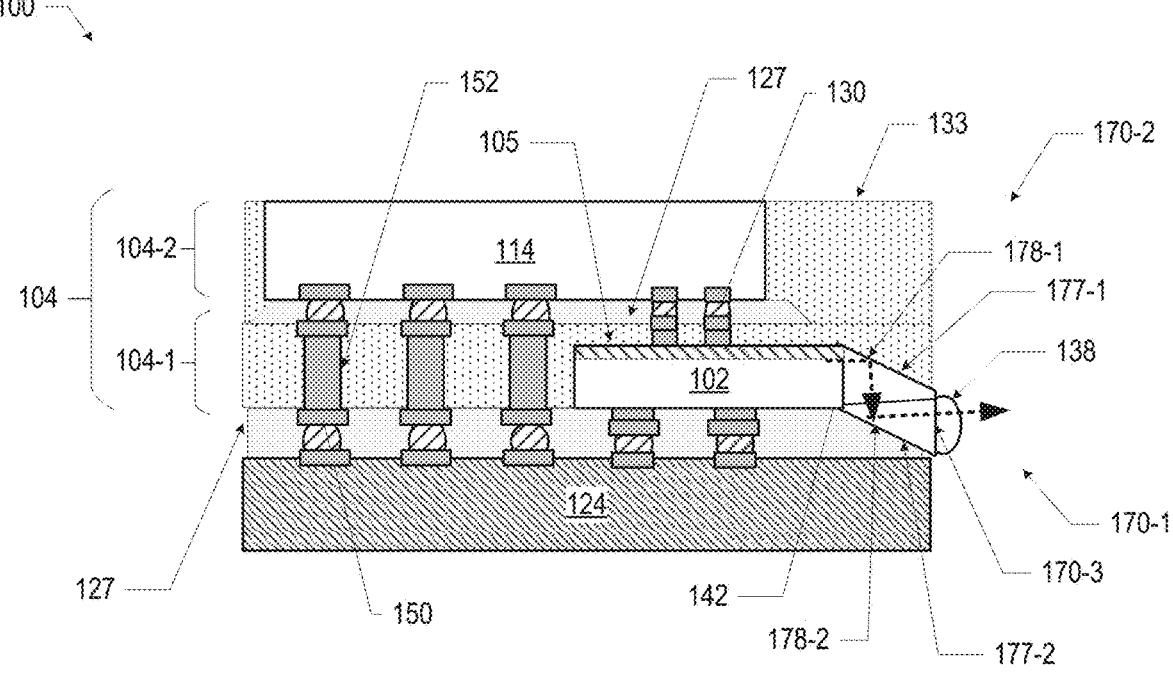

FIG. 24A is a side, cross-sectional illustration of a photonic package 100, according to some embodiments of the present disclosure. The photonic package 100 may include a multi-layer die subassembly 104 having an integrated light-reflective optical component 177 optically coupled to a PIC 102, where the light-reflective optical component 177 includes a first embedded reflector 178-1 and a second embedded reflector 178-2 for reflecting light. As shown in FIG. 24, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a light-reflective optical component 177 optically coupled to a lateral surface 142 of PIC 102 and extending at least partially through the first layer 104-1 along the lateral side 142 of PIC 102, and a second layer 104-2 having an EIC 114 embedded in the insulating material 133. EIC 114 in the second layer 104-2 may be electrically coupled to PIC 102 and conductive pillars 152 in a first layer 104-1 via interconnects 130. The light-reflective optical component 177 may convert light traveling in a first lateral direction from PIC to travelling in a vertical direction, and then in a second lateral direction, as depicted by the dashed arrows. The light-reflective optical component 177 may also convert light traveling in a first lateral direction to travelling in a vertical direction, and then in a second lateral direction (not shown). The light-reflective optical component 177 may be optically coupled to PIC 102 using any suitable means, such as by optical glue or by oxide-to-oxide bonding. The light-reflective optical component 177 may be formed of any suitable material, including, for example, glass or acrylic. The first and second embedded reflectors 178-1, 178-2 may include any suitable reflector, including a mirror reflector or an interface with enough refractive index difference to create total reflection. The insulating material 133 of the second layer 104-2 may be on and over a top surface of the light-reflective optical component 177. PIC 102 may include TSVs (not shown) for electrically coupling to package substrate 124 via interconnects 150. The multi-layer die subassembly 104 may further include an optical lens 138 optically coupled at the peripheral surface (e.g., at the third surface 170-3) of the light-reflective optical component 177 to collimate the beam for longer distance light traveling. Any suitable techniques may be used to manufacture the photonic package 100 of FIG. 24A, for example, subsequent to forming a multi-layer die subassembly 104, the insulating material 133 at the lateral surface 142 of PIC 102 may be removed, for example, by laser drilling, to form a cavity and the light-reflective optical component 177 may be optically coupled to the lateral surface 142 of PIC 102. In some embodiments, the light-reflective optical component 177 may be formed of a first portion optically coupled to a second portion. FIG. 24B is a side, cross-sectional illustration of a photonic package 100 of FIG. 24A, where the light-reflective optical component 177 includes a first portion 177-1 with a first embedded reflector 178-1 and a second portion 177-2 with a second embedded reflector 178-2 for reflecting light (e.g., as shown in FIG. 24B, a first triangular portion 177-1 in the first layer 104-1 and a second triangular portion 177-2 in the second layer 104-2). The first portion 177-1 may be optically coupled to the second portion 177-2 using any suitable techniques, including, for example, optical glue, glass epoxy, or oxide-to-oxide bonding. Any suitable techniques may be used to manufacture the photonic package 100 of FIG. 24B, including the example process for manufacturing a photonic package 100 as described in FIG. 5, where the first portion 177-1 may be optically coupled to the lateral surface 142 of PIC 102 as described at FIG. 5B, and the second portion 177-2 may be optically coupled to the first portion 177-1 at FIG. 5F subsequent to removal of the carrier 502.

Figure 25A:
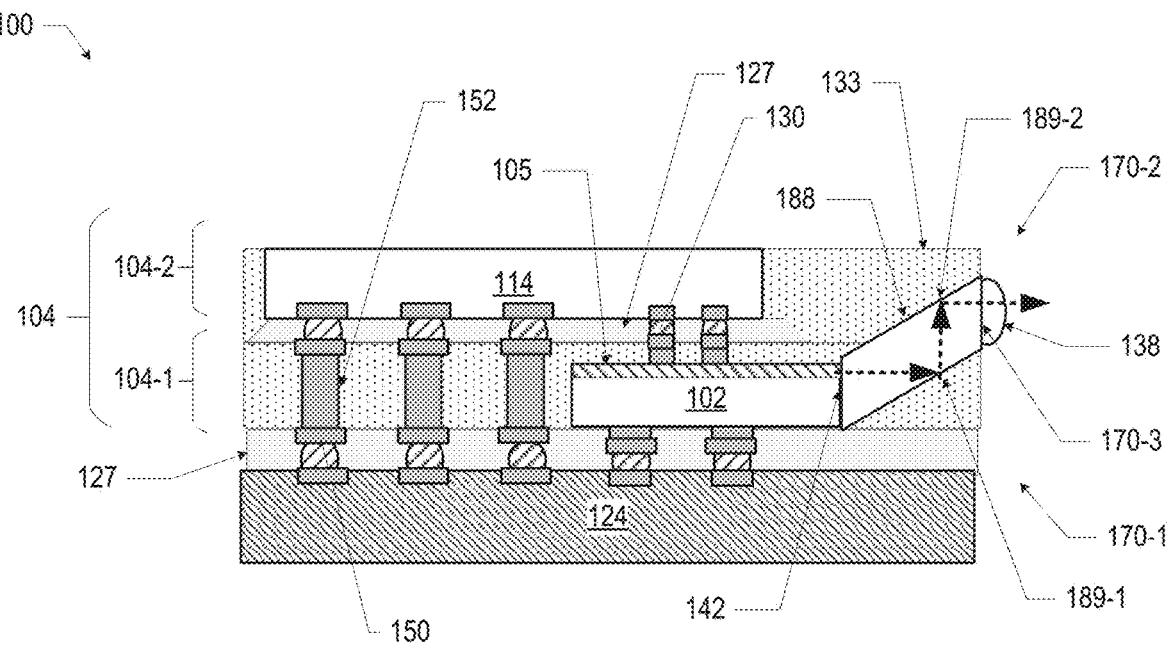
FIGS. 25A and 25B are schematic side, cross-sectional views of example photonic packaging architectures, in accordance with various embodiments.
Figure 25B:
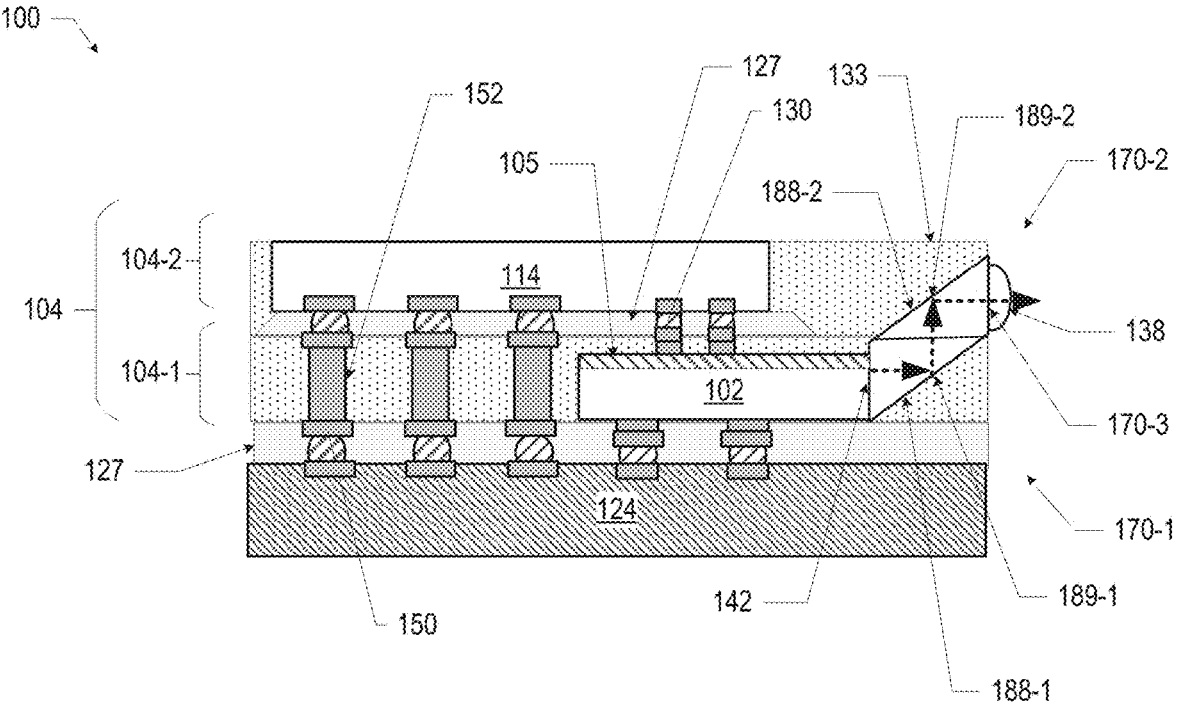

FIG. 25A is a side, cross-sectional illustration of a photonic package 100, according to some embodiments of the present disclosure. The photonic package 100 may include a multi-layer die subassembly 104 having an integrated light-reflective optical component 188 optically coupled to a PIC 102, where the light-reflective optical component 188 includes a first embedded reflector 189-1 and a second embedded reflector 189-2 for reflecting light. As shown in FIG. 25, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a light-reflective optical component 188 optically coupled to a lateral surface 142 of PIC 102 and extending at least partially through the insulating material 133 of a second layer 104-2 along the lateral side 142 of PIC 102, and a second layer 104-2 having an EIC 114 embedded in the insulating material 133. EIC 114 in the second layer 104-2 may be electrically coupled to PIC 102 and conductive pillars 152 in a first layer 104-1 via interconnects 130. The light-reflective optical component 188 may convert light traveling in a first lateral direction from PIC to travelling in a vertical direction, and then in a second lateral direction, as depicted by the dashed arrows. The light-reflective optical component 188 may also convert light traveling in a first lateral direction to a vertical direction, and then to a second lateral direction (not shown). The light-reflective optical component 188 may be optically coupled to PIC 102 using any suitable means, such as by optical glue or by oxide-to-oxide bonding. The light-reflective optical component 188 may be formed of any suitable material, including, for example, glass or acrylic. In some embodiments, the light-reflective optical component 188 may be formed of a first portion optically coupled to a second portion. FIG. 25B is a side, cross-sectional illustration of a photonic package 100 of FIG. 25A, where the light-reflective optical component 188 includes a first portion 188-1 with a first embedded reflector 189-1 and a second portion 188-2 with a second embedded reflector 189-2 for reflecting light (e.g., as shown in FIG. 25B, a first triangular prism portion 188-1 in the first layer 104-1 and a second triangular prism portion 188-2 in the second layer 104-2). The first portion 188-1 may be optically coupled to the second portion 188-2 using any suitable techniques, including, for example, optical glue, glass epoxy, or oxide-to-oxide bonding. The first and second embedded reflectors 189-1, 189-2 may include any suitable reflector, including, for example, a mirror reflector. The insulating material 133 of the second layer 104-2 may be on and over a top surface of the light-reflective optical component 188. PIC 102 may include TSVs (not shown) for electrically coupling to package substrate 124 via interconnects 150. The multi-layer die subassembly 104 may further include an optical lens 138 optically coupled at the peripheral surface (e.g., at the third surface 170-3) of the light-reflective optical component 188. Any suitable techniques may be used to manufacture the photonic package 100 of FIGS. 25A and 25B, including the example process for manufacturing a photonic package 100 as described in FIG. 5.

Figure 26A:
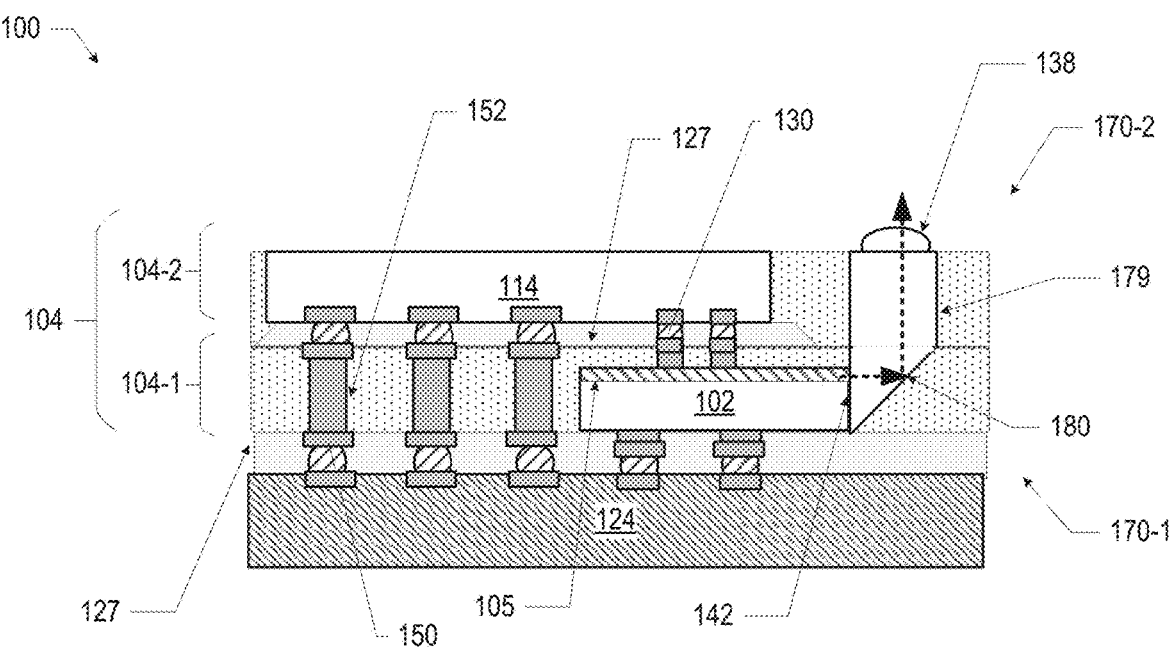
FIGS. 26A and 26B are schematic side, cross-sectional views of example photonic packaging architectures, in accordance with various embodiments.
Figure 26B:
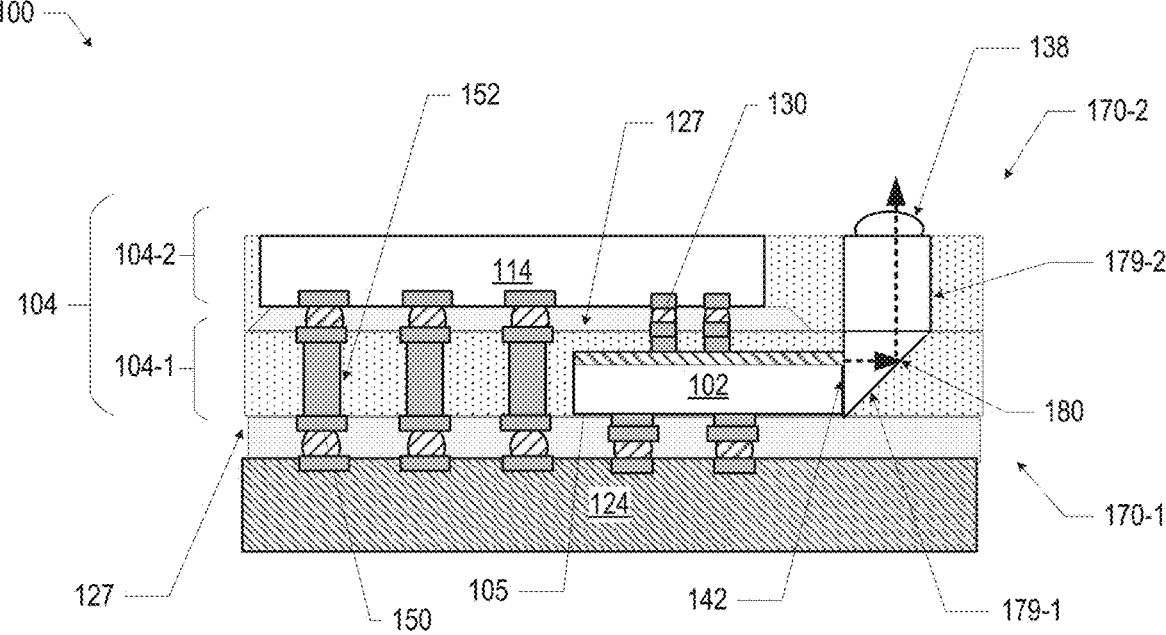

FIG. 26A is a side, cross-sectional illustration of a photonic package 100, according to some embodiments of the present disclosure. The photonic package 100 may include a multi-layer die subassembly 104 having an integrated light-reflective optical component 179 optically coupled to a PIC 102, where the light-reflective optical component 179 includes an embedded reflector 180 for reflecting light. As shown in FIG. 26, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a light-reflective optical component 179 optically coupled to a lateral surface 142 of PIC 102 and extending at least partially through the insulating material 133 of the first and second layers 104-1, 104-2 along the lateral side 142 of PIC 102, and a second layer 104-2 having an EIC 114 embedded in the insulating material 133. EIC 114 in the second layer 104-2 may be electrically coupled to PIC 102 and conductive pillars 152 in a first layer 104-1 via interconnects 130. The light-reflective optical component 179 may convert light traveling in a lateral direction from PIC to travelling in a vertical direction, as depicted by the dashed arrows. The light-reflective optical component 179 may also convert light traveling in a vertical direction (e.g., in through the second surface 170-2) to travelling in a lateral direction (not shown). The light-reflective optical component 179 may be optically coupled to PIC 102 using any suitable means, such as by optical glue or by oxide-to-oxide bonding. The light-reflective optical component 179 may be formed of any suitable material, including, for example, glass or acrylic. In some embodiments, the light-reflective optical component 179 may be formed of a first portion optically coupled to a second portion. FIG. 26B is a side, cross-sectional illustration of a photonic package 100 of FIG. 26A, where the light-reflective optical component 179 includes a first portion 179-1 with an embedded reflector 180 and a second portion 179-2 for reflecting light (e.g., as shown in FIG. 26B, a first triangular portion 179-1 in the first layer 104-1 and a second rectangular portion 179-2 in the second layer 104-2). The first portion 179-1 may be optically coupled to the second portion 179-2 using any suitable techniques, including, for example, optical glue, glass epoxy, or oxide-to-oxide bonding. The embedded reflector 180 may include any suitable reflector, including a mirror reflector. PIC 102 may include TSVs (not shown) for electrically coupling to package substrate 124 via interconnects 150. The multi-layer die subassembly 104 may further include an optical lens 138 optically coupled at the top surface (e.g., at the second surface 170-2) of the light-reflective optical component 179. Any suitable techniques may be used to manufacture the photonic package 100 of FIGS. 26A and 26B, including the example process for manufacturing a photonic package 100 as described in FIG. 5.

Figure 27:
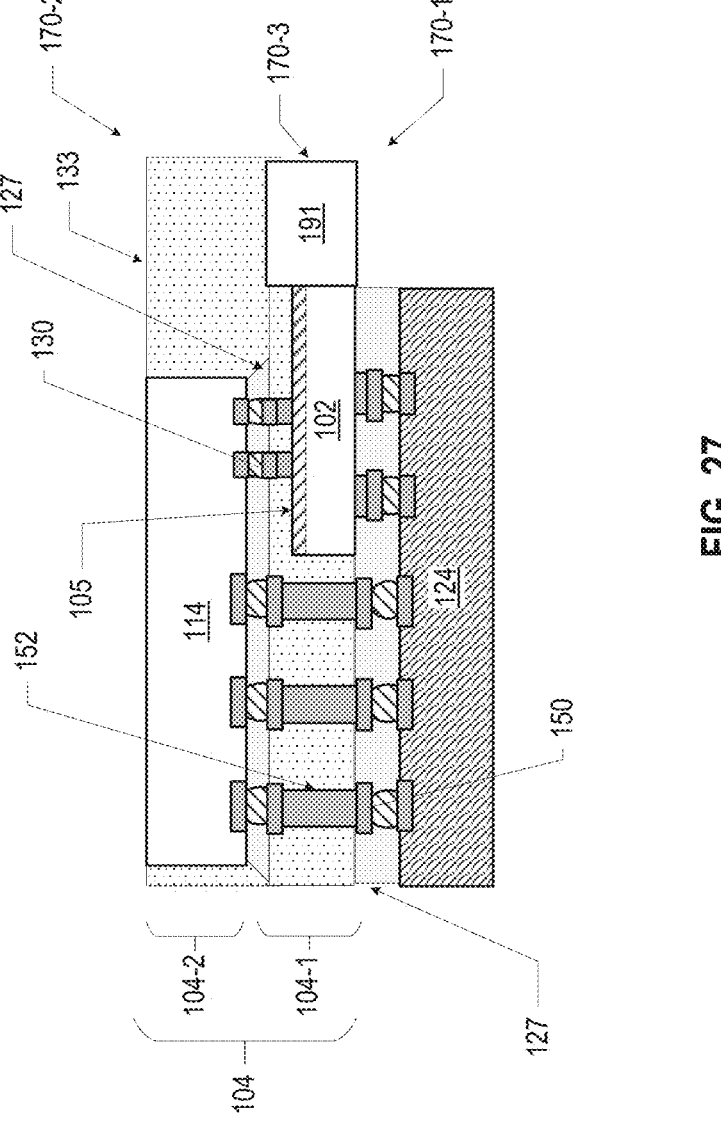
FIG. 27 is a schematic side, cross-sectional view of an example photonic packaging architecture, in accordance with various embodiments.

FIG. 27 is a side, cross-sectional illustration of a photonic package 100, according to some embodiments of the present disclosure. The photonic package 100 may include a multi-layer die subassembly 104 having an integrated waveguide 191 optically coupled to a PIC 102. As shown in FIG. 27, the multi-layer die subassembly 104 may include a first layer 104-1 having conductive pillars 152 and a PIC 102 with an active surface 105 facing up (e.g., the active surface 105 is facing towards a second surface 170-2) embedded in an insulating material 133, and a waveguide 191 optically coupled to a lateral surface 142 of PIC 102, and a second layer 104-2 having an EIC 114 embedded in the insulating material 133. In some embodiments, the waveguide 191 may extending at least partially through the insulating material 133 of the first layer 104-1 along the lateral side 142 of PIC 102. In some embodiments, the waveguide 191 may be flush with a top surface of PIC 102. EIC 114 in the second layer 104-2 may be electrically coupled to PIC 102 and conductive pillars 152 in a first layer 104-1 via interconnects 130. In some embodiments, the photonic package 100 may further include an optical lens (not shown) optically coupled to the integrated waveguide 191 on a bottom surface (e.g., at the first surface 170-1) or on a peripheral surface (e.g., at the third surface 170-3) depending on where light exits the waveguide 191. In some embodiments, the waveguide 191 may convert light traveling in a lateral direction from PIC 102 to travelling in a vertical direction (e.g., light may exit at the first surface 170-1 of the waveguide 191). The integrated waveguide 191 may be optically coupled to PIC 102 using any suitable means, such as by optical glue or by oxide-to-oxide bonding. The integrated waveguide 191 may be formed of any suitable material, including, for example, glass. In some embodiments, the waveguide 191 may be a laser written waveguide post assembly, so the light coming out of PIC 102 may align to an external waveguide connected to waveguide 191. The optical lens may be coupled to the waveguide 191 using any suitable means, such as by optical glue or by oxide-to-oxide bonding. PIC 102 may include TSVs (not shown) for electrically coupling to package substrate 124 via interconnects 150. Any suitable techniques may be used to manufacture the photonic package 100 of FIG. 27, including the example process for manufacturing a photonic package 100 as described in FIG. 18.

Various photonic packages as disclosed herein may be manufactured using any suitable techniques. For example, in some implementations, a choice of fabrication processes may depend on how PIC 102 is coupled to EIC 114 (e.g., using a flip-chip arrangement, or using some other arrangement). In another example, in some implementations, a choice of a technique may depend on the size and position of an integrated optical component. In yet other examples, a choice of technique may depend on ease of processing and availability of various materials.

FIG. 28 is a flow diagram of an example method of fabricating photonic package 100, according to various embodiments of the present disclosure. At 2802, metallization may be disposed on carrier 502 to generate conductive pillars 152, short pillars 153, and/or other conductive structures. Any suitable process may be used for disposing metallization, including electroplating and etching.

At 2804, a PIC 102 may be attached to the metallized carrier with the active surface 105 facing away from the carrier 502. A first optical component (e.g., an optical surface component 140) may be optically aligned and coupled to the active surface 105 of PIC 102 using optical glue. Other first-layer die may be attached to the metallized carrier. As used herein, the term "die" refers to an electrical and/or photonic device embodied in a semiconductor or similar substrate. In some embodiments, as in FIGS. 1A and 2, the first-layer die may comprise a bridge die 202. The attachment may include disposing the first-layer die over the metallized carrier such that pads and traces are aligned to enable electrical coupling to conductive pillars 152 and short pillars 153 as appropriate. Additional metallization, such as small pillars, may be disposed over the first-layer die and PIC 102.

At 2806, a first-layer insulating material 133 may be disposed over the metallized carrier 502, PIC 102, and the first-layer die using any suitable method such that the first-layer insulating material 133 encapsulates PIC 102, the first-layer die and the metallization. A top surface of the first-layer insulating material 133 may be planarized using CMP or any other suitable process. A top surface of the first optical component may be polished to create an optically smooth surface.

At 2808, a second optical component (e.g., optical component 137) may be optically aligned and coupled to the first optical component. In some embodiments, the second optical component may be omitted. In some embodiments, a channel forming structure may be attached to the active surface of PIC, where the channel-forming structure surrounds the first optical component. A second-layer die may be attached on a top surface of the first-layer insulating material 133. In some embodiments, as in FIG. 1A, the second-layer die may comprise EIC 114 and XPU 118. In some embodiments, as in FIG. 2, the second-layer die may comprise EIC 114. In some embodiments, attachment may comprise disposing the second-layer die such that appropriate interconnects are aligned with pads and traces to enable electrical coupling to the first-layer die through small pillars and appropriate interconnects are aligned with pads and traces to enable electrical coupling through conductive pillars. Underfill 127 may be disposed around the interconnects (e.g., between the second-layer die and the first-layer insulating material 133). The underfill process may include dispensing underfill material in liquid form, allowing the material to flow and fill interstitial gaps between the second-layer die and the first-layer insulating material 133, and subjecting the assembly to a curing process, such as baking, to solidify the material.

At 2810, a second-layer insulating material 133 may be disposed over the second-layer die and second optical component using any suitable method such that the second-layer insulating material 133 encapsulates the second-layer die and second optical component. A top surface of the second-layer insulating material 133 may be planarized using CMP or any other suitable process. A grinding (also called grind back) process may substantially planarize and/or smooth a top surface of the assembly, for example, to enable attaching a heat sink or other component as appropriate. A top surface of the second optical component may be polished to create an optically smooth surface.

At 2812, a third optical component (e.g., optical lens 138) may be optically aligned and coupled to the second optical component. In embodiments where the second optical component was omitted, a second optical component may be optically aligned and coupled to the first optical component.

At 2814, carrier 502 may be detached using any suitable process and surface finishing may be performed on the exposed surface. For example, interconnects may be attached such that electrical coupling to conductive pillars 152 and short pillars 153 is enabled, for example through other metallization such as pads, planes, traces and vias as appropriate. In some embodiments, the attachment may include dispensing solder paste on pads, attaching solder balls, and subjecting the assembly to a solder reflow process, causing the interconnects to integrate with conductive contacts on a bottom surface of the assembly.

FIG. 29 is a flow diagram of an example method of fabricating photonic package 100, according to various embodiments of the present disclosure. At 2902, metallization may be disposed on carrier 502 to generate conductive pillars 152, short pillars 153, and/or other conductive structures. Any suitable process may be used for disposing metallization, including electroplating and etching.

At 2904, a PIC 102 may be attached to the metallized carrier with the active surface 105 facing towards the carrier 502. Other first-layer die may be attached to the metallized carrier. As used herein, the term "die" refers to an electrical and/or photonic device embodied in a semiconductor or similar substrate. In some embodiments, as in FIG. 4, the first-layer die may comprise an XPU 118. The attachment may include disposing the first-layer die over the metallized carrier such that pads and traces are aligned to enable electrical coupling to conductive pillars 152 and short pillars 153 as appropriate. Additional metallization, such as small pillars, may be disposed over the first-layer die and PIC 102.

At 2906, a first-layer insulating material 133 may be disposed over the metallized carrier 502, PIC 102, and the first-layer die using any suitable method such that the first-layer insulating material 133 encapsulates PIC 102, the first-layer die and the metallization. A top surface of the first-layer insulating material 133 may be planarized using CMP or any other suitable process.

At 2908, a second-layer die may be attached on a top surface of the first-layer insulating material 133. In some embodiments, as in FIG. 4, the second-layer die may comprise EIC 114. In some embodiments, attachment may comprise disposing the second-layer die such that appropriate interconnects are aligned with pads and traces to enable electrical coupling to the first-layer die through small pillars and appropriate interconnects are aligned with pads and traces to enable electrical coupling through conductive pillars. Underfill 127 may be disposed around the interconnects (e.g., between the second-layer die and the first-layer insulating material 133). The underfill process may include dispensing underfill material in liquid form, allowing the material to flow and fill interstitial gaps between the second-layer die and the first-layer insulating material 133, and subjecting the assembly to a curing process, such as baking, to solidify the material.

At 2910, a second-layer insulating material 133 may be disposed over the second-layer die using any suitable method such that the second-layer insulating material 133 encapsulates the second-layer die and second optical component. A top surface of the second-layer insulating material 133 may be planarized using CMP or any other suitable process. A grinding (also called grind back) process may substantially planarize and/or smooth a top surface of the assembly, for example, to enable attaching a heat sink or other component as appropriate.

At 2912, carrier 502 may be detached using any suitable process. An optical component may be optically aligned and coupled to the active surface 105 of PIC 102 using optical glue. The active surface 105 of PIC 102 may be polished to create an optically smooth surface. A surface finishing may be performed on the exposed surface. For example, interconnects may be attached such that electrical coupling to conductive pillars 152 and short pillars 153 is enabled, for example through other metallization such as pads, planes, traces and vias as appropriate. In some embodiments, the attachment may include dispensing solder paste on pads, attaching solder balls, and subjecting the assembly to a solder reflow process, causing the interconnects to integrate with conductive contacts on a bottom surface of the assembly.

FIG. 30 is a flow diagram of an example method of fabricating photonic package 100, according to various embodiments of the present disclosure. At 3002, metallization may be disposed on carrier 502 to generate conductive pillars 152, short pillars 153, and/or other conductive structures. Any suitable process may be used for disposing metallization, including electroplating and etching.

At 3004, a first-layer die may be attached to the metallized carrier. As used herein, the term "die" refers to an electrical and/or photonic device embodied in a semiconductor or similar substrate. In some embodiments, as in FIG. 12A, the first-layer die may comprise an EIC 114. The attachment may include disposing the first-layer die over the metallized carrier such that pads and traces are aligned to enable electrical coupling to conductive pillars 152 and short pillars 153 as appropriate. Additional metallization, such as small pillars, may be disposed over the first-layer die.

At 3006, a first-layer insulating material 133 may be disposed over the metallized carrier 502 and the first-layer die using any suitable method such that the first-layer insulating material 133 encapsulates the first-layer die and the metallization. A top surface of the first-layer insulating material 133 may be planarized using CMP or any other suitable process.

At 3008, a PIC 102 may be attached on a top surface of the first-layer insulating material 133 with the active surface 105 facing away from the carrier 502. A first optical component (e.g., an optical surface component 140) may be optically aligned and coupled to the active surface 105 of PIC 102 using optical glue. A second-layer die may be attached on a top surface of the first-layer insulating material 133. In some embodiments, as in FIG. 12A, the second-layer die may comprise XPU 118. In some embodiments, attachment may comprise disposing PIC 102 and/or the second-layer die such that appropriate interconnects are aligned with pads and traces to enable electrical coupling to the first-layer die through small pillars and appropriate interconnects are aligned with pads and traces to enable electrical coupling through conductive pillars. Underfill 127 may be disposed around the interconnects (e.g., between PIC 102 and the second-layer die, and the first-layer insulating material 133). The underfill process may include dispensing underfill material in liquid form, allowing the material to flow and fill interstitial gaps between PIC 102 and the second-layer die, and the first-layer insulating material 133, and subjecting the assembly to a curing process, such as baking, to solidify the material.

At 3010, a second-layer insulating material 133 may be disposed over the second-layer die and PIC 102 using any suitable method such that the second-layer insulating material 133 encapsulates the second-layer die and PIC 102. A top surface of the second-layer insulating material 133 may be planarized using CMP or any other suitable process. A grinding (also called grind back) process may substantially planarize and/or smooth a top surface of the assembly, for example, to enable attaching a heat sink or other component as appropriate. A top surface of the optical component on PIC 102 may be polished to create an optically smooth surface.

At 3012, a second optical component (e.g., optical lens 138) may be optically aligned and coupled to the first optical component.

At 3014, carrier 502 may be detached using any suitable process and surface finishing may be performed on the exposed surface. For example, interconnects may be attached such that electrical coupling to conductive pillars 152 and short pillars 153 is enabled, for example through other metallization such as pads, planes, traces and vias as appropriate. In some embodiments, the attachment may include dispensing solder paste on pads, attaching solder balls, and subjecting the assembly to a solder reflow process, causing the interconnects to integrate with conductive contacts on a bottom surface of the assembly.

FIG. 31 is a flow diagram of an example method of fabricating photonic package 100, according to various embodiments of the present disclosure. At 3102, metallization may be disposed on carrier 502 to generate conductive pillars 152, short pillars 153, and/or other conductive structures. Any suitable process may be used for disposing metallization, including electroplating and etching.

At 3104, a first-layer die may be attached to the metallized carrier. As used herein, the term "die" refers to an electrical and/or photonic device embodied in a semiconductor or similar substrate. In some embodiments, as in FIGS. 15A and 15B, the first-layer die may comprise an EIC 114. The attachment may include disposing the first-layer die over the metallized carrier such that pads and traces are aligned to enable electrical coupling to conductive pillars 152 and short pillars 153 as appropriate. Additional metallization, such as small pillars, may be disposed over the first-layer die. In some embodiments, a channel-forming structure 141 may be attached to the carrier 502.

At 3106, a first-layer insulating material 133 may be disposed over the metallized carrier 502 and the first-layer die using any suitable method such that the first-layer insulating material 133 encapsulates the first-layer die and the metallization. A top surface of the first-layer insulating material 133 may be planarized using CMP or any other suitable process. In some embodiments, planarization of the first-layer insulating material 133 may form a channel 159. A portion of the first-layer insulating material 133 may be removed, for example, using laser drilling, to form a cavity for an optical component.

At 3108, an optical component (e.g., optical component 182 of FIG. 15 or optical component 137 of FIG. 11) may be optically aligned and coupled to an active surface 105 of PIC 102. In some embodiments, PIC 102 may be attached on a top surface of the first-layer insulating material 133 with the active surface 105 facing towards the carrier 502, where the optical component (e.g., optical component 182) is aligned with the cavity and fits within the cavity. In some embodiments, PIC 102 may be attached on a top surface of the first-layer insulating material 133 with the active surface 105 facing towards the carrier 502, where the optical component (e.g., optical component 137) is aligned with the channel. A second-layer die may be attached on a top surface of the first-layer insulating material 133. In some embodiments, as in FIG. 15, the second-layer die may comprise EIC 114 and XPU 118. In some embodiments, as in FIG. 11, the second-layer die may comprise EIC 114. In some embodiments, attachment may comprise disposing PIC 102 and the second-layer die such that appropriate interconnects are aligned with pads and traces to enable electrical coupling to the first-layer die through small pillars and appropriate interconnects are aligned with pads and traces to enable electrical coupling through conductive pillars. Underfill 127 may be disposed around the interconnects (e.g., between PIC 102 and the second-layer die, and the first-layer insulating material 133). The underfill process may include dispensing underfill material in liquid form, allowing the material to flow and fill interstitial gaps between PIC 102 and the second-layer die, and the first-layer insulating material 133, and subjecting the assembly to a curing process, such as baking, to solidify the material.

At 3110, a second-layer insulating material 133 may be disposed over PIC 102 and the second-layer die using any suitable method such that the second-layer insulating material 133 encapsulates PIC 102 and the second-layer die. A top surface of the second-layer insulating material 133 may be planarized using CMP or any other suitable process. A grinding (also called grind back) process may substantially planarize and/or smooth a top surface of the assembly, for example, to enable attaching a heat sink or other component as appropriate. A peripheral surface of the optical component may be polished to create an optically smooth surface.

At 3112, carrier 502 may be detached using any suitable process and surface finishing may be performed on the exposed surface. For example, interconnects may be attached such that electrical coupling to conductive pillars 152 and short pillars 153 is enabled, for example through other metallization such as pads, planes, traces and vias as appropriate. In some embodiments, the attachment may include dispensing solder paste on pads, attaching solder balls, and subjecting the assembly to a solder reflow process, causing the interconnects to integrate with conductive contacts on a bottom surface of the assembly.

Figures 32, 33:
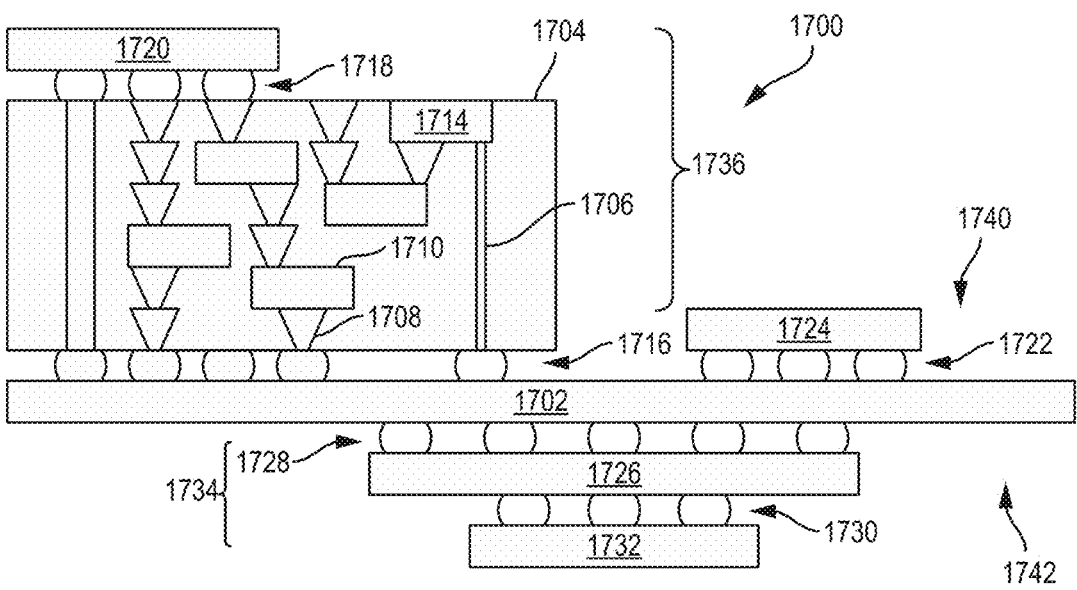
FIG. 32 is a cross-sectional side view of a device assembly that may include one or more photonic packages in accordance with any of the embodiments disclosed herein.
FIG. 33 is a block diagram of an example computing device that may include one or more photonic packages in accordance with any of the embodiments disclosed herein.

The photonic packages 100 disclosed herein may be included in any suitable electronic/photonic component. FIGS. 32 and 33 illustrate various examples of packages, assemblies, and devices that may be used with or include any of the photonic packages as disclosed herein.

FIG. 32 is a cross-sectional side view of an IC device assembly 1700 that may include any of the photonic packages 100 disclosed herein. In some embodiments, the IC device assembly 1700 may be a photonic packages 100. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. Any of the IC packages discussed below with reference to the IC device assembly 1700 may take the form of any suitable ones of the embodiments of the photonic packages 100 disclosed herein.

In some embodiments, the circuit board 1702 may be a PCB including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate. In some embodiments the circuit board 1702 may be, for example, a circuit board.

The IC device assembly 1700 illustrated in FIG. 32 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702, and may include solder balls (as shown in FIG. 32), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 32, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die, an IC device (e.g., the IC device 1600 of FIG. 13), or any other suitable component. Generally, the interposer 1704 may spread a connection to a wider pitch or reroute a connection to a different connection. For example, the interposer 1704 may couple the IC package 1720 (e.g., a die) to a set of ball grid array (BGA) conductive contacts of the coupling components 1716 for coupling to the circuit board 1702. In the embodiment illustrated in FIG. 32, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

In some embodiments, the interposer 1704 may be formed as a PCB, including multiple metal layers separated from one another by layers of dielectric material and interconnected by electrically conductive vias. In some embodiments, the interposer 1704 may be formed of an epoxy resin, a fiberglass-reinforced epoxy resin, an epoxy resin with inorganic fillers, a ceramic material, or a polymer material such as polyimide. In some embodiments, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to TSVs 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1704. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 32 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

FIG. 33 is a block diagram of an example electrical device 1800 that may include one or more of the photonic packages 100 disclosed herein. For example, any suitable ones of the components of the electrical device 1800 may include one or more of the IC device assemblies 1700, IC devices 1600, or dies disclosed herein, and may be arranged in any of the photonic packages 100 disclosed herein. A number of components are illustrated in FIG. 33 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 33, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random access memory (eDRAM) or spin transfer torque magnetic random access memory (STT-M RAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMLS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a computing device or a hand-held, portable or mobile computing device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server, or other networked computing component, a printer, a scanner, a monitor, a set-top box, an entertainment control unit, a vehicle control unit, a digital camera, a digital video recorder, or a wearable computing device. In some embodiments, the electrical device 1800 may be any other electronic device that processes data.

The following paragraphs provide various examples of the embodiments disclosed herein.

Example 1A is a photonic assembly, including a photonic integrated circuit (PIC), having an active surface and an opposing backside, in a first layer, wherein the first layer includes an insulating material and the PIC is embedded in the insulating material with the active surface facing up; a conductive pillar in the first layer; an integrated circuit (IC) in a second layer electrically coupled to the active surface of the PIC and the conductive pillar, wherein the second layer is on the first layer, the second layer includes the insulating material, and the IC is embedded in the insulating material; and an optical component optically coupled to the active surface of the PIC and extending through the insulating material in the second layer.

Example 2A may include subject matter of Example 1A, and may further specify that the optical component is a glass block, a waveguide, a fiber array block, or a pass-through structure.

Example 3A may include the subject matter of Examples 1A or 2A, and may further specify that the optical component is a first optical component, and the photonic assembly may further include a second optical component optically coupled to the first optical component.

Example 4A may include the subject matter of Example 3A, and may further specify that the first optical component is a glass block and the second optical component is a glass block, a fiber array block, a waveguide, a laser written waveguide, a lens array, a pass-through structure, or a composite optical component.

Example 5A may include the subject matter of Example 3A, and may further include a third optical component optically coupled to the second optical component.

Example 6A may include the subject matter of Example 5A, and may further specify that the third optical component is an optical lens.

Example 7A may include the subject matter of any of Examples 1A-6A, and may further specify that the IC is electrically coupled to the conductive pillar and the active surface of the PIC.

Example 8A may include the subject matter of any of Examples 1A-7A, and may further include a bridge die in the first layer electrically coupled to the IC.

Example 9A may include the subject matter of Example 8A, and may further include a processor circuit in the second layer electrically coupled to the bridge die.

Example 10A may include the subject matter of any of Examples 1A-9A, and may further include a package substrate electrically coupled to the backside of the PIC and the conductive pillar.

Example 11A may include the subject matter of any of Examples 1A-10A, and may further specify that the insulating material is a first insulating material in the first layer, and the photonic assembly may further include a second insulating material in the second layer, wherein the second insulating material is different than the first insulating material.

Example 12A is a photonic assembly, including an integrated circuit (IC) in a first layer including an insulating material, wherein the IC is embedded in the insulating material; a photonic integrated circuit (PIC), having an active surface, in a second layer, wherein the second layer is on the first layer, the second layer includes the insulating material, and the PIC is embedded in the insulating material with the active surface facing the first layer and electrically coupled to the IC; and an optical component optically coupled to the active surface of the PIC and extending through the insulating material in the first layer.

Example 13A may include the subject matter of Example 12A, and may further specify that the optical component is a glass block, a waveguide, a fiber array block, or a pass-through structure.

Example 14A may include the subject matter of Example 12A, and may further specify that the optical component is a first optical component, and the photonic assembly may further include a second optical component optically coupled to the first optical component.

Example 15A may include the subject matter of Example 14A, and may further specify that the first optical component is a glass block and the second optical component is a glass block, a waveguide, a fiber array block, or a pass-through structure.

Example 16A may include the subject matter of Example 14A, and may further include a third optical component optically coupled to the second optical component.

Example 17A may include the subject matter of Example 16A, and may further specify that the third optical component is an optical lens.

Example 18A may include the subject matter of any of Examples 12A-17A, and may further include a conductive pillar in the first layer embedded in the insulating material; and a processor circuit in the second layer embedded in the insulating material and electrically coupled to the IC and the conductive pillar.

Example 19A may include the subject matter of any of Examples 12A-18A, and may further specify that the IC includes a first surface and an opposing second surface and the second layer is at the second surface of the IC, and the photonic assembly may further include a package substrate electrically coupled to the first surface of the IC, wherein the package substrate includes an aperture and the optical component is aligned with the aperture.

Example 20A may include the subject matter of any of Examples 12A-19A, and may further specify that the insulating material is a first insulating material in the first layer, and the photonic assembly may further include a second insulating material in the second layer, wherein the second insulating material is different than the first insulating material.

Example 21A may include the subject matter of any of Examples 12A-20A, and may further specify that the PIC includes a backside surface opposite the active surface, and the photonic assembly may further include a heat transfer structure at the backside surface of the PIC.

Example 22A may include the subject matter of Example 19A, and may further include a heat transfer structure embedded in the package substrate.

Example 23A is a method of manufacturing a photonic assembly, including optically coupling a first optical component to an optical element on an active surface of a photonic integrated circuit (PIC); encapsulating the PIC and the first optical component with an insulating material and planarizing the insulating material to expose a top surface of the first optical component; optically coupling a second optical component to the top surface of the first optical component; electrically coupling a die to the active surface of the PIC; and encapsulating the die and the second optical component with the insulating material and planarizing the insulating material to expose a top surface of the second optical component.

Example 24A may include the subject matter of Example 23A, and may further specify that the first optical component is a glass block and the second optical component is a glass block, a fiber array block, a waveguide, a laser written waveguide, a lens array, a pass-through structure, or a composite optical component.

Example 25A may include the subject matter of Examples 23A or 24A, and may further include optically coupling a third optical component to the top surface of the second optical component.

Example 26A may include the subject matter of Example 25A, and may further specify that the third optical component is an optical lens.

Example 27A may include the subject matter of any of Examples 23A-26A, and may further specify that the PIC includes a backside surface opposite the active surface, and the method and may further include electrically coupling the backside surface of the PIC to a package substrate.

Example 28A may include the subject matter of any of Examples 23A-27A, and may further specify that the PIC is disposed on a carrier with the active surface facing away from the carrier, and the method and may further include disposing metallization on the carrier to form a conductive pillar; encapsulating the conductive pillar, the PIC and the first optical component with the insulating material; and electrically coupling the die to the conductive pillar.

Example 29A is a method of manufacturing a photonic assembly, including attaching a photonic integrated circuit (PIC) to a carrier, wherein the PIC has an active surface and an opposing backside surface, and the PIC is attached to the carrier with the active surface facing away from the carrier; optically coupling a first optical component to an optical element on the active surface of the PIC; encapsulating the PIC with an insulating material and planarizing; optically coupling a second optical component to the top surface of the first optical component; electrically coupling a die to the active surface of the PIC; encapsulating the PIC and the second optical component with the insulating material and planarizing the insulating material to expose a top surface of the second optical component; and removing the carrier.

Example 30A may include the subject matter of Example 29A, and may further specify that the first optical component is a glass block and the second optical component is a glass block, a fiber array block, a waveguide, a laser written waveguide, a lens array, a pass-through structure, or a composite optical component.

Example 31A may include the subject matter of Examples 29A or 30A, and may further include optically coupling a third optical component to the top surface of the second optical component.

Example 32A may include the subject matter of Example 31A, and may further specify that the third optical component is an optical lens.

Example 33A may include the subject matter of any of Examples 29A-32A, and may further specify that the die includes a first surface and an opposing second surface and the second surface is coupled to the active surface of the PIC, and the method and may further include; electrically coupling the first surface of the die to a package substrate.

Example 34A may include the subject matter of any of Examples 29A-33A, and may further specify that the die is a second die, and the method and may further include attaching a first die on the carrier and encapsulating the first die and the PIC with the insulating material; disposing metallization on a top surface of the first die to form a conductive pillar; encapsulating the conductive pillar, the second die, and the second optical component with the insulating material; and electrically coupling the first die to a package substrate via the conductive pillar.

Example 1B is a photonic assembly, including a photonic integrated circuit (PIC), having an active surface and an opposing backside, in a first layer, wherein the first layer includes an insulating material and the PIC is embedded in the insulating material with the active surface facing up; a conductive pillar in the first layer; an integrated circuit (IC) in a second layer electrically coupled to the active surface of the PIC and the conductive pillar, wherein the second layer is on the first layer, the second layer includes the insulating material, and the IC is embedded in the insulating material; an optical component optically coupled to the active surface of the PIC; and a hollow channel surrounding the optical component, the hollow channel extending from the active surface of the PIC through the insulating material in the second layer.

Example 2B may include the subject matter of Example 1B, and may further specify that the optical component is a glass block, a waveguide, a fiber array block, or a pass-through structure.

Example 3B may include the subject matter of Examples 1B or 2B, and may further specify that the optical component is a first optical component, and the photonic assembly may further include a second optical component optically coupled to the first optical component.

Example 4B may include the subject matter of Example 3B, and may further specify that the second optical component is an optical lens.

Example 5B may include the subject matter of any of Examples 1B-4B, and may further specify that the IC is electrically coupled to the conductive pillar and the active side of the PIC.

Example 6B may include the subject matter of any of Examples 1B-5B, and may further include a bridge die in the first layer electrically coupled to the IC.

Example 7B may include the subject matter of Example 6B, and may further include a processor circuit in the second layer electrically coupled to the bridge die.

Example 8B may include the subject matter of any of Examples 1B-7B, and may further include a package substrate electrically coupled to the backside of the PIC and the conductive pillar.

Example 9B may include the subject matter of any of Examples 1B-8B, and may further specify that the insulating material is a first insulating material in the first layer, and the photonic assembly may further include a second insulating material in the second layer, wherein the second insulating material is different than the first insulating material.

Example 10B may include the subject matter of any of Examples 1B-9B, and may further specify that the IC includes a first surface facing the first layer and an opposing second surface, and the photonic assembly may further include a heat transfer structure at the second surface of the IC.

Example 11B may include the subject matter of Example 8B, and may further include a heat transfer structure embedded in the package substrate.

Example 12B is a photonic assembly, including an integrated circuit (IC) in a first layer including an insulating material, wherein the IC is embedded in the insulating material; a photonic integrated circuit (PIC), having an active surface, in a second layer, wherein the second layer is on the first layer, the second layer includes the insulating material, and the PIC is embedded in the insulating material with the active surface facing the first layer and electrically coupled to the IC; an optical component optically coupled to the active surface of the PIC; and a hollow channel surrounding the optical component, the hollow channel extending from the active surface of the PIC through the insulating material in the first layer.

Example 13B may include the subject matter of Example 12B, and may further specify that the optical component is a glass block, a waveguide, a fiber array block, a pass-through structure, or an optical lens.

Example 14B may include the subject matter of Examples 12B or 13B, and may further specify that the optical component is a first optical component, and the photonic assembly may further include a second optical component optically coupled to the first optical component.

Example 15B may include the subject matter of Example 14B, and may further specify that the first optical component is a glass block and the second optical component is an optical lens.

Example 16B may include the subject matter of any of Examples 12B-15B, and may further include a conductive pillar in the first layer embedded in the insulating material; and a processor circuit in the second layer embedded in the insulating material and electrically coupled to the IC and the conductive pillar.

Example 17B may include the subject matter of any of Examples 12B-16B, and may further specify that the IC includes a first surface and an opposing second surface and the second layer is at the second surface of the IC, and the photonic assembly may further include a package substrate electrically coupled to the first surface of the IC, wherein the package substrate includes an aperture and the optical component is aligned with the aperture.

Example 18B may include the subject matter of any of Examples 12B-17B, and may further specify that the insulating material is a first insulating material in the first layer, and the photonic assembly may further include a second insulating material in the second layer, wherein the second insulating material is different than the first insulating material.

Example 19B may include the subject matter of any of Examples 12B-18B, and may further specify that the PIC includes a backside surface opposite the active surface, and the photonic assembly may further include a heat transfer structure at the backside surface of the PIC.

Example 20B may include the subject matter of Example 17B, and may further include a heat transfer structure embedded in the package substrate.

Example 21B is a method of manufacturing a photonic assembly, including optically coupling a first optical component to an optical element on an active surface of a photonic integrated circuit (PIC); attaching a first lidded, channel-forming structure around the first optical component; encapsulating the PIC and the first lidded, channel-forming structure with the insulating material; planarizing the insulating material to remove the lidded portion of the first channel-forming structure; attaching a second lidded, channel-forming structure around the first optical component; electrically coupling a die to the active surface of the PIC; encapsulating the die and the second lidded, channel-forming structure with the insulating material; planarizing the insulating material to remove the lidded portion of the second channel-forming structure; and optically coupling a second optical component to the first optical component.

Example 22B may include the subject matter of Example 21B, and may further specify that the first optical component is a glass block and the second optical component is an optical lens.

Example 23B may include the subject matter of Examples 21B or 22B, and may further specify that the PIC includes a backside surface opposite the active surface, and the method and may further include electrically coupling the backside surface of the PIC to a package substrate.

Example 24B may include the subject matter of any of Examples 21B-23B, and may further specify that the PIC is disposed on a carrier with the active surface facing away from the carrier, and the method and may further include disposing metallization on the carrier to form a conductive pillar; encapsulating the conductive pillar with the insulating material with the PIC and the first lidded, channel-forming structure; and electrically coupling the die to the conductive pillar.

Example 25B is a method of manufacturing a photonic assembly, including attaching a lidded, channel-forming structure to a carrier with the lidded portion away from the carrier; attaching a die to the carrier; encapsulating the die and the lidded, channel-forming structure with an insulating material; planarizing the insulating material to remove the lidded portion of the channel-forming structure; optically coupling a first optical component to an optical element on an active surface of a photonic integrated circuit (PIC); electrically coupling the active surface of the PIC to the die and aligning the first optical component with the channel-forming structure; encapsulating the PIC with the insulating material and planarizing the insulating material; removing the carrier; and optically coupling a second optical component to the first optical component.

Example 26B may include the subject matter of Example 25B, and may further specify that the first optical component is a glass block and the second optical component is an optical lens.

Example 27B may include the subject matter of Examples 25B or 26B, and may further specify that the die includes a first surface and an opposing second surface and the second surface is coupled to the PIC, and the method and may further include; electrically coupling the first surface of the die to a package substrate, wherein the package substrate includes an aperture and the second optical component is aligned with the aperture.

Example 28B may include the subject matter of any of Examples 25B-27B, and may further specify that the die is a first die in a first layer, and the method and may further include disposing metallization on the carrier to form a conductive pillar; encapsulating the conductive pillar, the first die, and the lidded, channel-forming structure with the insulating material; and electrically coupling a second die in a second layer to the conductive pillar and the first die.

Example 29B may include the subject matter of any of Examples 25B-28B, and may further specify that a material of the lidded, channel-forming structure includes an insulating material, silicon, silicon and oxygen, a plastic, a ceramic, a metal, such as copper, steel, a fiber reinforced material, and combinations thereof.

Example 1C is a photonic assembly, including a photonic integrated circuit (PIC), having an active side and an opposing backside, in a first layer, wherein the first layer includes an insulating material and the PIC is embedded in the insulating material with the active side facing down; a conductive pillar in the first layer; an integrated circuit (IC) in a second layer electrically coupled to the backside of the PIC and the conductive pillar, wherein the second layer is on the first layer, the second layer includes the insulating material, and the IC is embedded in the insulating material; and an optical component optically coupled to the active surface of the PIC.

Example 2C may include the subject matter of Example 1C, and may further specify that the optical component is a glass block, a waveguide, a fiber array block, a pass-through structure, or an optical lens.

Example 3C may include the subject matter of Examples 1C or 2C, and may further specify that the optical component is a first optical component, and the photonic assembly may further include a second optical component optically coupled to the first optical component.

Example 4C may include the subject matter of Example 3C, and may further specify that the first optical component is a glass block and the second optical component is a glass block, a waveguide, a fiber array block, a pass-through structure, or an optical lens.

Example 5C may include the subject matter of any of Examples 1C-4C, and may further include a bridge die in the first layer electrically coupled to the IC.

Example 6C may include the subject matter of Example 5C, and may further include a processor circuit in the second layer electrically coupled to the bridge die.

Example 7C may include the subject matter of any of Examples 1C-6C, and may further include an optical glue surrounding the optical component.

Example 8C may include the subject matter of any of Examples 1C-7C, and may further specify that the IC includes a first surface electrically coupled to the PIC and an opposing second surface, and may further include a heat transfer structure at the second surface of the IC.

Example 9C may include the subject matter of any of Examples 1C-8C, and may further include a package substrate electrically coupled to the active side of PIC, wherein the package substrate includes an aperture and the optical component is aligned with the aperture.

Example 10C may include the subject matter of Example 9C, and may further include a heat transfer structure in the package substrate.

Example 11C may include the subject matter of any of Examples 1C-10C, and may further specify that the insulating material is a first insulating material in the first layer, and the photonic assembly may further include a second insulating material in the second layer, wherein the second insulating material is different than the first insulating material.

Example 12C is a photonic assembly, including an integrated circuit (IC) in a first layer including an insulating material, wherein the IC is embedded in the insulating material; a photonic integrated circuit (PIC), having an active side and an opposing backside, in a second layer, wherein the second layer is on the first layer, the second layer includes the insulating material, the PIC is embedded in the insulating material with the active side facing away from the first layer, and the backside of the PIC is electrically coupled to the IC; and an optical component optically coupled to the active side of the PIC at least partially embedded in the insulating material in the second layer.

Example 13C may include the subject matter of Example 12C, and may further specify that the optical component is a glass block, a waveguide, a fiber array block, a pass-through structure, or an optical lens.

Example 14C may include the subject matter of Examples 12C or 13C, and may further specify that the optical component is a first optical component, and the photonic assembly may further include a second optical component optically coupled to the first optical component.

Example 15C may include the subject matter of Example 14C, and may further specify that the first optical component is a glass block and the second optical component is a glass block, a waveguide, a fiber array block, a pass-through structure, or an optical lens.

Example 16C may include the subject matter of any of Examples 12C-15C, and may further specify that the IC includes a first surface and an opposing second surface and the second layer is at the second surface of the IC, and the photonic assembly may further include a conductive pillar in the first layer embedded in the insulating material; and a processor circuit in the second layer embedded in the insulating material and electrically coupled to the IC and the conductive pillar.

Example 17C may include the subject matter of Example 16C, and may further specify that the processor circuit includes a first surface and an opposing second surface and the processor circuit is electrically coupled to the IC at the first surface, and the photonic assembly may further include a heat transfer structure at the second surface of the processor circuit.

Example 18C may include the subject matter of any of Examples 12C-17C, and may further specify that the IC includes a first surface and an opposing second surface and the second layer is at the second surface of the IC, and the photonic assembly may further include a package substrate electrically coupled to the first surface of the IC.

Example 19C may include the subject matter of any of Examples 12C-18C, and may further include a redistribution layer.

Example 20C may include the subject matter of any of Examples 12C-19C, and may further specify that the insulating material is a first insulating material in the first layer, and the photonic assembly may further include a second insulating material in the second layer, wherein the second insulating material is different than the first insulating material.

Example 21C is a method of manufacturing a photonic assembly, including attaching a photonic integrated circuit (PIC) to a carrier, wherein the PIC has an active surface and an opposing backside surface, and the PIC is attached to the carrier with the active surface facing towards the carrier; encapsulating the PIC with an insulating material and planarizing; electrically coupling a die to the backside surface of the PIC; and encapsulating the die with the insulating material and planarizing; removing the carrier; and optically coupling an optical component to an optical element on the active surface of the PIC.

Example 22C may include the subject matter of Example 21C, and may further specify that the optical component is an optical lens.

Example 23C may include the subject matter of Examples 21C or 22C, and may further specify that the optical component is a first optical component, and the method and may further include optically coupling a second optical component to the first optical component.

Example 24C may include the subject matter of Example 23C, and may further specify that the first optical component is a glass block and the second optical component is an optical lens.

Example 25C may include the subject matter of any of Examples 21C-24C, and may further include electrically coupling the active surface of the PIC to a package substrate.

Example 26C may include the subject matter of any of Examples 21C-25C, and may further include disposing metallization on the carrier to form a conductive pillar; encapsulating the conductive pillar and the PIC with the insulating material; and electrically coupling the die to the conductive pillar.

Example 27C is a method of manufacturing a photonic assembly, including attaching a die to a carrier; encapsulating the die and planarizing the insulating material; electrically coupling a backside surface of a photonic integrated circuit (PIC) to the die, wherein the PIC includes an active surface opposite the backside surface; optically coupling a first optical component to an optical element on the active surface of the PIC; encapsulating the PIC with the insulating material and planarizing the insulating material to reveal a top surface of the first optical component; optically coupling a second optical component to the first optical component; and removing the carrier.

Example 28C may include the subject matter of Example 27C, and may further specify that the first optical component is a glass block and the second optical component is an optical lens.

Example 29C may include the subject matter of Examples 27C or 28C, and may further specify that the die includes a first surface and an opposing second surface and the second surface is coupled to the PIC, and the method and may further include; electrically coupling the first surface of the die to a package substrate.

Example 30C may include the subject matter of any of Examples 25C-29C, and may further specify that the die is a first die in a first layer, and the method and may further include disposing metallization on the carrier to form a conductive pillar; encapsulating the conductive pillar and the first die with the insulating material; and electrically coupling a second die in a second layer to the conductive pillar and the first die.

Example 1D is a photonic assembly, including a photonic integrated circuit (PIC), having an active side and an opposing backside, in a first layer, wherein the first layer includes an insulating material and the PIC is embedded in the insulating material with the active side facing up; an optical component optically coupled to the active surface of the PIC and extending at least partially through the first layer; and an integrated circuit (IC) in a second layer electrically coupled to the active side of the PIC, wherein the second layer is on the first layer, the second layer includes the insulating material, and the IC is embedded in the insulating material.

Example 2D may include the subject matter of Example 1D, and may further specify that the optical component is a fiber array block.

Example 3D may include the subject matter of Examples 1D or 2D, and may further specify that the optical component is a first optical component, and the photonic assembly may further include a second optical component optically coupled to the first optical component.

Example 4D may include the subject matter of Example 3D, and may further specify that the first optical component is a glass block and the second optical component is a fiber array block.

Example 5D may include the subject matter of Example 2D, and may further specify that the fiber array block includes a fiber array, a lid, and a glass v-groove.

Example 6D may include the subject matter of Example 2D, and may further specify that the fiber array block includes a fiber array, a lid, a glass v-groove, and a lateral optical portion.

Example 7D may include the subject matter of any of Examples 1D-6D, and may further include a conductive pillar in the first layer, wherein the IC is electrically coupled to the conductive pillar.

Example 8D may include the subject matter of any of Examples 1D-7D, and may further include a bridge die in the first layer electrically coupled to the IC.

Example 9D may include the subject matter of Example 8D, and may further include a processor circuit in the second layer electrically coupled to the bridge die.

Example 10D may include the subject matter of any of Examples 1D-9D, and may further include a package substrate electrically coupled to the back side of the PIC.

Example 11D may include the subject matter of any of Examples 1D-10D, and may further specify that the insulating material is a first insulating material in the first layer, and the photonic assembly may further include a second insulating material in the second layer, wherein the second insulating material is different than the first insulating material.

Example 12D is a photonic assembly, including an integrated circuit (IC) in a first layer including an insulating material, wherein the IC is embedded in the insulating material; a photonic integrated circuit (PIC), having an active side and an opposing backside, in a second layer, wherein the second layer is on the first layer, the second layer includes the insulating material, the PIC is embedded in the insulating material with the active side facing towards the first layer, and the active side of the PIC is electrically coupled to the IC; and an optical component optically coupled to the active side of the PIC at least partially embedded in the insulating material in the first and second layers.

Example 13D may include the subject matter of Example 12D, and may further specify that the optical component is a fiber array block.

Example 14D may include the subject matter of Examples 12D or 13D, and may further specify that the optical component is a first optical component, and the photonic assembly may further include a second optical component optically coupled to the first optical component.

Example 15D may include the subject matter of Example 14D, and may further specify that the first optical component is a glass block and the second optical component is a fiber array block.

Example 16D may include the subject matter of Example 13D, and may further specify that the fiber array block includes a fiber array, a lid, and a glass v-groove.

Example 17D may include the subject matter of Example 13D, and may further specify that the fiber array block includes a fiber array, a lid, a glass v-groove, and a lateral optical portion.

Example 18D may include the subject matter of any of Examples 12D-17D, and may further include a conductive pillar in the first layer embedded in the insulating material; and a processor circuit in the second layer embedded in the insulating material and electrically coupled to the IC and the conductive pillar.

Example 19D may include the subject matter of any of Examples 12D-18D, and may further specify that the IC includes a first surface and an opposing second surface and the second layer is at the second surface of the IC, and the photonic assembly may further include a package substrate electrically coupled to the first surface of the IC.

Example 20D may include the subject matter of any of Examples 12D-19D, and may further specify that the insulating material is a first insulating material in the first layer, and the photonic assembly may further include a second insulating material in the second layer, wherein the second insulating material is different than the first insulating material.

Example 21D may include the subject matter of any of Examples 12D-20D, and may further specify that the optical component is optically coupled by optical glue.

Example 22D is a method of manufacturing a photonic assembly, including attaching a die to a carrier; encapsulating the die and planarizing the insulating material; removing insulating material to form a cavity; optically coupling an optical component to an optical element on an active surface of a photonic integrated circuit (PIC), wherein the PIC has the active surface, an opposing backside surface, and a lateral surface substantially perpendicular to the active surface, and the optical component extends along the lateral surface of the PIC; placing the PIC with the optical component facing into the cavity and electrically coupling the active surface of the PIC to the die; encapsulating the PIC and optical component with the insulating material and planarizing the insulating material to reveal a top surface of the optical component; and removing the carrier.

Example 23D may include the subject matter of Example 22D, and may further specify that the optical component is a fiber array block.

Example 24D may include the subject matter of Examples 22D or 23D, and may further specify that the die includes a first surface and an opposing second surface and the second surface is coupled to the PIC, and the method and may further include electrically coupling the first surface of the die to a package substrate.

Example 25D may include the subject matter of any of Examples 22D-24D, and may further specify that the die is a first die in a first layer, and the method and may further include disposing metallization on the carrier to form a conductive pillar; encapsulating the conductive pillar and the first die with the insulating material; and electrically coupling a second die in a second layer to the conductive pillar and the first die.

Example 26D may include the subject matter of any of Examples 22D-25D, and may further include optically polishing a lateral surface of the optical component.

Example 27D is a method of manufacturing a photonic assembly, including attaching a photonic integrated circuit (PIC) to a carrier, wherein the PIC has an active surface, an opposing backside surface, and a lateral surface substantially perpendicular to the active surface, wherein the PIC is attached to the carrier with the active surface facing away from the carrier, and wherein an optical component is optically coupled to an optical element on the active surface of the PIC and extends along the lateral surface of the PIC; encapsulating the PIC and the optical component with an insulating material and planarizing; electrically coupling a die to the active surface of the PIC; encapsulating the die with the insulating material and planarizing; and removing the carrier.

Example 28D may include the subject matter of Example 27D, and may further specify that the optical component is a fiber array block.

Example 29D may include the subject matter of Examples 27D or 28D, and may further include electrically coupling the backside surface of the PIC to a package substrate.

Example 30D may include the subject matter of any of Examples 27D-29D, and may further include disposing metallization on the carrier to form a conductive pillar; encapsulating the conductive pillar, the PIC, and the optical component with the insulating material; and electrically coupling the die to the conductive pillar.

Example 31D may include the subject matter of any of Examples 27D-30D, and may further include optically polishing a lateral surface of the optical component.

Example 1E is a photonic assembly, including an integrated circuit (IC) in a first layer including an insulating material, wherein the IC is embedded in the insulating material; a photonic integrated circuit (PIC), having an active surface, in a second layer, wherein the second layer is on the first layer, the second layer includes the insulating material, and the PIC is embedded in the insulating material with the active surface facing the first layer and electrically coupled to the IC; and a housing, having an optical lens optically coupled to an internal surface of the housing, attached to the active surface of the PIC and extending from the active surface of the PIC through the insulating material in the first layer, wherein the internal surface of the housing is opposite the active surface of the PIC.

Example 2E may include the subject matter of Example 1E, and may further specify that the optical lens is one of an array of lenses optically coupled to the internal surface of the housing.

Example 3E may include the subject matter of Examples 1E or 2E, and may further specify that a material of the housing includes glass.

Example 4E may include the subject matter of any of Examples 1E-3E, and may further specify that the housing is attached to the active surface of the PIC with optical glue.

Example 5E may include the subject matter of any of Examples 1E-4E, and may further specify that the optical lens is a micro-lens.

Example 6E may include the subject matter of any of Examples 1E-5E, and may further include a conductive pillar in the first layer embedded in the insulating material; and a processor circuit in the second layer embedded in the insulating material and electrically coupled to the IC and the conductive pillar.

Example 7E may include the subject matter of any of Examples 1E-6E, and may further specify that the IC includes a first surface and an opposing second surface and the second layer is at the second surface of the IC, and the photonic assembly may further include a package substrate electrically coupled to the first surface of the IC, wherein the package substrate includes an aperture and the optical lens on the housing is aligned with the aperture.

Example 8E may include the subject matter of any of Examples 1E-7E, and may further specify that the insulating material in the first layer is a first insulating material, and the photonic assembly may further include a second insulating material in the second layer.

Example 9E is a photonic assembly, including an integrated circuit (IC) in a first layer including an insulating material, wherein the IC is embedded in the insulating material; a photonic integrated circuit (PIC), having an active side, an opposing backside, and a lateral side substantially perpendicular to the active side and backside, in a second layer, wherein the second layer is on the first layer, the second layer includes the insulating material, and the PIC is embedded in the insulating material with the active side facing the first layer and electrically coupled to the IC; and a housing, having an optical lens optically coupled to an internal surface of the housing, attached to the active side and the lateral side of the PIC and extending from the active side of the PIC through at least a portion of the insulating material in the first layer, wherein the internal surface of the housing is opposite the lateral surface of the PIC.

Example 10E may include the subject matter of Example 9E, and may further specify that the optical lens is one of an array of lenses optically coupled to the internal surface of the housing.

Example 11E may include the subject matter of Examples 9E or 10E, and may further specify that a material of the housing includes glass.

Example 12E may include the subject matter of any of Examples 9E-11E, and may further specify that the housing is attached to the active side and the lateral side of the PIC with optical glue.

Example 13E may include the subject matter of Example 12E, and may further specify that the housing further includes a glue stop structure at the lateral side.

Example 14E may include the subject matter of any of Examples 9E-13E, and may further specify that the optical lens is a micro-lens.

Example 15E may include the subject matter of any of Examples 9E-14E, and may further include a conductive pillar in the first layer embedded in the insulating material; and a processor circuit in the second layer embedded in the insulating material and electrically coupled to the IC and the conductive pillar.

Example 16E may include the subject matter of any of Examples 9E-15E, and may further specify that the IC includes a first surface and an opposing second surface and the second layer is at the second surface of the IC, and the photonic assembly may further include a package substrate electrically coupled to the first surface of the IC.

Example 17E may include the subject matter of any of Examples 9E-16E, and may further specify that the insulating material in the first layer is a first insulating material, and the photonic assembly may further include a second insulating material in the second layer.

Example 18E is a photonic assembly, including an integrated circuit (IC) in a first layer including an insulating material, wherein the IC is embedded in the insulating material; a photonic integrated circuit (PIC), having an active side, an opposing backside, and a lateral side substantially perpendicular to the active side and backside, in a second layer, wherein the second layer is on the first layer, the second layer includes the insulating material, the PIC is embedded in the insulating material with the active side facing away from first layer, and the backside of the PIC is electrically coupled to the IC; and a housing, having an optical lens optically coupled to an internal surface of the housing, attached to the active side and the lateral side of the PIC and extending from the active side of the PIC through at least a portion of the insulating material in the second layer, wherein the internal surface of the housing is opposite the lateral surface of the PIC.

Example 19E may include the subject matter of Example 18E, and may further specify that the optical lens is one of an array of lenses optically coupled to the internal surface of the housing.

Example 20E may include the subject matter of Examples 18E or 19E, and may further specify that a material of the housing includes glass.

Example 21E may include the subject matter of any of Examples 18E-20E, and may further specify that the housing is attached to the active side and the lateral side of the PIC with optical glue.

Example 22E may include the subject matter of any of Examples 18E-21E, and may further specify that the optical lens is a micro-lens.

Example 23E may include the subject matter of any of Examples 18E-22E, and may further include a conductive pillar in the first layer embedded in the insulating material; and a processor circuit in the second layer embedded in the insulating material and electrically coupled to the IC and the conductive pillar.

Example 24E may include the subject matter of any of Examples 18E-23E, and may further specify that the IC includes a first surface and an opposing second surface and the second layer is at the second surface of the IC, and the photonic assembly may further include a package substrate electrically coupled to the first surface of the IC.

Example 25E may include the subject matter of any of Examples 18E-24E, and may further specify that the insulating material in the first layer is a first insulating material, and the photonic assembly may further include a second insulating material in the second layer.

Example 26E is a photonic assembly, including a photonic integrated circuit (PIC), having an active side, an opposing backside, and a lateral side substantially perpendicular to the active side and backside, in a first layer, wherein the first layer includes an insulating material and the PIC is embedded in the insulating material with the active side facing up; a conductive pillar in the first layer; an integrated circuit (IC) in a second layer electrically coupled to the active side of the PIC and the conductive pillar, wherein the second layer is on the first layer, the second layer includes the insulating material, and the IC is embedded in the insulating material; and a housing, having an optical lens optically coupled to an internal surface of the housing, attached to the active side and the lateral side of the PIC and extending from the active side of the PIC through at least a portion of the insulating material in the second layer, wherein the internal surface of the housing is opposite the lateral surface of the PIC.

Example 27E may include the subject matter of Example 26E, and may further specify that the optical lens is one of an array of lenses optically coupled to the internal surface of the housing.

Example 28E may include the subject matter of Examples 26E or 27E, and may further specify that a material of the housing includes glass.

Example 29E may include the subject matter of any of Examples 26E-28E, and may further specify that the housing is attached to the active side and the lateral side of the PIC with optical glue.

Example 30E may include the subject matter of any of Examples 26E-29E, and may further specify that the optical lens is a micro-lens.

Example 31E may include the subject matter of any of Examples 26E-30E, and may further include a package substrate electrically coupled to the backside of the PIC and the conductive pillar.

Example 32E may include the subject matter of any of Examples 26E-31E, and may further specify that the insulating material in the first layer is a first insulating material, and the photonic assembly may further include a second insulating material in the second layer.

Example 1F is a photonic assembly, including a photonic integrated circuit (PIC), having an active side, an opposing backside, and a lateral side substantially perpendicular to the active side and backside, in a first layer having a first surface and an opposing second surface, wherein the first layer includes an insulating material and the PIC is embedded in the insulating material with the active side facing up; a conductive pillar in the first layer; an integrated circuit (IC) in a second layer electrically coupled to the active side of the PIC and the conductive pillar, wherein the second layer is at the second surface of the first layer, the second layer includes the insulating material, and the IC is embedded in the insulating material; and an optical component, having a reflector embedded therein, optically coupled to the lateral side of the PIC and extending at least partially through the insulating material in the first layer to the first surface of the first layer along the lateral side of the PIC.

Example 2F may include the subject matter of Example 1F, and may further specify that the optical component is a first optical component, and the photonic assembly may further include a second optical component optically coupled to the first optical component at the first surface of the first layer.

Example 3F may include the subject matter of Example 2F, and may further specify that the first optical component is a glass block with the reflector embedded therein and the second optical component is an optical lens.

Example 4F may include the subject matter of Example 1F, and may further specify that the optical component is a first optical component having a first side optically coupled to the lateral side of the PIC and an opposing peripheral side, and the photonic assembly may further include a second optical component optically coupled to the peripheral side of the first optical component.

Example 5F may include the subject matter of Example 4F, and may further specify that the first optical component is a glass block with the reflector embedded therein and the second optical component is an optical lens.

Example 6F may include the subject matter of any of Examples 1F-5F, and may further specify that the reflector is a mirror reflector.

Example 7F may include the subject matter of any of Examples 1F-6F, and may further specify that the reflector is a first reflector, and the photonic assembly may further include a second reflector embedded in the optical component.

Example 8F may include the subject matter of any of Examples 1F-6F, and may further specify that the optical component is a first optical component having a first reflector embedded therein, and the photonic assembly may further include a second optical component, having a second reflector embedded therein, optically coupled to the first optical component at the first surface of the first layer.

Example 9F may include the subject matter of any of Examples 1F-8F, and may further specify that a material of the optical component includes glass or acrylic.

Example 10F may include the subject matter of any of Examples 1F-9F, and may further include a package substrate electrically coupled to the backside of the PIC and the conductive pillar, wherein the package substrate includes an aperture and the optical component is aligned with the aperture.

Example 11F may include the subject matter of any of Examples 1F-10F, and may further specify that the insulating material in the first layer is a first insulating material, and the photonic assembly may further include a second insulating material in the second layer.

Example 12F is a photonic assembly, including a photonic integrated circuit (PIC), having an active side, an opposing backside, and a lateral side substantially perpendicular to the active side and backside, in a first layer, wherein the first layer includes an insulating material and the PIC is embedded in the insulating material with the active side facing up; a conductive pillar in the first layer; an integrated circuit (IC) in a second layer electrically coupled to the active side of the PIC and the conductive pillar, wherein the second layer is on the first layer, the second layer has a first surface, an opposing second surface, and a peripheral surface substantially perpendicular to the first and second surfaces, the second layer includes the insulating material, and the IC is embedded in the insulating material; and an optical component, having a reflector embedded therein, optically coupled to the lateral side of the PIC and extending at least partially through the insulating material in the first and second layers along the lateral side of the PIC to the peripheral surface of the second layer.

Example 13F may include the subject matter of Example 12F, and may further specify that the optical component is a first optical component, and the photonic assembly may further include a second optical component optically coupled to the first optical component at the peripheral surface of the second layer.

Example 14F may include the subject matter of Example 13F, and may further specify that the first optical component is a glass block with the reflector embedded therein and the second optical component is an optical lens.

Example 15F may include the subject matter of any of Examples 12F-14F, and may further specify that the reflector is a mirror reflector.

Example 16F may include the subject matter of any of Examples 12F-15F, and may further specify that the reflector is a first reflector, and the photonic assembly may further include a second reflector embedded in the optical component.

Example 17F may include the subject matter of any of Examples 12F-15F, and may further specify that the optical component is a first optical component having a first reflector embedded therein, and the photonic assembly may further include a second optical component, having a second reflector embedded therein, optically coupled to the first optical component at the first surface of the second layer.

Example 18F may include the subject matter of any of Examples 12F-17F, and may further specify that a material of the optical component includes glass or acrylic.

Example 19F may include the subject matter of any of Examples 12F-18F, and may further include a package substrate electrically coupled to the backside of the PIC and the conductive pillar.

Example 20F may include the subject matter of any of Examples 12F-19F, and may further specify that the insulating material in the first layer is a first insulating material, and the photonic assembly may further include a second insulating material in the second layer.

Example 21F is a photonic assembly, including a photonic integrated circuit (PIC), having an active side, an opposing backside, and a lateral side substantially perpendicular to the active side and backside, in a first layer, wherein the first layer includes an insulating material and the PIC is embedded in the insulating material with the active side facing up; a conductive pillar in the first layer; an integrated circuit (IC) in a second layer, having a first surface and an opposing second surface, electrically coupled to the active side of the PIC and the conductive pillar, wherein the first surface of the second layer is on the first layer, the second layer includes the insulating material, and the IC is embedded in the insulating material; and an optical component, having a reflector embedded therein, optically coupled to the lateral side of the PIC and extending through the insulating material in the second layer to the second surface of the second layer.

Example 22F may include the subject matter of Example 21F, and may further specify that the optical component is a first optical component, and the photonic assembly may further include a second optical component optically coupled to the first optical component at the first surface of the second layer.

Example 23F may include the subject matter of Example 22F, and may further specify that the first optical component is a triangular-prism with the reflector embedded therein and the second optical component is a glass block or a pass through structure.

Example 24F may include the subject matter of Example 23F, and may further include a third optical component optically coupled to the second optical component at the second surface of the second layer.

Example 25F may include the subject matter of Example 24F, and may further specify that the third optical component is an optical lens.

Example 26F may include the subject matter of any of Examples 21F-25F, and may further specify that the reflector is a mirror reflector.

Example 27F may include the subject matter of any of Examples 21f-26F, and may further specify that a material of the optical component includes glass or acrylic.

Example 28F may include the subject matter of any of Examples 21F-27F, and may further include a package substrate electrically coupled to the backside of the PIC and the conductive pillar.

Example 29F may include the subject matter of any of Examples 21F-28F, and may further specify that the insulating material in the first layer is a first insulating material, and the photonic assembly may further include a second insulating material in the second layer.

Example 30F is a photonic assembly, including a photonic integrated circuit (PIC), having an active side, an opposing backside, and a lateral side substantially perpendicular to the active side and backside, in a first layer having a first surface and an opposing second surface, wherein the first layer includes an insulating material and the PIC is embedded in the insulating material with the active side facing up; a conductive pillar in the first layer; an integrated circuit (IC) in a second layer electrically coupled to the active side of the PIC and the conductive pillar, wherein the second layer is at the second surface of the first layer, the second layer includes the insulating material, and the IC is embedded in the insulating material; and an optical component optically coupled to the lateral side of the PIC and extending at least partially through the insulating material in the first layer to the first surface of the first layer along the lateral side of the PIC.

Example 31F may include the subject matter of Example 30F, and may further specify that the optical component is a laser written waveguide.

Example 32F may include the subject matter of Example 31F, and may further specify that the waveguide has a first side optically coupled to the lateral side of the PIC and an opposing peripheral side, and the photonic assembly may further include an optical lens optically coupled to the peripheral side of the waveguide.

Example 33F may include the subject matter of Example 31F, and may further include an optical lens optically coupled to the waveguide at the first surface of the first layer.

Example 34F may include the subject matter of Example 30F, and may further specify that the optical component is a glass block having a curved-surface.

Example 35F may include the subject matter of any of Examples 30F-34F, and may further specify that a material of the optical component includes glass or acrylic.

Example 36F may include the subject matter of any of Examples 30F-35F, and may further include a package substrate coupled to the backside of the PIC and the conductive pillar.

Example 37F may include the subject matter of any of Examples 30F-36F, and may further specify that the insulating material in the first layer is a first insulating material, and the photonic assembly may further include a second insulating material in the second layer.

The invention claimed is:

1. A photonic assembly, comprising:
a composite die having a plurality of layers;
a photonic integrated circuit (PIC) in a first layer of the plurality of layers including a first insulating material, wherein the PIC has an active surface and an opposing backside, and wherein the PIC is embedded in the first insulating material with the active surface facing up;
a conductive pillar in the first layer;
an integrated circuit (IC) in a second layer of the plurality of layers, wherein the second layer is on the first layer and the second layer includes a second insulating material, wherein the IC is embedded in the second insulating material in the second layer, wherein the second insulating material is different than the first insulating material, and wherein the IC is conductively coupled to the active surface of the PIC and the conductive pillar; and
an optical component, embedded in the second insulating material in the second layer, optically coupled to the active surface of the PIC, and extending through the second insulating material in the second layer.

2. The photonic assembly of claim 1, wherein the optical component is a glass block, a waveguide, a fiber array block, or a pass-through structure.

3. The photonic assembly of claim 1, wherein the optical component is a first optical component, and the photonic assembly further comprising:
a second optical component optically coupled to the first optical component.

4. The photonic assembly of claim 3, wherein the first optical component is a glass block and the second optical component is a glass block, a fiber array block, a waveguide, a laser written waveguide, a lens array, a pass-through structure, or a composite optical component.

5. The photonic assembly of claim 3, further comprising:
a third optical component optically coupled to the second optical component.

6. The photonic assembly of claim 5, wherein the third optical component is an optical lens.

7. The photonic assembly of claim 1, further comprising:
a bridge die in the first layer conductively coupled to the IC.

8. The photonic assembly of claim 7, further comprising:
a processor circuit in the second layer conductively coupled to the bridge die.

9. A photonic assembly, comprising:
a composite die having a plurality of layers;
an integrated circuit (IC) in a first layer of the plurality of layers including an insulating material, wherein the IC is embedded in the insulating material;
a photonic integrated circuit (PIC), having an active surface, in a second layer of the plurality of layers, wherein the second layer is on the first layer, the second layer includes the insulating material, and the PIC is embedded in the insulating material with the active surface facing the first layer and coupled to the IC by an interconnect;
an optical component, embedded in the insulating material in the second layer, optically coupled to the active surface of the PIC, and extending through the insulating material in the first layer; and
wherein the insulating material includes a first insulating material in the first layer and a second insulating material, in the second layer, different than the first insulating material.

10. The photonic assembly of claim 9, wherein the optical component is a glass block, a waveguide, a fiber array block, or a pass-through structure.

11. The photonic assembly of claim 9, wherein the IC includes a first surface and an opposing second surface and the second layer is at the second surface of the IC, and the photonic assembly further comprising:

a package substrate coupled to the first surface of the IC, wherein the package substrate includes an aperture and the optical component is aligned with the aperture.

12. The photonic assembly of claim 11, further comprising:

a heat transfer structure embedded in the package substrate.

13. The photonic assembly of claim 9, wherein the PIC includes a backside surface opposite the active surface, and the photonic assembly further comprising:

a heat transfer structure at the backside surface of the PIC.

14. The photonic assembly of claim 9, wherein the optical component is a first optical component, and the photonic assembly further comprising:

a second optical component optically coupled to the first optical component.

15. The photonic assembly of claim 14, wherein the first optical component is a glass block and the second optical component is a glass block, a waveguide, a fiber array block, or a pass-through structure.

16. The photonic assembly of claim 14, further comprising:

a third optical component optically coupled to the second optical component.

17. The photonic assembly of claim 16, wherein the third optical component is an optical lens.

* * * * *